United States Patent
Schofield et al.

(10) Patent No.: US 8,993,951 B2
(45) Date of Patent: Mar. 31, 2015

(54) DRIVER ASSISTANCE SYSTEM FOR A VEHICLE

(71) Applicant: Magna Electronics Inc., Auburn Hills, MI (US)

(72) Inventors: Kenneth Schofield, Holland, MI (US); Mark L. Larson, Grand Haven, MI (US); Keith J. Vadas, Coopersville, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 132 days.

(21) Appl. No.: 13/942,757

(22) Filed: Jul. 16, 2013

(65) Prior Publication Data

US 2013/0300871 A1 Nov. 14, 2013

Related U.S. Application Data

(63) Continuation of application No. 13/936,699, filed on Jul. 8, 2013, now Pat. No. 8,637,801, which is a continuation of application No. 13/749,839, filed on Jan. 25, 2013, now Pat. No. 8,492,698, which is a (Continued)

(51) Int. Cl.
*B60Q 1/02* (2006.01)
*B60Q 1/14* (2006.01)
(Continued)

(52) U.S. Cl.
CPC .............. *B60Q 1/143* (2013.01); *G05D 1/0244* (2013.01); *G05D 2201/0213* (2013.01);
(Continued)

(58) Field of Classification Search
USPC ............ 250/208.1; 382/104; 701/23–28, 200, 701/224; 702/92; 340/901; 348/118
See application file for complete search history.

(56) References Cited

U.S. PATENT DOCUMENTS 1,472,509 A 10/1923 Bitter
2,074,251 A 1/1936 Braun
(Continued)

FOREIGN PATENT DOCUMENTS

AT 519193 8/2011
BE 1008142 A7 1/1996
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Seung C Sohn
(74) *Attorney, Agent, or Firm* — Gardner, Linn, Burkhart & Flory, LLP

(57) ABSTRACT

A driver assistance system for a vehicle includes an imager disposed in a housing and a control. The imager includes a CMOS photosensor array of photosensor elements and a lens. With the housing disposed in a vehicle, the imager views forwardly to the exterior of the vehicle through the vehicle windshield at a region of the windshield that is swept by a windshield wiper of the vehicle. The CMOS photosensor array is operable to capture image data. The control includes an image processor disposed in the housing. The driver assistance system identifies objects viewed by the imager via processing by the image processor of captured image data. At least in part responsive to processing of captured image data by the image processor, streetlights present exterior of the vehicle and viewed by imager are discriminated from other objects present exterior the vehicle and viewed by imager.

20 Claims, 11 Drawing Sheets

Related U.S. Application Data continuation of application No. 13/689,798, filed on Nov. 30, 2012, now Pat. No. 8,481,910, which is a continuation of application No. 13/550,064, filed on Jul. 16, 2012, now Pat. No. 8,324,552, which is a continuation of application No. 13/204,106, filed on Aug. 5, 2011, now Pat. No. 8,222,588, which is a continuation of application No. 12/640,425, filed on Dec. 17, 2009, now Pat. No. 7,994,462, which is a continuation of application No. 12/273,879, filed on Nov. 19, 2008, now Pat. No. 7,655,894, which is a continuation of application No. 11/626,535, filed on Jan. 24, 2007, now Pat. No. 7,459,664, which is a continuation of application No. 11/545,039, filed on Oct. 6, 2006, now Pat. No. 7,402,786, which is a continuation of application No. 09/441,341, filed on Nov. 16, 1999, now Pat. No. 7,339,149, which is a continuation of application No. 09/135,565, filed on Aug. 17, 1998, now Pat. No. 6,097,023, which is a continuation of application No. 08/621,863, filed on Mar. 25, 1996, now Pat. No. 5,796,094.

(51) Int. Cl.
  *G05D 1/02* (2006.01)
  *G06K 9/00* (2006.01)
  *H04N 7/18* (2006.01)

(52) U.S. Cl.
  CPC .............. *B60Q 1/14* (2013.01); *G06K 9/00791* (2013.01); *G06K 9/00818* (2013.01); *G06K 9/00825* (2013.01); *H04N 7/18* (2013.01)
  USPC ........................................ 250/208.1; 382/104

(56) References Cited

U.S. PATENT DOCUMENTS

| | | |
|---|---|---|
| 2,148,119 A | 2/1939 | Grist |
| 2,339,291 A | 4/1940 | Paulus et al. |
| 2,317,400 A | 8/1940 | Paulus et al. |
| 2,331,144 A | 12/1940 | Sitter |
| 2,424,288 A | 3/1944 | Severy |
| 2,598,420 A | 5/1952 | Onksen et al. |
| 2,750,583 A | 1/1953 | McCullough |
| 2,632,040 A | 3/1953 | Rabinow |
| 2,827,594 A | 3/1953 | Rabinow |
| 2,762,932 A | 9/1956 | Falge |
| 2,907,920 A | 10/1956 | McIlvane |
| 3,008,532 A | 1/1958 | Reed |
| 2,855,523 A | 10/1958 | Berger |
| 2,856,146 A | 10/1958 | Lehder |
| 3,011,580 A | 10/1958 | Reid |
| 2,863,064 A | 12/1958 | Rabinow |
| 2,892,094 A | 6/1959 | Lehovec |
| 2,912,593 A | 11/1959 | Deuth |
| 2,934,676 A | 4/1960 | Miller |
| 2,959,709 A | 10/1960 | Vanaman et al. |
| 3,085,646 A | 4/1963 | Paufve |
| 3,158,835 A | 11/1964 | Hipkins |
| 3,172,496 A | 3/1965 | Rabinow et al. |
| 3,201,750 A | 8/1965 | Morin |
| 3,208,070 A | 9/1965 | Boicey |
| 3,249,761 A | 5/1966 | Baumanns |
| 3,271,577 A | 9/1966 | Griner et al. |
| 3,325,680 A | 6/1967 | Amacher |
| 3,367,616 A | 2/1968 | Bausch et al. |
| 3,486,066 A | 12/1969 | Hicks et al. |
| 3,515,472 A | 6/1970 | Schwitzgebel |
| 3,623,671 A | 11/1971 | Hargroves |
| 3,673,560 A | 6/1972 | Barsh et al. |
| 3,680,951 A | 8/1972 | Jordan et al. |
| 3,689,695 A | 9/1972 | Rosenfield et al. |
| 3,708,668 A | 1/1973 | Tilley |
| 3,751,711 A | 8/1973 | Schick |
| 3,845,572 A | 11/1974 | McCanney |
| 3,876,940 A | 4/1975 | Wickord et al. |
| 3,971,065 A | 7/1976 | Bayer |
| 3,985,424 A | 10/1976 | Steinacher |
| 3,986,022 A | 10/1976 | Hyatt |
| 4,003,445 A | 1/1977 | De Bruine |
| 4,037,134 A | 7/1977 | Loper |
| 4,044,853 A | 8/1977 | Melke |
| 4,049,961 A | 9/1977 | Marcy |
| 4,058,796 A | 11/1977 | Oishi et al. |
| 4,093,364 A | 6/1978 | Miller |
| 4,127,778 A | 11/1978 | Leitz |
| 4,139,801 A | 2/1979 | Linares |
| 4,143,264 A | 3/1979 | Gilbert et al. |
| 4,176,728 A | 12/1979 | Otteblad et al. |
| 4,200,361 A | 4/1980 | Malvano |
| 4,209,853 A | 6/1980 | Hyatt |
| 4,214,266 A | 7/1980 | Myers |
| 4,218,698 A | 8/1980 | Bart et al. |
| 4,236,099 A | 11/1980 | Rosenblum |
| 4,238,778 A | 12/1980 | Ohsumi |
| 4,247,870 A | 1/1981 | Gabel et al. |
| 4,249,160 A | 2/1981 | Chilvers |
| 4,254,931 A | 3/1981 | Aikens |
| 4,257,703 A | 3/1981 | Goodrich |
| 4,266,856 A | 5/1981 | Wainwright |
| 4,277,804 A | 7/1981 | Robison |
| 4,278,142 A | 7/1981 | Kono |
| 4,281,898 A | 8/1981 | Ochiai |
| 4,288,814 A | 9/1981 | Talley et al. |
| RE30,835 E | 12/1981 | Giglia |
| 4,348,652 A | 9/1982 | Barnes et al. |
| 4,348,653 A | 9/1982 | Tsuzuki et al. |
| 4,355,271 A | 10/1982 | Noack |
| 4,357,558 A | 11/1982 | Massoni et al. |
| 4,357,594 A | 11/1982 | Ehrlich et al. |
| 4,381,888 A | 5/1983 | Momiyama |
| 4,389,537 A | 6/1983 | Tsunoda et al. |
| 4,389,639 A | 6/1983 | Torii et al. |
| 4,390,895 A | 6/1983 | Sato et al. |
| 4,401,181 A | 8/1983 | Schwarz |
| 4,403,208 A | 9/1983 | Hodgson et al. |
| 4,420,238 A | 12/1983 | Felix |
| 4,431,896 A | 2/1984 | Lodetti |
| 4,441,125 A | 4/1984 | Parkinson |
| 4,443,057 A | 4/1984 | Bauer |
| 4,460,831 A | 7/1984 | Oettinger et al. |
| 4,464,789 A | 8/1984 | Sternberg |
| 4,471,228 A | 9/1984 | Nishizawa et al. |
| 4,481,450 A | 11/1984 | Watanabe et al. |
| 4,483,011 A | 11/1984 | Brown |
| 4,485,402 A | 11/1984 | Searby |
| 4,491,390 A | 1/1985 | Tong-Shen |
| 4,495,589 A | 1/1985 | Hirzel |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer |
| 4,532,550 A | 7/1985 | Bendell |
| 4,538,181 A | 8/1985 | Taylor |
| 4,546,551 A | 10/1985 | Franks |
| 4,549,208 A | 10/1985 | Kamejima et al. |
| 4,564,833 A | 1/1986 | Seko et al. |
| 4,566,032 A | 1/1986 | Hirooka et al. |
| 4,571,082 A | 2/1986 | Downs |
| 4,572,619 A | 2/1986 | Reininger |
| 4,580,875 A | 4/1986 | Bechtel et al. |
| 4,587,522 A | 5/1986 | Warren |
| 4,588,041 A | 5/1986 | Tsuchuhashi |
| 4,599,544 A | 7/1986 | Martin |
| 4,600,913 A | 7/1986 | Caine |
| 4,601,053 A | 7/1986 | Grumet |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,625,329 A | 11/1986 | Ishikawa et al. |
| 4,626,850 A | 12/1986 | Chey |

(56) References Cited

U.S. PATENT DOCUMENTS

| | | | |
|---|---|---|---|
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,645,320 A | 2/1987 | Muelling et al. |
| 4,645,975 A | 2/1987 | Meitzler et al. |
| 4,647,161 A | 3/1987 | Müller |
| 4,647,975 A | 3/1987 | Alston et al. |
| 4,653,316 A | 3/1987 | Fukuhara |
| 4,665,321 A | 5/1987 | Chang et al. |
| 4,669,825 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,679,077 A | 7/1987 | Yuasa et al. |
| 4,681,431 A | 7/1987 | Sims et al. |
| 4,690,508 A | 9/1987 | Jacob |
| 4,692,798 A | 9/1987 | Seko et al. |
| 4,697,883 A | 10/1987 | Suzuki |
| 4,699,484 A | 10/1987 | Howell et al. |
| 4,701,022 A | 10/1987 | Jacob |
| 4,701,613 A | 10/1987 | Watanabe et al. |
| 4,713,685 A | 12/1987 | Nishimura et al. |
| 4,717,830 A | 1/1988 | Botts |
| 4,727,290 A | 2/1988 | Smith |
| 4,728,804 A | 3/1988 | Norsworthy |
| 4,731,669 A | 3/1988 | Hayashi et al. |
| 4,731,769 A | 3/1988 | Schaefer et al. |
| 4,741,603 A | 5/1988 | Miyagi |
| 4,755,664 A | 7/1988 | Holmes et al. |
| 4,758,883 A | 7/1988 | Kawahara et al. |
| 4,768,135 A | 8/1988 | Kretschmer et al. |
| 4,772,942 A | 9/1988 | Tuck |
| 4,779,095 A | 10/1988 | Guerreri |
| 4,785,280 A | 11/1988 | Fubini et al. |
| 4,789,904 A | 12/1988 | Peterson |
| 4,793,690 A | 12/1988 | Gahan |
| 4,799,267 A | 1/1989 | Kamejima et al. |
| 4,805,015 A | 2/1989 | Copeland |
| 4,816,828 A | 3/1989 | Feher |
| 4,817,948 A | 4/1989 | Simonelli |
| 4,820,933 A | 4/1989 | Hong |
| 4,825,232 A | 4/1989 | Howdle |
| 4,833,469 A | 5/1989 | David |
| 4,833,534 A | 5/1989 | Paff et al. |
| 4,838,650 A | 6/1989 | Stewart |
| 4,839,749 A | 6/1989 | Franklin |
| 4,841,348 A | 6/1989 | Shizukuishi et al. |
| 4,843,463 A | 6/1989 | Michetti |
| 4,847,489 A | 7/1989 | Dietrich |
| 4,847,772 A | 7/1989 | Michalopoulos et al. |
| 4,849,731 A | 7/1989 | Melocik |
| 4,855,822 A | 8/1989 | Narendra et al. |
| 4,859,031 A | 8/1989 | Berman et al. |
| 4,862,037 A | 8/1989 | Farber et al. |
| 4,863,130 A | 9/1989 | Marks, Jr. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,466 A | 11/1989 | Friel |
| 4,882,565 A | 11/1989 | Gallmeyer |
| 4,883,349 A | 11/1989 | Mittelhauser |
| 4,884,055 A | 11/1989 | Memmola |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,899,296 A | 2/1990 | Khattak |
| 4,900,133 A | 2/1990 | Berman |
| 4,905,151 A | 2/1990 | Weiman et al. |
| 4,906,940 A | 3/1990 | Greene et al. |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,926,346 A | 5/1990 | Yokoyama |
| 4,930,742 A | 6/1990 | Schofield et al. |
| 4,931,937 A | 6/1990 | Kakinami et al. |
| 4,936,533 A | 6/1990 | Adams et al. |
| 4,937,796 A | 6/1990 | Tendler |
| 4,949,186 A | 8/1990 | Peterson |
| 4,953,305 A | 9/1990 | Van Lente et al. |
| 4,954,962 A | 9/1990 | Evans, Jr. et al. |
| 4,956,591 A | 9/1990 | Schierbeek |
| 4,961,625 A | 10/1990 | Wood et al. |
| 4,963,788 A | 10/1990 | King et al. |
| 4,966,441 A | 10/1990 | Conner |
| 4,967,319 A | 10/1990 | Seko |
| 4,970,509 A | 11/1990 | Kissinger, Sr. |
| 4,970,589 A | 11/1990 | Hanson |
| 4,970,653 A | 11/1990 | Kenue |
| 4,971,405 A | 11/1990 | Hwang |
| 4,971,430 A | 11/1990 | Lynas |
| 4,974,078 A | 11/1990 | Tsai |
| 4,975,703 A | 12/1990 | Delisle et al. |
| 4,985,847 A | 1/1991 | Shioya et al. |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,003,339 A | 3/1991 | Kikuchi et al. |
| 5,008,739 A | 4/1991 | Luna et al. |
| 5,008,946 A | 4/1991 | Ando |
| 5,012,082 A | 4/1991 | Watanabe |
| 5,012,092 A | 4/1991 | Kobayashi |
| 5,012,335 A | 4/1991 | Cohodar |
| 5,016,977 A | 5/1991 | Baude et al. |
| 5,020,114 A | 5/1991 | Fujioka et al. |
| 5,027,001 A | 6/1991 | Torbert |
| 5,027,104 A | 6/1991 | Reid |
| 5,027,200 A | 6/1991 | Petrossian et al. |
| 5,031,101 A | 7/1991 | Kamimura et al. |
| 5,036,437 A | 7/1991 | Macks |
| 5,044,706 A | 9/1991 | Chen |
| 5,044,956 A | 9/1991 | Behensky et al. |
| 5,050,966 A | 9/1991 | Berman |
| 5,051,906 A | 9/1991 | Evans, Jr. et al. |
| 5,055,668 A | 10/1991 | French |
| 5,059,877 A | 10/1991 | Teder |
| 5,059,947 A | 10/1991 | Chen |
| 5,063,603 A | 11/1991 | Burt |
| 5,064,274 A | 11/1991 | Alten |
| 5,072,154 A | 12/1991 | Chen |
| 5,075,768 A | 12/1991 | Wirtz et al. |
| 5,080,207 A | 1/1992 | Horneffer |
| 5,080,309 A | 1/1992 | Ivins |
| 5,081,585 A | 1/1992 | Kurami et al. |
| 5,086,253 A | 2/1992 | Lawler |
| 5,086,510 A | 2/1992 | Guenther et al. |
| 5,087,969 A | 2/1992 | Kamada et al. |
| 5,096,287 A | 3/1992 | Kakinami et al. |
| 5,097,362 A | 3/1992 | Lynas |
| 5,100,093 A | 3/1992 | Rawlinson |
| 5,101,351 A | 3/1992 | Hattori |
| 5,111,289 A | 5/1992 | Lucas et al. |
| 5,113,721 A | 5/1992 | Polly |
| 5,115,398 A | 5/1992 | De Jong |
| 5,121,200 A | 6/1992 | Choi |
| 5,122,957 A | 6/1992 | Hattori |
| 5,124,549 A | 6/1992 | Michaels et al. |
| 5,128,769 A | 7/1992 | Ari |
| 5,130,709 A | 7/1992 | Toyama et al. |
| 5,133,605 A | 7/1992 | Nakamura |
| 5,137,238 A | 8/1992 | Hutten |
| 5,139,327 A | 8/1992 | Tanaka |
| 5,144,685 A | 9/1992 | Nasar et al. |
| 5,146,340 A | 9/1992 | Dickerson |
| 5,148,014 A | 9/1992 | Lynam |
| 5,153,760 A | 10/1992 | Ahmed |
| 5,155,426 A | 10/1992 | Kurami |
| 5,155,775 A | 10/1992 | Brown |

(56) References Cited

U.S. PATENT DOCUMENTS

| | | |
|---|---|---|
| 5,159,557 A | 10/1992 | Ogawa |
| 5,160,780 A | 11/1992 | Ono et al. |
| 5,160,971 A | 11/1992 | Koshizawa et al. |
| 5,161,632 A | 11/1992 | Asayama et al. |
| 5,162,841 A | 11/1992 | Terashita |
| 5,162,861 A | 11/1992 | Tamburino |
| 5,163,002 A | 11/1992 | Kurami |
| 5,165,108 A | 11/1992 | Asayama |
| 5,166,681 A | 11/1992 | Bottesch et al. |
| 5,168,355 A | 12/1992 | Asayama et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,173,881 A | 12/1992 | Sindle |
| 5,177,462 A | 1/1993 | Kajiwara |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,185,812 A | 2/1993 | Yamashita et al. |
| 5,187,383 A | 2/1993 | Taccetta et al. |
| 5,189,561 A | 2/1993 | Hong |
| 5,193,000 A | 3/1993 | Lipton et al. |
| 5,193,029 A | 3/1993 | Schofield |
| 5,193,894 A | 3/1993 | Lietar et al. |
| 5,204,536 A | 4/1993 | Vardi |
| 5,204,778 A | 4/1993 | Bechtel |
| 5,208,701 A | 5/1993 | Maeda |
| 5,208,750 A | 5/1993 | Kurami et al. |
| 5,212,468 A | 5/1993 | Adell |
| 5,214,408 A | 5/1993 | Asayama |
| 5,216,408 A | 6/1993 | Shirakawa |
| 5,218,414 A | 6/1993 | Kajiwara et al. |
| 5,220,508 A | 6/1993 | Ninomiya et al. |
| 5,223,814 A | 6/1993 | Suman |
| 5,223,907 A | 6/1993 | Asayama |
| 5,225,827 A | 7/1993 | Persson |
| 5,229,941 A | 7/1993 | Hattori |
| 5,230,400 A | 7/1993 | Kakinami et al. |
| 5,231,379 A | 7/1993 | Wood et al. |
| 5,233,527 A | 8/1993 | Shinnosuke |
| 5,234,070 A | 8/1993 | Noah et al. |
| 5,235,178 A | 8/1993 | Hegyi |
| 5,237,249 A | 8/1993 | Levers |
| 5,243,524 A | 9/1993 | Ishida et al. |
| 5,245,422 A | 9/1993 | Borcherts et al. |
| 5,246,193 A | 9/1993 | Faidley |
| 5,249,126 A | 9/1993 | Hattori |
| 5,249,128 A | 9/1993 | Markandey et al. |
| 5,249,157 A | 9/1993 | Taylor et al. |
| 5,251,680 A | 10/1993 | Minezawa et al. |
| 5,253,050 A | 10/1993 | Karasudani |
| 5,253,109 A | 10/1993 | O'Farrell et al. |
| 5,265,172 A | 11/1993 | Markandey et al. |
| 5,266,873 A | 11/1993 | Arditi et al. |
| 5,267,160 A | 11/1993 | Ito et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,291,424 A | 3/1994 | Asayama et al. |
| 5,293,162 A | 3/1994 | Bachalo |
| 5,298,732 A | 3/1994 | Chen |
| 5,301,115 A | 4/1994 | Nouso et al. |
| 5,302,956 A | 4/1994 | Asbury et al. |
| 5,304,980 A | 4/1994 | Maekawa et al. |
| 5,305,012 A | 4/1994 | Faris |
| 5,307,136 A | 4/1994 | Saneyoshi |
| 5,307,419 A | 4/1994 | Tsujino et al. |
| 5,309,137 A | 5/1994 | Kajiwara |
| 5,313,072 A | 5/1994 | Vachss |
| 5,318,143 A | 6/1994 | Parker et al. |
| 5,321,556 A | 6/1994 | Joe |
| 5,325,096 A | 6/1994 | Pakett |
| 5,325,386 A | 6/1994 | Jewell et al. |
| 5,327,288 A | 7/1994 | Wellington et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,347,456 A | 9/1994 | Zhang et al. |
| 5,351,044 A | 9/1994 | Mathur et al. |
| D351,370 S | 10/1994 | Lawlor et al. |
| 5,355,118 A | 10/1994 | Fukuhara |
| 5,359,666 A | 10/1994 | Nakayama et al. |
| 5,367,457 A | 11/1994 | Ishida et al. |
| 5,369,590 A | 11/1994 | Karasudani et al. |
| 5,371,535 A | 12/1994 | Takizawa |
| 5,373,911 A | 12/1994 | Yasui |
| 5,374,852 A | 12/1994 | Parkes |
| 5,379,196 A | 1/1995 | Kobayashi et al. |
| 5,379,353 A | 1/1995 | Hasegawa et al. |
| 5,386,285 A | 1/1995 | Asayama |
| 5,388,048 A | 2/1995 | Yavnayi et al. |
| 5,394,333 A | 2/1995 | Kao |
| 5,398,041 A | 3/1995 | Hyatt |
| 5,406,395 A | 4/1995 | Wilson et al. |
| 5,406,414 A | 4/1995 | O'Farrell et al. |
| 5,408,330 A | 4/1995 | Squicciarini |
| 5,408,346 A | 4/1995 | Trissel et al. |
| 5,410,346 A | 4/1995 | Saneyoshi et al. |
| 5,414,257 A | 5/1995 | Stanton |
| 5,414,439 A | 5/1995 | Groves et al. |
| 5,414,461 A | 5/1995 | Kishi et al. |
| 5,414,625 A | 5/1995 | Hattori |
| 5,416,313 A | 5/1995 | Larson et al. |
| 5,416,318 A | 5/1995 | Hegyi |
| 5,416,478 A | 5/1995 | Morinaga |
| 5,416,711 A | 5/1995 | Gran et al. |
| 5,424,952 A | 6/1995 | Asayama |
| 5,426,294 A | 6/1995 | Kobayashi et al. |
| 5,430,431 A | 7/1995 | Nelson |
| 5,430,450 A | 7/1995 | Holmes |
| 5,434,407 A | 7/1995 | Bauer et al. |
| 5,434,927 A | 7/1995 | Brady et al. |
| 5,436,839 A | 7/1995 | Dausch et al. |
| 5,440,428 A | 8/1995 | Hegg et al. |
| 5,444,478 A | 8/1995 | Lelong et al. |
| 5,448,180 A | 9/1995 | Kienzler et al. |
| 5,450,057 A | 9/1995 | Watanabe |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,465,079 A | 11/1995 | Bouchard et al. |
| 5,467,284 A | 11/1995 | Yoshioka et al. |
| 5,469,298 A | 11/1995 | Suman et al. |
| 5,471,515 A | 11/1995 | Fossum et al. |
| 5,473,515 A | 12/1995 | Liu |
| 5,475,366 A | 12/1995 | Van Lente et al. |
| 5,475,494 A | 12/1995 | Nishida et al. |
| 5,481,257 A | 1/1996 | Brubaker et al. |
| 5,482,133 A | 1/1996 | Iwata et al. |
| 5,483,060 A | 1/1996 | Sugiura et al. |
| 5,483,168 A | 1/1996 | Reid |
| 5,483,453 A | 1/1996 | Uemura et al. |
| 5,487,116 A | 1/1996 | Nakano et al. |
| 5,488,496 A | 1/1996 | Pine |
| 5,493,269 A | 2/1996 | Durley et al. |
| 5,493,392 A | 2/1996 | Blackmon et al. |
| 5,498,866 A | 3/1996 | Bendicks et al. |
| 5,500,766 A | 3/1996 | Stonecypher |
| 5,508,592 A | 4/1996 | Lapatovich et al. |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,330 A | 6/1996 | Baiden et al. |
| 5,530,420 A | 6/1996 | Tsuchiya et al. |
| 5,530,771 A | 6/1996 | Maekawa |

(56) References Cited

U.S. PATENT DOCUMENTS

| | | |
|---|---|---|
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,545,960 A | 8/1996 | Ishikawa |
| 5,550,677 A | 8/1996 | Schofield et al. |
| 5,555,136 A | 9/1996 | Waldmann et al. |
| 5,555,312 A | 9/1996 | Shima et al. |
| 5,555,503 A | 9/1996 | Kyrtsos et al. |
| 5,555,555 A | 9/1996 | Sato et al. |
| 5,558,123 A | 9/1996 | Castel et al. |
| 5,559,695 A | 9/1996 | Daily |
| 5,566,224 A | 10/1996 | ul Azam et al. |
| 5,568,027 A | 10/1996 | Teder |
| 5,568,316 A | 10/1996 | Schrenk et al. |
| 5,572,315 A | 11/1996 | Krell |
| 5,574,443 A | 11/1996 | Hsieh |
| 5,576,687 A | 11/1996 | Blank et al. |
| 5,581,464 A | 12/1996 | Woll et al. |
| 5,582,383 A | 12/1996 | Mertens et al. |
| 5,588,123 A | 12/1996 | Loibl |
| 5,594,222 A | 1/1997 | Caldwell |
| 5,596,319 A | 1/1997 | Spry et al. |
| 5,596,382 A | 1/1997 | Bamford |
| 5,598,164 A | 1/1997 | Reppas et al. |
| 5,602,457 A | 2/1997 | Anderson et al. |
| 5,612,686 A | 3/1997 | Takano et al. |
| 5,612,883 A | 3/1997 | Shaffer et al. |
| 5,614,788 A | 3/1997 | Mullins |
| 5,614,885 A | 3/1997 | Van Lente et al. |
| 5,615,857 A | 4/1997 | Hook |
| 5,619,370 A | 4/1997 | Guinosso |
| 5,627,586 A | 5/1997 | Yamasaki |
| 5,633,944 A | 5/1997 | Guibert et al. |
| 5,634,709 A | 6/1997 | Iwama |
| 5,638,116 A | 6/1997 | Shimoura et al. |
| 5,642,299 A | 6/1997 | Hardin et al. |
| 5,646,612 A | 7/1997 | Byon |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,667,896 A | 9/1997 | Carter et al. |
| 5,668,663 A | 9/1997 | Varaprasad et al. |
| 5,670,935 A | 9/1997 | Schofield et al. |
| 5,673,019 A | 9/1997 | Dantoni |
| 5,675,489 A | 10/1997 | Pomerleau |
| 5,676,484 A | 10/1997 | Chamberlin et al. |
| 5,677,851 A | 10/1997 | Kingdon et al. |
| 5,677,979 A | 10/1997 | Squicciarini et al. |
| 5,680,263 A | 10/1997 | Zimmermann et al. |
| D388,107 S | 12/1997 | Huckins |
| 5,699,044 A | 12/1997 | Van Lente et al. |
| 5,699,057 A | 12/1997 | Ikeda et al. |
| 5,699,149 A | 12/1997 | Kuroda et al. |
| 5,706,355 A | 1/1998 | Raboisson et al. |
| 5,707,129 A | 1/1998 | Kobayashi |
| 5,708,410 A | 1/1998 | Blank et al. |
| 5,710,633 A | 1/1998 | Klappenbach et al. |
| 5,715,093 A | 2/1998 | Schierbeek et al. |
| 5,719,551 A | 2/1998 | Flick |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,764,139 A | 6/1998 | Nojima et al. |
| 5,765,116 A | 6/1998 | Wilson-Jones et al. |
| 5,765,940 A | 6/1998 | Levy et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,804,719 A | 9/1998 | Didelot et al. |
| 5,808,589 A | 9/1998 | Fergason |
| 5,811,888 A | 9/1998 | Hsieh |
| 5,820,097 A | 10/1998 | Spooner |
| 5,835,255 A | 11/1998 | Miles |
| 5,835,613 A | 11/1998 | Breed et al. |
| 5,835,614 A | 11/1998 | Aoyama et al. |
| 5,837,994 A | 11/1998 | Stam et al. |
| 5,841,126 A | 11/1998 | Fossum et al. |
| 5,844,505 A | 12/1998 | Van Ryzin |
| 5,844,682 A | 12/1998 | Kiyomoto et al. |
| 5,845,000 A | 12/1998 | Breed et al. |
| 5,847,755 A | 12/1998 | Wixson et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,193 A | 3/1999 | Karim |
| 5,883,739 A | 3/1999 | Ashihara et al. |
| 5,884,212 A | 3/1999 | Lion |
| 5,890,021 A | 3/1999 | Onoda |
| 5,890,083 A | 3/1999 | Franke et al. |
| 5,896,085 A | 4/1999 | Mori et al. |
| 5,899,956 A | 5/1999 | Chan |
| 5,904,725 A | 5/1999 | Iisaka et al. |
| 5,905,457 A | 5/1999 | Rashid |
| 5,912,534 A | 6/1999 | Benedict |
| 5,914,815 A | 6/1999 | Bos |
| 5,920,367 A | 7/1999 | Kajimoto et al. |
| 5,922,036 A | 7/1999 | Yasui et al. |
| 5,923,027 A | 7/1999 | Stam et al. |
| 5,929,784 A | 7/1999 | Kawaziri et al. |
| 5,929,786 A | 7/1999 | Schofield et al. |
| 5,938,320 A | 8/1999 | Crandall |
| 5,938,810 A | 8/1999 | De Vries, Jr. et al. |
| 5,940,120 A | 8/1999 | Frankhouse et al. |
| 5,942,853 A | 8/1999 | Piscart |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,961,571 A | 10/1999 | Gorr |
| 5,963,247 A | 10/1999 | Banitt |
| 5,964,822 A | 10/1999 | Alland et al. |
| 5,971,552 A | 10/1999 | O'Farrell et al. |
| 5,982,288 A | 11/1999 | Sawatari et al. |
| 5,986,796 A | 11/1999 | Miles |
| 5,990,469 A | 11/1999 | Bechtel et al. |
| 5,990,649 A | 11/1999 | Nagao et al. |
| 5,991,427 A | 11/1999 | Kakinami |
| 6,001,486 A | 12/1999 | Varaprasad et al. |
| 6,009,336 A | 12/1999 | Harris et al. |
| 6,020,704 A | 2/2000 | Buschur |
| 6,028,537 A | 2/2000 | Suman et al. |
| 6,031,484 A | 2/2000 | Bullinger |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |
| 6,057,754 A | 5/2000 | Kinoshita et al. |
| 6,066,933 A | 5/2000 | Ponziana |
| 6,084,519 A | 7/2000 | Coulling et al. |
| 6,087,953 A | 7/2000 | DeLine et al. |
| 6,091,833 A | 7/2000 | Yasui et al. |
| 6,094,198 A | 7/2000 | Shashua |
| 6,097,023 A | 8/2000 | Schofield et al. |
| 6,097,024 A | 8/2000 | Stam et al. |
| 6,100,811 A | 8/2000 | Hsu et al. |

(56) References Cited

U.S. PATENT DOCUMENTS

| | | | |
|---|---|---|---|
| 6,107,939 A | 8/2000 | Sorden | |
| 6,116,743 A | 9/2000 | Hoek | |
| 6,122,597 A | 9/2000 | Saneyoshi et al. | |
| 6,124,647 A | 9/2000 | Marcus et al. | |
| 6,124,886 A | 9/2000 | DeLine et al. | |
| 6,139,172 A | 10/2000 | Bos et al. | |
| 6,140,980 A | 10/2000 | Spitzer et al. | |
| 6,144,022 A | 11/2000 | Tenenbaum et al. | |
| 6,144,158 A | 11/2000 | Beam | |
| 6,150,014 A | 11/2000 | Chu et al. | |
| 6,150,930 A | 11/2000 | Cooper | |
| 6,151,065 A | 11/2000 | Steed et al. | |
| 6,166,628 A | 12/2000 | Andreas | |
| 6,172,613 B1 | 1/2001 | DeLine et al. | |
| 6,175,164 B1 | 1/2001 | O'Farrell et al. | |
| 6,175,300 B1 | 1/2001 | Kendrick | |
| 6,188,939 B1 | 2/2001 | Morgan et al. | |
| 6,198,409 B1 | 3/2001 | Schofield et al. | |
| 6,201,642 B1 | 3/2001 | Bos | |
| 6,211,907 B1 | 4/2001 | Scaman et al. | |
| 6,218,934 B1 | 4/2001 | Regan | |
| 6,219,444 B1 | 4/2001 | Shashua et al. | |
| 6,222,447 B1 | 4/2001 | Schofield et al. | |
| 6,222,460 B1 | 4/2001 | DeLine et al. | |
| 6,226,061 B1 | 5/2001 | Tagusa | |
| 6,229,319 B1 | 5/2001 | Johnson | |
| 6,243,003 B1 | 6/2001 | DeLine et al. | |
| 6,247,819 B1 | 6/2001 | Turnbull et al. | |
| 6,250,148 B1 | 6/2001 | Lynam | |
| 6,259,412 B1 | 7/2001 | Duroux | |
| 6,259,423 B1 | 7/2001 | Tokito et al. | |
| 6,266,082 B1 | 7/2001 | Yonezawa et al. | |
| 6,266,442 B1 | 7/2001 | Laumeyer et al. | |
| 6,278,377 B1 | 8/2001 | DeLine et al. | |
| 6,281,804 B1 | 8/2001 | Haller et al. | |
| 6,285,393 B1 | 9/2001 | Shimoura et al. | |
| 6,285,778 B1 | 9/2001 | Nakajima et al. | |
| 6,291,905 B1 | 9/2001 | Drummond et al. | |
| 6,291,906 B1 | 9/2001 | Marcus et al. | |
| 6,292,752 B1 | 9/2001 | Franke et al. | |
| 6,294,989 B1 | 9/2001 | Schofield et al. | |
| 6,297,781 B1 | 10/2001 | Turnbull et al. | |
| 6,302,545 B1 | 10/2001 | Schofield et al. | |
| 6,310,611 B1 | 10/2001 | Caldwell | |
| 6,311,119 B2 | 10/2001 | Sawamoto et al. | |
| 6,313,454 B1 | 11/2001 | Bos et al. | |
| 6,315,421 B1 | 11/2001 | Apfelbeck et al. | |
| 6,317,057 B1 | 11/2001 | Lee | |
| 6,318,870 B1 | 11/2001 | Spooner et al. | |
| 6,320,176 B1 | 11/2001 | Schofield et al. | |
| 6,320,282 B1 | 11/2001 | Caldwell | |
| 6,324,450 B1 | 11/2001 | Iwama | |
| 6,326,613 B1 | 12/2001 | Heslin et al. | |
| 6,329,925 B1 | 12/2001 | Skiver et al. | |
| 6,333,759 B1 | 12/2001 | Mazzilli | |
| 6,341,523 B2 | 1/2002 | Lynam | |
| 6,353,392 B1 | 3/2002 | Schofield et al. | |
| 6,359,392 B1 | 3/2002 | He | |
| 6,362,729 B1 | 3/2002 | Hellmann et al. | |
| 6,366,213 B2 | 4/2002 | DeLine et al. | |
| 6,366,236 B1 | 4/2002 | Farmer et al. | |
| 6,370,329 B1 | 4/2002 | Teuchert | |
| 6,388,565 B1 | 5/2002 | Bernhard et al. | |
| 6,388,580 B1 | 5/2002 | Graham | |
| 6,389,340 B1 | 5/2002 | Rayner | |
| 6,392,218 B1 | 5/2002 | Kuehnle | |
| 6,396,397 B1 | 5/2002 | Bos et al. | |
| 6,411,204 B1 | 6/2002 | Bloomfield et al. | |
| 6,411,328 B1 | 6/2002 | Franke et al. | |
| 6,420,975 B1 | 7/2002 | DeLine et al. | |
| 6,424,273 B1 | 7/2002 | Gutta et al. | |
| 6,428,172 B1 | 8/2002 | Hutzel et al. | |
| 6,429,594 B1 | 8/2002 | Stam et al. | |
| 6,430,303 B1 | 8/2002 | Naoi et al. | |
| 6,433,676 B2 | 8/2002 | DeLine et al. | |
| 6,433,817 B1 | 8/2002 | Guerra | |
| 6,441,748 B1 | 8/2002 | Takagi et al. | |
| 6,442,465 B2 | 8/2002 | Breed et al. | |
| 6,445,809 B1 | 9/2002 | Sasaki et al. | |
| 6,449,540 B1 | 9/2002 | Rayner | |
| 6,452,148 B1 | 9/2002 | Bendicks et al. | |
| 6,466,684 B1 | 10/2002 | Sasaki et al. | |
| 6,469,739 B1 | 10/2002 | Bechtel et al. | |
| 6,472,977 B1 | 10/2002 | Poechmueller | |
| 6,472,979 B2 | 10/2002 | Schofield et al. | |
| 6,477,260 B1 | 11/2002 | Shimomura | |
| 6,477,464 B2 | 11/2002 | McCarthy et al. | |
| 6,483,438 B2 | 11/2002 | DeLine et al. | |
| 6,485,155 B1 | 11/2002 | Duroux et al. | |
| 6,497,503 B1 | 12/2002 | Dassanayake et al. | |
| 6,498,620 B2 | 12/2002 | Schofield et al. | |
| 6,509,832 B1 | 1/2003 | Bauer et al. | |
| 6,513,252 B1 | 2/2003 | Schierbeek et al. | |
| 6,515,378 B2 | 2/2003 | Drummond et al. | |
| 6,516,272 B2 | 2/2003 | Lin | |
| 6,516,664 B2 | 2/2003 | Lynam | |
| 6,523,964 B2 | 2/2003 | Schofield et al. | |
| 6,534,884 B2 | 3/2003 | Marcus et al. | |
| 6,535,242 B1 | 3/2003 | Strumolo et al. | |
| 6,539,306 B2 | 3/2003 | Turnbull | |
| 6,540,193 B1 | 4/2003 | DeLine | |
| 6,547,133 B1 | 4/2003 | DeVries, Jr. et al. | |
| 6,553,130 B1 | 4/2003 | Lemelson et al. | |
| 6,559,435 B2 | 5/2003 | Schofield et al. | |
| 6,574,033 B1 | 6/2003 | Chui et al. | |
| 6,577,334 B1 | 6/2003 | Kawai et al. | |
| 6,578,017 B1 | 6/2003 | Ebersole et al. | |
| 6,587,573 B1 | 7/2003 | Stam et al. | |
| 6,587,968 B1 | 7/2003 | Leyva | |
| 6,589,625 B1 | 7/2003 | Kothari et al. | |
| 6,593,011 B2 | 7/2003 | Liu et al. | |
| 6,593,565 B2 | 7/2003 | Heslin et al. | |
| 6,593,698 B2 | 7/2003 | Stam et al. | |
| 6,593,960 B1 | 7/2003 | Sugimoto et al. | |
| 6,594,583 B2 | 7/2003 | Ogura et al. | |
| 6,611,202 B2 | 8/2003 | Schofield et al. | |
| 6,611,610 B1 | 8/2003 | Stam et al. | |
| 6,614,579 B2 | 9/2003 | Roberts et al. | |
| 6,617,564 B2 | 9/2003 | Ockerse et al. | |
| 6,627,918 B2 | 9/2003 | Getz et al. | |
| 6,631,316 B2 | 10/2003 | Stam et al. | |
| 6,631,994 B2 | 10/2003 | Suzuki et al. | |
| 6,636,258 B2 | 10/2003 | Strumolo | |
| 6,648,477 B2 | 11/2003 | Hutzel et al. | |
| 6,650,233 B2 | 11/2003 | DeLine et al. | |
| 6,650,455 B2 | 11/2003 | Miles | |
| 6,653,614 B2 | 11/2003 | Stam et al. | |
| 6,672,731 B2 | 1/2004 | Schnell et al. | |
| 6,674,562 B1 | 1/2004 | Miles | |
| 6,674,878 B2 | 1/2004 | Retterath et al. | |
| 6,678,056 B2 | 1/2004 | Downs | |
| 6,678,590 B1 | 1/2004 | Burchfiel | |
| 6,678,614 B2 | 1/2004 | McCarthy et al. | |
| 6,680,792 B2 | 1/2004 | Miles | |
| 6,681,163 B2 | 1/2004 | Stam et al. | |
| 6,690,268 B2 | 2/2004 | Schofield et al. | |
| 6,700,605 B1 | 3/2004 | Toyoda et al. | |
| 6,703,925 B2 | 3/2004 | Steffel | |
| 6,704,621 B1 | 3/2004 | Stein et al. | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,728,393 B2 | 4/2004 | Stam et al. | |
| 6,728,623 B2 | 4/2004 | Takenaga et al. | |
| 6,735,506 B2 | 5/2004 | Breed et al. | |
| 6,738,088 B1 | 5/2004 | Uskolovsky et al. | |
| 6,741,186 B2 | 5/2004 | Ross | |
| 6,741,377 B2 | 5/2004 | Miles | |
| 6,744,353 B2 | 6/2004 | Sjönell | |
| 6,754,367 B1 | 6/2004 | Ito et al. | |
| 6,757,109 B2 | 6/2004 | Bos | |
| 6,762,867 B2 | 7/2004 | Lippert et al. | |
| 6,764,210 B2 | 7/2004 | Akiyama | |

(56) References Cited

U.S. PATENT DOCUMENTS

| | | |
|---|---|---|
| 6,765,480 B2 | 7/2004 | Tseng |
| 6,774,988 B2 | 8/2004 | Stam et al. |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa et al. |
| 6,801,244 B2 | 10/2004 | Takeda et al. |
| 6,802,617 B2 | 10/2004 | Schofield et al. |
| 6,806,452 B2 | 10/2004 | Bos et al. |
| 6,807,287 B1 | 10/2004 | Hermans |
| 6,811,330 B1 | 11/2004 | Tozawa |
| 6,812,463 B2 | 11/2004 | Okada |
| 6,813,545 B2 | 11/2004 | Stromme |
| 6,819,231 B2 | 11/2004 | Berberich et al. |
| 6,819,779 B1 | 11/2004 | Nichani |
| 6,822,563 B2 | 11/2004 | Bos et al. |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,831,261 B2 | 12/2004 | Schofield et al. |
| 6,838,980 B2 | 1/2005 | Gloger et al. |
| 6,842,189 B2 | 1/2005 | Park |
| 6,847,487 B2 | 1/2005 | Burgner |
| 6,850,629 B2 | 2/2005 | Jeon |
| 6,853,738 B1 | 2/2005 | Nishigaki et al. |
| 6,859,148 B2 | 2/2005 | Miller et al. |
| 6,861,809 B2 | 3/2005 | Stam |
| 6,864,930 B2 | 3/2005 | Matsushita et al. |
| 6,873,253 B2 | 3/2005 | Veziris |
| 6,882,287 B2 | 4/2005 | Schofield |
| 6,888,447 B2 | 5/2005 | Hori et al. |
| 6,889,161 B2 | 5/2005 | Winner et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,928,180 B2 | 8/2005 | Stam et al. |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,956,469 B2 | 10/2005 | Hirvonen et al. |
| 6,959,994 B2 | 11/2005 | Fujikawa et al. |
| 6,961,178 B2 | 11/2005 | Sugino et al. |
| 6,961,661 B2 | 11/2005 | Sekiguchi et al. |
| 6,963,661 B1 | 11/2005 | Hattori et al. |
| 6,967,569 B2 | 11/2005 | Weber et al. |
| 6,968,736 B2 | 11/2005 | Lynam |
| 6,975,775 B2 | 12/2005 | Rykowski et al. |
| 6,980,092 B2 | 12/2005 | Turnbull et al. |
| 6,989,736 B2 | 1/2006 | Berberich et al. |
| 6,990,397 B2 | 1/2006 | Albou et al. |
| 6,995,687 B2 | 2/2006 | Lang et al. |
| 7,004,593 B2 | 2/2006 | Weller et al. |
| 7,004,606 B2 | 2/2006 | Schofield |
| 7,005,974 B2 | 2/2006 | McMahon et al. |
| 7,012,727 B2 | 3/2006 | Hutzel et al. |
| 7,023,331 B2 | 4/2006 | Kodama |
| 7,027,387 B2 | 4/2006 | Reinold et al. |
| 7,027,615 B2 | 4/2006 | Chen |
| 7,030,738 B2 | 4/2006 | Ishii |
| 7,030,775 B2 | 4/2006 | Sekiguchi |
| 7,030,778 B2 | 4/2006 | Ra |
| 7,038,577 B2 | 5/2006 | Pawlicki et al. |
| 7,046,448 B2 | 5/2006 | Burgner |
| 7,057,505 B2 | 6/2006 | Iwamoto |
| 7,057,681 B2 | 6/2006 | Hinata et al. |
| 7,062,300 B1 | 6/2006 | Kim |
| 7,065,432 B2 | 6/2006 | Moisel et al. |
| 7,068,289 B2 | 6/2006 | Satoh et al. |
| 7,068,844 B1 | 6/2006 | Javidi et al. |
| 7,085,633 B2 | 8/2006 | Nishira et al. |
| 7,085,637 B2 | 8/2006 | Breed et al. |
| 7,091,837 B2 | 8/2006 | Nakai et al. |
| 7,092,548 B2 | 8/2006 | Laumeyer et al. |
| 7,095,432 B2 | 8/2006 | Nakayama et al. |
| 7,106,213 B2 | 9/2006 | White |
| 7,110,021 B2 | 9/2006 | Nobori et al. |
| 7,110,156 B2 | 9/2006 | Lawlor et al. |
| 7,113,867 B1 | 9/2006 | Stein |
| 7,116,246 B2 | 10/2006 | Winter et al. |
| 7,121,028 B2 | 10/2006 | Shoen et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,171,027 B2 | 1/2007 | Satoh |
| 7,184,585 B2 | 2/2007 | Hamza et al. |
| 7,187,498 B2 | 3/2007 | Bengoechea et al. |
| 7,195,381 B2 | 3/2007 | Lynam et al. |
| 7,202,776 B2 | 4/2007 | Breed |
| 7,202,987 B2 | 4/2007 | Varaprasad et al. |
| 7,205,904 B2 | 4/2007 | Schofield |
| 7,221,363 B2 | 5/2007 | Roberts et al. |
| 7,224,324 B2 | 5/2007 | Quist et al. |
| 7,227,459 B2 | 6/2007 | Bos et al. |
| 7,227,611 B2 | 6/2007 | Hull et al. |
| 7,235,918 B2 | 6/2007 | McCullough et al. |
| 7,248,283 B2 | 7/2007 | Takagi et al. |
| 7,248,344 B2 | 7/2007 | Morcom |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,271,951 B2 | 9/2007 | Weber et al. |
| 7,304,661 B2 | 12/2007 | Ishikura |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,337,055 B2 | 2/2008 | Matsumoto et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,360,932 B2 | 4/2008 | Uken et al. |
| 7,362,883 B2 | 4/2008 | Otsuka et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,403,659 B2 | 7/2008 | Das et al. |
| 7,420,756 B2 | 9/2008 | Lynam |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,429,998 B2 | 9/2008 | Kawauchi et al. |
| 7,432,248 B2 | 10/2008 | Roberts et al. |
| 7,432,967 B2 | 10/2008 | Bechtel et al. |
| 7,446,924 B2 | 11/2008 | Schofield et al. |
| 7,459,664 B2 | 12/2008 | Schofield et al. |
| 7,460,007 B2 | 12/2008 | Schofield et al. |
| 7,474,963 B2 | 1/2009 | Taylor et al. |
| 7,489,374 B2 | 2/2009 | Utsumi et al. |
| 7,495,719 B2 | 2/2009 | Adachi et al. |
| 7,525,604 B2 | 4/2009 | Xue |
| 7,526,103 B2 | 4/2009 | Schofield et al. |
| 7,541,743 B2 | 6/2009 | Salmeen et al. |
| 7,543,946 B2 | 6/2009 | Ockerse et al. |
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,566,639 B2 | 7/2009 | Kohda |
| 7,566,851 B2 | 7/2009 | Stein et al. |
| 7,567,291 B2 | 7/2009 | Bechtel et al. |
| 7,613,327 B2 | 11/2009 | Stam et al. |
| 7,616,781 B2 | 11/2009 | Schofield et al. |
| 7,619,508 B2 | 11/2009 | Lynam et al. |

(56) References Cited

U.S. PATENT DOCUMENTS

| | | |
|---|---|---|
| 7,629,996 B2 | 12/2009 | Rademacher et al. |
| 7,633,383 B2 | 12/2009 | Dunsmoir et al. |
| 7,639,149 B2 | 12/2009 | Katoh |
| 7,650,030 B2 | 1/2010 | Shan et al. |
| 7,653,215 B2 | 1/2010 | Stam |
| 7,655,894 B2 | 2/2010 | Schofield et al. |
| 7,663,798 B2 | 2/2010 | Tonar et al. |
| 7,676,087 B2 | 3/2010 | Dhua et al. |
| 7,683,326 B2 | 3/2010 | Stam et al. |
| 7,702,133 B2 | 4/2010 | Muramatsu et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,786,898 B2 | 8/2010 | Stein et al. |
| 7,791,694 B2 | 9/2010 | Molsen et al. |
| 7,792,329 B2 | 9/2010 | Schofield et al. |
| 7,825,600 B2 | 11/2010 | Stam et al. |
| 7,842,154 B2 | 11/2010 | Lynam |
| 7,843,451 B2 | 11/2010 | Lafon |
| 7,854,514 B2 | 12/2010 | Conner et al. |
| 7,855,755 B2 | 12/2010 | Weller et al. |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,152 B2 | 5/2011 | Schofield et al. |
| 7,965,357 B2 | 6/2011 | Van De Witte et al. |
| 7,991,522 B2 | 8/2011 | Higgins-Luthman |
| 7,994,462 B2 | 8/2011 | Schofield et al. |
| 7,995,067 B2 | 8/2011 | Navon |
| 8,017,898 B2 | 9/2011 | Lu et al. |
| 8,027,691 B2 | 9/2011 | Bernas et al. |
| 8,045,760 B2 | 10/2011 | Stam et al. |
| 8,064,643 B2 | 11/2011 | Stein et al. |
| 8,082,101 B2 | 12/2011 | Stein et al. |
| 8,090,153 B2 | 1/2012 | Schofield et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,120,652 B2 | 2/2012 | Bechtel et al. |
| 8,164,628 B2 | 4/2012 | Stein et al. |
| 8,184,159 B2 | 5/2012 | Luo |
| 8,203,440 B2 | 6/2012 | Schofield et al. |
| 8,222,588 B2 | 7/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,288,711 B2 | 10/2012 | Heslin et al. |
| 8,289,430 B2 | 10/2012 | Bechtel et al. |
| 8,300,058 B2 | 10/2012 | Navon et al. |
| 8,305,471 B2 | 11/2012 | Bechtel et al. |
| 8,308,325 B2 | 11/2012 | Takayanagi et al. |
| 8,314,689 B2 | 11/2012 | Schofield et al. |
| 8,324,552 B2 | 12/2012 | Schofield et al. |
| 8,325,986 B2 | 12/2012 | Schofield et al. |
| 8,339,526 B2 | 12/2012 | Minikey, Jr. et al. |
| 8,378,851 B2 | 2/2013 | Stein et al. |
| 8,386,114 B2 | 2/2013 | Higgins-Luthman |
| 8,405,726 B2 | 3/2013 | Schofield et al. |
| 8,452,055 B2 | 5/2013 | Stein et al. |
| 8,531,278 B2 | 9/2013 | Deward et al. |
| 8,534,887 B2 | 9/2013 | DeLine et al. |
| 8,538,205 B2 | 9/2013 | Sixsou et al. |
| 8,543,330 B2 | 9/2013 | Taylor et al. |
| 8,553,088 B2 | 10/2013 | Stein et al. |
| 8,637,801 B2 | 1/2014 | Schofield et al. |
| 8,643,724 B2 | 2/2014 | Schofield et al. |
| 8,656,221 B2 | 2/2014 | Sixsou et al. |
| 8,676,491 B2 | 3/2014 | Taylor et al. |
| 8,692,659 B2 | 4/2014 | Schofield et al. |
| 2002/0005778 A1 | 1/2002 | Breed |
| 2002/0011611 A1 | 1/2002 | Huang et al. |
| 2002/0029103 A1 | 3/2002 | Breed et al. |
| 2002/0060522 A1 | 5/2002 | Stam et al. |
| 2002/0080235 A1 | 6/2002 | Jeon |
| 2002/0113873 A1 | 8/2002 | Williams |
| 2002/0116106 A1 | 8/2002 | Breed et al. |
| 2002/0126002 A1 | 9/2002 | Patchell |
| 2002/0126875 A1 | 9/2002 | Naoi et al. |
| 2003/0040864 A1 | 2/2003 | Stein |
| 2003/0070741 A1 | 4/2003 | Rosenberg et al. |
| 2003/0103142 A1 | 6/2003 | Hitomi et al. |
| 2003/0125855 A1 | 7/2003 | Breed et al. |
| 2003/0128106 A1 | 7/2003 | Ross |
| 2003/0137586 A1 | 7/2003 | Lewellen |
| 2003/0209893 A1 | 11/2003 | Breed et al. |
| 2003/0222982 A1 | 12/2003 | Hamdan et al. |
| 2004/0016870 A1 | 1/2004 | Pawlicki et al. |
| 2004/0086153 A1 | 5/2004 | Tsai et al. |
| 2004/0096082 A1 | 5/2004 | Nakai et al. |
| 2004/0146184 A1 | 7/2004 | Hamza et al. |
| 2004/0148063 A1 | 7/2004 | Patchell |
| 2004/0164228 A1 | 8/2004 | Fogg et al. |
| 2004/0200948 A1 | 10/2004 | Bos et al. |
| 2005/0073853 A1 | 4/2005 | Stam |
| 2005/0131607 A1 | 6/2005 | Breed |
| 2005/0219852 A1 | 10/2005 | Stam et al. |
| 2005/0226490 A1 | 10/2005 | Phillips et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0095175 A1 | 5/2006 | deWaal et al. |
| 2006/0103727 A1 | 5/2006 | Tseng |
| 2006/0250224 A1 | 11/2006 | Steffel et al. |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0115357 A1 | 5/2007 | Stein et al. |
| 2007/0120657 A1 | 5/2007 | Schofield et al. |
| 2007/0154063 A1 | 7/2007 | Breed |
| 2007/0154068 A1 | 7/2007 | Stein et al. |
| 2007/0193811 A1 | 8/2007 | Breed et al. |
| 2007/0221822 A1 | 9/2007 | Stein et al. |
| 2007/0229238 A1 | 10/2007 | Boyles et al. |
| 2007/0230792 A1 | 10/2007 | Shashua et al. |
| 2007/0242339 A1 | 10/2007 | Bradley |
| 2008/0036576 A1 | 2/2008 | Stein et al. |
| 2008/0043099 A1 | 2/2008 | Stein et al. |
| 2008/0147321 A1 | 6/2008 | Howard et al. |
| 2008/0234899 A1 | 9/2008 | Breed et al. |
| 2008/0239393 A1 | 10/2008 | Navon |
| 2008/0266396 A1 | 10/2008 | Stein |
| 2009/0052003 A1 | 2/2009 | Schofield et al. |
| 2009/0066065 A1 | 3/2009 | Breed et al. |
| 2009/0113509 A1 | 4/2009 | Tseng et al. |
| 2009/0143986 A1 | 6/2009 | Stein et al. |
| 2009/0182690 A1 | 7/2009 | Stein |
| 2009/0190015 A1 | 7/2009 | Bechtel et al. |
| 2009/0201137 A1 | 8/2009 | Weller et al. |
| 2009/0243824 A1 | 10/2009 | Hook et al. |
| 2009/0256938 A1 | 10/2009 | Bechtel et al. |
| 2009/0300629 A1 | 12/2009 | Navon et al. |
| 2010/0125717 A1 | 5/2010 | Navon |
| 2011/0018700 A1 | 1/2011 | Stein et al. |
| 2011/0219217 A1 | 9/2011 | Sixsou et al. |
| 2011/0280495 A1 | 11/2011 | Sixsou et al. |
| 2011/0307684 A1 | 12/2011 | Kreinin et al. |
| 2012/0002053 A1 | 1/2012 | Stein et al. |
| 2012/0045112 A1 | 2/2012 | Lundblad et al. |
| 2012/0056735 A1 | 3/2012 | Stein et al. |
| 2012/0069185 A1 | 3/2012 | Stein |
| 2012/0105639 A1 | 5/2012 | Stein et al. |
| 2012/0140076 A1 | 6/2012 | Rosenbaum et al. |
| 2012/0200707 A1 | 8/2012 | Stein et al. |
| 2012/0212593 A1 | 8/2012 | Na'aman et al. |

(56) References Cited

U.S. PATENT DOCUMENTS

| | | |
|---|---|---|
| 2012/0233841 A1 | 9/2012 | Stein |
| 2012/0314071 A1 | 12/2012 | Rosenbaum et al. |
| 2013/0135444 A1 | 5/2013 | Stein et al. |
| 2013/0141580 A1 | 6/2013 | Stein et al. |
| 2013/0147957 A1 | 6/2013 | Stein |
| 2013/0169536 A1 | 7/2013 | Wexler et al. |
| 2013/0271584 A1 | 10/2013 | Wexler et al. |
| 2013/0308828 A1 | 11/2013 | Stein et al. |
| 2014/0015976 A1 | 1/2014 | DeLine et al. |
| 2014/0033203 A1 | 1/2014 | Dogon et al. |
| 2014/0049648 A1 | 2/2014 | Stein et al. |
| 2014/0082307 A1 | 3/2014 | Kreinin et al. |
| 2014/0093132 A1 | 4/2014 | Stein et al. |
| 2014/0122551 A1 | 5/2014 | Dogon et al. |
| 2014/0156140 A1 | 6/2014 | Stein et al. |
| 2014/0160244 A1 | 6/2014 | Berberian et al. |
| 2014/0161323 A1 | 6/2014 | Livyatan et al. |
| 2014/0198184 A1 | 7/2014 | Stein et al. |

FOREIGN PATENT DOCUMENTS

| | | |
|---|---|---|
| CA | 2392578 | 11/2000 |
| CA | 2392652 | 11/2000 |
| CH | 6446 A5 | 7/1984 |
| CN | 2074262 U | 4/1991 |
| CN | 2185701 Y | 12/1994 |
| CN | 1104741 A | 7/1995 |
| CN | 2204254 Y | 8/1995 |
| CN | 1194056 | 6/1996 |
| CN | 1235913 | 5/1999 |
| CN | 102193852 | 3/2001 |
| CN | 1383032 | 4/2002 |
| CN | 102542256 | 12/2011 |
| DE | 1152627 | 8/1963 |
| DE | 1182971 | 12/1964 |
| DE | 1190413 | 4/1965 |
| DE | 1196598 | 7/1965 |
| DE | 1214174 | 4/1966 |
| DE | 2064839 | 12/1970 |
| DE | 3004247 | 8/1981 |
| DE | 3040555 A1 | 5/1982 |
| DE | 3101855 | 8/1982 |
| DE | 3240498 | 11/1982 |
| DE | 3248511 | 7/1984 |
| DE | 3433671 A1 | 3/1985 |
| DE | 3515116 A1 | 10/1986 |
| DE | 3528220 A1 | 2/1987 |
| DE | 3601388 | 7/1987 |
| DE | 3637165 | 5/1988 |
| DE | 3636946 A1 | 6/1988 |
| DE | 3642196 A1 | 6/1988 |
| DE | 4015959 A1 | 6/1988 |
| DE | 3734066 A1 | 4/1989 |
| DE | 3737395 A1 | 5/1989 |
| DE | 3937576 | 11/1989 |
| DE | 3833022 | 4/1990 |
| DE | 3839512 | 5/1990 |
| DE | 3839513 | 5/1990 |
| DE | 3840425 | 6/1990 |
| DE | 3844364 | 7/1990 |
| DE | 9010196 | 9/1990 |
| DE | 3932216 A1 | 4/1991 |
| DE | 4007646 A | 9/1991 |
| DE | 4107965 | 9/1991 |
| DE | 4111993 | 10/1991 |
| DE | 4116255 | 12/1991 |
| DE | 4023952 A1 | 2/1992 |
| DE | 4130010 | 3/1992 |
| DE | 4032927 A1 | 4/1992 |
| DE | 4133882 | 4/1992 |
| DE | 4035956 A1 | 5/1992 |
| DE | 4122531 | 1/1993 |
| DE | 4124654 | 1/1993 |
| DE | 4300941 | 7/1993 |
| DE | 4206142 A1 | 9/1993 |
| DE | 4137551 | 11/1993 |
| DE | 4214223 A1 | 11/1993 |
| DE | 4231137 | 2/1994 |
| DE | 4328304 | 3/1994 |
| DE | 4328902 A1 | 3/1994 |
| DE | 4332612 | 4/1994 |
| DE | 4238599 | 6/1994 |
| DE | 4337756 A1 | 6/1994 |
| DE | 4332836 | 9/1994 |
| DE | 4407082 | 9/1994 |
| DE | 4407757 | 9/1994 |
| DE | 4411179 | 10/1994 |
| DE | 4412669 | 10/1994 |
| DE | 4418122 | 12/1994 |
| DE | 4446452 | 12/1994 |
| DE | 4423966 | 1/1995 |
| DE | 4336288 | 3/1995 |
| DE | 4428069 | 3/1995 |
| DE | 4434698 | 3/1995 |
| DE | 4341409 | 6/1995 |
| DE | 69107283 | 7/1995 |
| DE | 19518978 | 11/1995 |
| DE | 4480341 | 3/1996 |
| DE | 29703084 | 4/1997 |
| DE | 29805142 U1 | 5/1998 |
| DE | 19829162 A1 | 6/1998 |
| DE | 19755008 A1 | 7/1999 |
| DE | 19530617 B4 | 2/2009 |
| EP | 0049722 | 10/1980 |
| EP | 0048492 | 9/1981 |
| EP | 0072406 A2 | 2/1983 |
| EP | 0348691 | 6/1989 |
| EP | 0354561 | 8/1989 |
| EP | 169734 | 10/1989 |
| EP | 0340735 A2 | 11/1989 |
| EP | 0353200 | 1/1990 |
| EP | 0387817 | 3/1990 |
| EP | 0360880 A1 | 4/1990 |
| EP | 0527665 | 2/1991 |
| EP | 0450553 | 4/1991 |
| EP | 0426503 | 5/1991 |
| EP | 0433538 A2 | 6/1991 |
| EP | 0202460 | 10/1991 |
| EP | 0454516 | 10/1991 |
| EP | 0479271 | 10/1991 |
| EP | 0455524 | 11/1991 |
| EP | 0487332 | 11/1991 |
| EP | 0387817 | 12/1991 |
| EP | 0477986 | 4/1992 |
| EP | 0487100 | 5/1992 |
| EP | 0487465 A1 | 5/1992 |
| EP | 0492591 | 7/1992 |
| EP | 0495508 | 7/1992 |
| EP | 0496411 | 7/1992 |
| EP | 0501345 A2 | 9/1992 |
| EP | 0505237 | 9/1992 |
| EP | 0513476 | 11/1992 |
| EP | 0514343 | 11/1992 |
| EP | 0361914 | 2/1993 |
| EP | 0532379 A1 | 3/1993 |
| EP | 0533508 A2 | 3/1993 |
| EP | 0830267 | 5/1993 |
| EP | 0550397 A1 | 7/1993 |
| EP | 0558027 A1 | 9/1993 |
| EP | 0564858 A2 | 10/1993 |
| EP | 0567059 A1 | 10/1993 |
| EP | 0606586 | 12/1993 |
| EP | 0582236 | 2/1994 |
| EP | 0586857 A1 | 3/1994 |
| EP | 0586857 A1 | 3/1994 |
| EP | 0588815 A1 | 3/1994 |
| EP | 0590588 A1 | 4/1994 |
| EP | 0591743 A1 | 4/1994 |
| EP | 0605045 | 7/1994 |
| EP | 0617296 | 9/1994 |
| EP | 0626654 | 11/1994 |
| EP | 0640903 | 3/1995 |
| EP | 0642950 | 3/1995 |

(56) References Cited

FOREIGN PATENT DOCUMENTS

| | | |
|---|---|---|
| EP | 0654392 | 5/1995 |
| EP | 0341985 | 7/1995 |
| EP | 0667708 A1 | 8/1995 |
| EP | 0686865 | 12/1995 |
| EP | 0697641 | 2/1996 |
| EP | 756968 | 2/1997 |
| EP | 0788947 | 8/1997 |
| EP | 0487332 | 10/1997 |
| EP | 0874331 | 3/1998 |
| EP | 0874331 A2 | 3/1998 |
| EP | 677428 | 6/1998 |
| EP | 0677428 B1 | 6/1998 |
| EP | 0893308 A2 | 7/1998 |
| EP | 0899157 | 8/1998 |
| EP | 0913751 A1 | 10/1998 |
| EP | 0949818 | 10/1999 |
| EP | 1022903 | 7/2000 |
| EP | 1236126 | 11/2000 |
| EP | 1257971 | 11/2000 |
| EP | 1727089 | 11/2000 |
| EP | 1058220 A1 | 12/2000 |
| EP | 1074430 | 2/2001 |
| EP | 860325 | 11/2002 |
| EP | 1359557 A1 | 5/2003 |
| EP | 1741079 | 1/2005 |
| EP | 2068269 | 1/2005 |
| EP | 1754179 | 4/2005 |
| EP | 1748644 | 7/2006 |
| EP | 1790541 | 11/2006 |
| EP | 1806595 | 11/2006 |
| EP | 1837803 | 3/2007 |
| EP | 1978484 | 4/2007 |
| EP | 1887492 | 8/2007 |
| EP | 1930863 | 12/2007 |
| EP | 2383679 | 12/2007 |
| EP | 2383713 | 12/2007 |
| EP | 2101258 | 3/2008 |
| EP | 2150437 | 4/2008 |
| EP | 2674323 A1 | 4/2008 |
| EP | 0889801 | 7/2008 |
| EP | 2131278 | 3/2009 |
| EP | 2187316 | 3/2009 |
| EP | 2172873 | 10/2009 |
| EP | 2365441 | 3/2010 |
| EP | 2395472 | 6/2010 |
| EP | 2431917 | 9/2011 |
| EP | 2448251 | 10/2011 |
| EP | 2463843 | 12/2011 |
| EP | 2690548 | 7/2012 |
| EP | 2602741 | 12/2012 |
| EP | 2605185 | 12/2012 |
| EP | 2629242 | 2/2013 |
| EP | 2709020 | 9/2013 |
| EP | 2728462 | 10/2013 |
| ES | 2250218 | 11/2000 |
| FR | 2610401 | 8/1988 |
| FR | 2646383 A1 | 11/1990 |
| FR | 2674201 A1 | 9/1992 |
| FR | 2674354 A1 | 9/1992 |
| FR | 2687000 | 8/1993 |
| FR | 2706211 A1 | 12/1994 |
| FR | 2721872 A1 | 1/1996 |
| GB | 914827 | 1/1963 |
| GB | 1000265 | 8/1965 |
| GB | 1008411 | 10/1965 |
| GB | 1054064 | 1/1967 |
| GB | 1098608 | 1/1968 |
| GB | 1106339 A | 3/1968 |
| GB | 1178416 | 1/1970 |
| GB | 1197710 | 7/1970 |
| GB | 2210835 | 6/1989 |
| GB | 2233530 | 9/1991 |
| GB | 2255649 A | 11/1992 |
| GB | 2261339 A | 5/1993 |
| GB | 2262829 A | 6/1993 |
| GB | 227139 A | 4/1994 |
| GB | 2280810 A | 2/1995 |
| GB | 2289332 A | 11/1995 |
| JP | S5539843 | 3/1980 |
| JP | S5871230 A | 4/1983 |
| JP | 58110334 | 6/1983 |
| JP | S58122421 A | 7/1983 |
| JP | 59114139 | 7/1984 |
| JP | S59127200 A | 7/1984 |
| JP | S6047737 A | 3/1985 |
| JP | 6079889 | 5/1985 |
| JP | 6080953 | 5/1985 |
| JP | S6078312 A | 5/1985 |
| JP | S60206746 A | 10/1985 |
| JP | 60240545 | 11/1985 |
| JP | S60219133 A | 11/1985 |
| JP | S60255537 A | 12/1985 |
| JP | S6141929 A | 2/1986 |
| JP | S6185238 A | 4/1986 |
| JP | S61105245 A | 5/1986 |
| JP | S61191937 A | 8/1986 |
| JP | S61285151 A | 12/1986 |
| JP | S61285152 A | 12/1986 |
| JP | S6221010 A | 1/1987 |
| JP | S6226141 A | 2/1987 |
| JP | 6216073 | 4/1987 |
| JP | S6280143 A | 4/1987 |
| JP | 6272245 | 5/1987 |
| JP | S62115600 | 5/1987 |
| JP | 62131837 | 6/1987 |
| JP | S62253543 A | 11/1987 |
| JP | S62253546 A | 11/1987 |
| JP | S62287164 A | 12/1987 |
| JP | 6311446 | 1/1988 |
| JP | 63258236 | 10/1988 |
| JP | 63258237 | 10/1988 |
| JP | S63192788 U | 12/1988 |
| JP | 6414700 | 1/1989 |
| JP | 01123587 | 5/1989 |
| JP | H01233129 A | 9/1989 |
| JP | H01265400 A | 10/1989 |
| JP | H01275237 A | 11/1989 |
| JP | H0268237 A | 3/1990 |
| JP | 02190978 | 7/1990 |
| JP | H236417 | 8/1990 |
| JP | H02212232 A | 8/1990 |
| JP | H04137112 | 9/1990 |
| JP | H0314739 A | 1/1991 |
| JP | H0374231 A | 3/1991 |
| JP | 3099952 | 4/1991 |
| JP | H399952 | 4/1991 |
| JP | 03266739 | 11/1991 |
| JP | 04239400 | 11/1991 |
| JP | H03246413 A | 11/1991 |
| JP | 3286399 A | 12/1991 |
| JP | H03273953 A | 12/1991 |
| JP | H03282707 A | 12/1991 |
| JP | H03282709 A | 12/1991 |
| JP | H042909 A | 1/1992 |
| JP | H0410200 A | 1/1992 |
| JP | 4114587 | 4/1992 |
| JP | 04127280 | 4/1992 |
| JP | O4127280 | 4/1992 |
| JP | 4137014 A | 5/1992 |
| JP | H04194827 | 7/1992 |
| JP | H04238219 A | 8/1992 |
| JP | H04242391 A | 8/1992 |
| JP | H04250786 A | 9/1992 |
| JP | 4291405 | 10/1992 |
| JP | H04303047 A | 10/1992 |
| JP | H0516722 A | 1/1993 |
| JP | H06229759 | 2/1993 |
| JP | 0577657 | 3/1993 |
| JP | 05050883 | 3/1993 |
| JP | H06332370 | 5/1993 |
| JP | H05155287 A | 6/1993 |
| JP | 5189694 | 7/1993 |
| JP | H05172638 A | 7/1993 |
| JP | 5213113 | 8/1993 |

(56) References Cited

FOREIGN PATENT DOCUMENTS

| | | |
|---|---|---|
| JP | H05201298 A | 8/1993 |
| JP | 05244596 | 9/1993 |
| JP | H05229383 A | 9/1993 |
| JP | 5298594 A | 11/1993 |
| JP | 5313736 A | 11/1993 |
| JP | H05297141 A | 11/1993 |
| JP | 06000927 | 1/1994 |
| JP | H0640286 A | 2/1994 |
| JP | H0648247 A | 2/1994 |
| JP | H0672234 A | 3/1994 |
| JP | H0676200 A | 3/1994 |
| JP | 06107035 | 4/1994 |
| JP | O6117924 | 4/1994 |
| JP | 06150198 | 5/1994 |
| JP | H06162398 | 6/1994 |
| JP | H06174845 A | 6/1994 |
| JP | H06191344 A | 7/1994 |
| JP | 6227318 | 8/1994 |
| JP | 06230115 | 8/1994 |
| JP | H06215291 A | 8/1994 |
| JP | H06229739 A | 8/1994 |
| JP | 06247246 | 9/1994 |
| JP | 6266825 A | 9/1994 |
| JP | 06267304 | 9/1994 |
| JP | 06270733 | 9/1994 |
| JP | 06274626 | 9/1994 |
| JP | 06276524 | 9/1994 |
| JP | H06262963 A | 9/1994 |
| JP | H06267303 A | 9/1994 |
| JP | H06275104 A | 9/1994 |
| JP | 06295601 | 10/1994 |
| JP | H06289138 A | 10/1994 |
| JP | H06293236 A | 10/1994 |
| JP | 05093981 | 11/1994 |
| JP | H06321010 A | 11/1994 |
| JP | H06324144 A | 11/1994 |
| JP | H06337938 A | 12/1994 |
| JP | H06341821 A | 12/1994 |
| JP | 07004170 | 1/1995 |
| JP | 07025286 | 1/1995 |
| JP | 07242147 | 1/1995 |
| JP | H072021 A | 1/1995 |
| JP | H072022 A | 1/1995 |
| JP | 732936 | 2/1995 |
| JP | 7032935 | 2/1995 |
| JP | 7047878 | 2/1995 |
| JP | 7052706 | 2/1995 |
| JP | 08235484 | 2/1995 |
| JP | H0737180 A | 2/1995 |
| JP | H0740782 A | 2/1995 |
| JP | H0746460 A | 2/1995 |
| JP | 7069125 | 3/1995 |
| JP | H0757200 A | 3/1995 |
| JP | H0764632 A | 3/1995 |
| JP | H0771916 A | 3/1995 |
| JP | 07105496 | 4/1995 |
| JP | H07101291 A | 4/1995 |
| JP | H07105487 A | 4/1995 |
| JP | H07108873 A | 4/1995 |
| JP | H07108874 A | 4/1995 |
| JP | 3395289 B2 | 5/1995 |
| JP | 7125571 | 5/1995 |
| JP | 7137574 | 5/1995 |
| JP | H07125570 A | 5/1995 |
| JP | H07141588 A | 6/1995 |
| JP | H07144577 A | 6/1995 |
| JP | 7186818 | 7/1995 |
| JP | 7192192 A | 7/1995 |
| JP | H07249128 A | 9/1995 |
| JP | H08320997 | 9/1995 |
| JP | H07280563 A | 10/1995 |
| JP | 06113215 | 12/1995 |
| JP | H07315122 A | 12/1995 |
| JP | H0840138 A | 2/1996 |
| JP | H0840140 A | 2/1996 |
| JP | H0843082 A | 2/1996 |
| JP | H0844999 A | 2/1996 |
| JP | H0850697 A | 2/1996 |
| JP | 8138036 | 5/1996 |
| JP | 08166221 | 6/1996 |
| JP | 06321007 | 7/1996 |
| JP | 07078240 | 9/1996 |
| JP | H10090188 | 9/1996 |
| JP | H07239714 | 12/1996 |
| JP | 2630604 | 4/1997 |
| JP | H0991596 A | 4/1997 |
| JP | H1178693 | 9/1997 |
| JP | 09330415 | 12/1997 |
| JP | H10090188 | 1/1998 |
| JP | 10038562 | 2/1998 |
| JP | 10063985 | 3/1998 |
| JP | 10134183 | 5/1998 |
| JP | 10171966 | 6/1998 |
| JP | H10222792 | 8/1998 |
| JP | 10261189 | 9/1998 |
| JP | 2000085474 | 9/1998 |
| JP | 2000207575 | 1/1999 |
| JP | 11069211 | 3/1999 |
| JP | H1178717 | 3/1999 |
| JP | H1178737 A | 3/1999 |
| JP | H1123305 | 7/1999 |
| JP | 11250228 | 9/1999 |
| JP | H11259634 | 9/1999 |
| JP | 11345392 | 12/1999 |
| JP | 2000113374 A | 4/2000 |
| JP | 2000127849 A | 5/2000 |
| JP | 2000215299 A | 8/2000 |
| JP | 2000311289 A | 11/2000 |
| JP | 2001001832 A | 1/2001 |
| JP | 2001092970 A | 4/2001 |
| JP | 2001180401 A | 7/2001 |
| JP | 2001188988 A | 7/2001 |
| JP | 200129797 A | 10/2001 |
| JP | 2001351107 A | 12/2001 |
| JP | 2002022439 A | 1/2002 |
| JP | 2002046506 A | 2/2002 |
| JP | 200274339 | 3/2002 |
| JP | 2002079895 A | 3/2002 |
| JP | 2002099908 A | 4/2002 |
| JP | 2002109699 A | 4/2002 |
| JP | 20021755534 A | 6/2002 |
| JP | 2002211428 A | 7/2002 |
| JP | 2003030665 A | 1/2003 |
| JP | 2003076987 A | 3/2003 |
| JP | 2003076987 A | 3/2003 |
| JP | 2003083742 | 3/2003 |
| JP | 2003123058 | 4/2003 |
| JP | 2003150938 A | 5/2003 |
| JP | 2003168197 A | 6/2003 |
| JP | 2003178397 | 6/2003 |
| JP | 2003217099 A | 7/2003 |
| JP | 2003248895 A | 9/2003 |
| JP | 2003259361 A | 9/2003 |
| JP | 2003281700 A | 10/2003 |
| JP | 20041658 | 1/2004 |
| JP | 2004032460 A | 1/2004 |
| JP | 2004146904 | 5/2004 |
| JP | 2004336613 A | 11/2004 |
| JP | 2004355139 | 12/2004 |
| KR | 2000883510000 | 6/1993 |
| KR | 1020010018981 | 4/2001 |
| KR | 412434 B1 | 3/2004 |
| SE | 336535 | 4/1970 |
| WO | WO8605147 | 9/1986 |
| WO | WO8809023 A1 | 11/1988 |
| WO | WO 90/04528 | 5/1990 |
| WO | WO9300647 A2 | 1/1993 |
| WO | WO9310550 A1 | 5/1993 |
| WO | WO9321596 A1 | 10/1993 |
| WO | WO9419212 | 2/1994 |
| WO | WO9518979 A1 | 7/1995 |
| WO | WO9523082 | 8/1995 |
| WO | WO9602817 A1 | 2/1996 |
| WO | WO9634365 | 4/1996 |

(56) References Cited

FOREIGN PATENT DOCUMENTS

| WO | WO9615921 | 5/1996 |
|---|---|---|
| WO | WO9621581 | 7/1996 |
| WO | WO9638319 | 12/1996 |
| WO | WO9701246 A1 | 1/1997 |
| WO | WO9729926 A1 | 8/1997 |
| WO | WO9810246 | 9/1997 |
| WO | WO9748134 | 12/1997 |
| WO | WO9923828 | 5/1999 |
| WO | WO9959100 | 5/1999 |
| WO | WO9943242 A1 | 9/1999 |
| WO | WO0015462 A1 | 3/2000 |
| WO | WO0039120 | 11/2000 |
| WO | WO0164481 | 2/2001 |
| WO | WO0180068 | 4/2001 |
| WO | WO0139018 | 5/2001 |
| WO | WO0164481 | 9/2001 |
| WO | WO0126332 | 12/2001 |
| WO | WO02071487 A1 | 9/2002 |
| WO | WO03/093857 | 11/2003 |
| WO | WO03093857 | 11/2003 |
| WO | WO2004004320 | 1/2004 |
| WO | WO2004005073 | 1/2004 |
| WO | WO2005098782 | 1/2005 |
| WO | WO2005098751 | 4/2005 |
| WO | WO2008134715 | 4/2008 |
| WO | WO2013121357 | 2/2013 |

OTHER PUBLICATIONS

Auty 1995; Mar. 14, 1995; Auty et al.; "Image acquisition system for traffic monitoring applications".
Barron—1996 ; Mar. 1996; Barron et al.;"The role of electronic controls for future automotive mechatronic systems".
Behringer et al., "Simultaneous Estimation of Pitch Angle and Lane Width from the Video Image of a Marked Road," pp. 966-973, Sep. 12-16, 1994.
Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Cassiano—1992 ; Feb. 14, 1992; Cassiano et al.; "Review of filtering methods in mobile vision from ground vehicles in low light conditions".
Crisman et al., "UNSCARF, A Color Vision System for the Detection of Unstructured Roads" IEEE Paper 1991.
Cucchiara et al., Vehicle Detection under Day and Night Illumination, 1999.
De la Escalera et al, 1994 "Neural traffic sign recognition for autonomous vehicles".
Dickmanns et al., "A Curvature-based Scheme for Improving Road Vehicle Guidance by Computer Vision," University of Bundeswehr München, 1986.
Dickmanns et al., "Recursive 3-D road and relative ego-state recognition," IEEE Transactions on Pattern Analysis and Machine Intelligence, vol. 14, No. 2, Feb. 1992.
Dickmanns et al.; "An integrated spatio-temporal approach to automatic visual guidance of autonomous vehicles," IEEE Transactions on Systems, Man, and Cybernetics, vol. 20, No. 6, Nov./Dec. 1990.
Dickmanns, "4-D dynamic vision for intelligent motion control", Universitat der Bundeswehr Munich, 1991.
Donnelly Panoramic Vision™ on Renault Talisman Concept Car at Frankfort Motor Show, PR Newswire, Frankfort, Germany Sep. 10, 2001.
Dubuisson-Jolly 1996; Mar. 1996; Dubuisson-Jolly ;"Vehicle segmentation and classification using deformable templates".
Fossum—1995; Oct. 11, 1995; Fossum; "Low power camera-on-a-chip using CMOS active pixel sensor technology".
Franke et al., "Autonomous driving approaches downtown", Intelligent Systems and Their Applications, IEEE 13 (6), 40-48, Nov./Dec. 1999.
Honda Worldwide, "Honda Announces a Full Model Change for the Inspire." Jun. 18, 2003.
Huijsing—1992 ; 1992; Huijsing; "Integrated smart sensors".
Ichiro Masaki , Vision-based vehicle guidance, Springer-Verlag, New York, 1992.
IEEE Paper 1987; McTamaney, "Mobile Robots Real-Time Intelligent Control".
IEEE Paper 1991; Thorpe, at al, "Toward autonomous driving: the CMU Navlab. I. Perception".
IEEE Paper 1993, Charkari et al., "A new approach for real time moving vehicle detection".
Industrial Electronics, Control, Instrumentation, and Automation, 1992. Power Electronics and Motion Control., Proceedings of the 1992 International Conference on Date of Conference: Nov. 9-13, 1992.
Jochem 1995; Sep. 26, 1995; Jochem et al.; "PANS: a portable navigation platform".
Kan et al., "Model-based vehicle tracking from image sequences with an application to road surveillance," Purdue University, XP000630885, vol. 35, No. 6, Jun. 1996.
Kehtarnavaz et al, 1995, "Traffic sign recognition in noisy outdoor scenes".
Kidd et al., Speed Over Ground Measurement, Sae Technical Paper Series, No. 910272, pp. 29-36 (Feb.-Mar. 1991).
Koller et al., "Binocular Stereopsis and Lane Marker Flow for Vehicle Navigation: Lateral and Longitudinal Control," University of California, Mar. 24, 1994.
Kuehnle 1991; Kuehnle; Apr. 1991; Symmetry-based recognition of vehicle rears.
Kuhnert, "A vision system for real time road and object recognition for vehicle guidance," in Proc. SPIE Mobile Robot Conf, Cambridge, MA, Oct. 1986, pp. 267-272.
Lee 1994; Nov. 16, 1994 ; Lee et al.; "Automatic recognition of a car license plate using color image processing".
Linkwitz, K., High Precision Navigation: Integration of Navigational and Geodetic Methods, Springer-Verlag, Jul. 5, 1989.
Lucas Demonstrates Intelligent Cruise Control, Detroit Feb. 27, 1995 available at http://www.thefreelibrary.com/LUCAS+DEMONSTRATES+INTELLIGENT+CUISE+CONTROL=a016602459.
M.A. Arain et al., Action planning for the collision avoidance system using neural networks, Intelligent Vehicle Symposium, Tokyo, Japan (Jul. 1993).
M.A. Arain et al., Application of Neural Networks for Traffic Scenario Identification, 4th Prometheus Workshop, University of Compiegne, Paris, France, pp. 102-111 (Sep. 1990).
Malik et al., "A Machine Vision Based System for Guiding Lane-change Maneuvers," Sep. 1995.
Manigel, J. "Vehicle control by computer vision," Industrial Electronics, IEEE Transactions on, Jun. 1992 v. 39 issue 3, 181-188.
Manigel, W Leonhard, "Computer control of an autonomous road vehicle by computer vision"—Industrial Electronics, Control and Instrumentation, 1991. Proceedings. IECON '91., 1991 International Conference on, p. 19-24 vol. 1.
Matthews, N.D., "Visual Collision Avoidance," Oct., 1994, University of Southampton, PhD submission.
Mei Chen et al., AURORA: A Vision-Based Roadway Departure Warning System, The Robotics Institute, Carnegie Mellon University, published Aug. 9, 1995.
Mendis et al.; "A 128×128 CMOS active pixel image sensor for highly integrated imaging systems", Dec. 8, 1993.
Morgan et al., "Road edge tracking for robot road following: a real-time implementation," vol. 8, No. 3, Aug. 1990.
Nguyen, HG et al., "Obstacle detection using bi-spectrum CCD camera and image processing", Proceedings of the Intelligent Vehicles '92 Symposium, Jun. 29-Jul. 1, 1992, p. 42-50.

(56) References Cited

OTHER PUBLICATIONS

Nixon et al.; "128×128 CMOS Photodiode-Type Active Pixel Sensor With On-Chip Timing, Control and Signal Chain Electronics" 1995.
P.E. An et al., Aspects of Neural Networks in Intelligent Collision Avoidance Systems for Prometheus, JFIT 93, pp. 129-135 (Mar. 1993).
Pacaud et al., Ground Speed Sensing, Lucas International Symposium, Paris, France (1989).
Page et al., Advanced technologies for collision avoidance, Eureka on Campus (Summer 1992).
Paper from Society of Automotive Engineers, Inc. 1988; Metzler, "Computer Vision Applied to Vehicle Operation".
Parker (ed.), McGraw-Hill Dictionary of Scientific and Technical Terms Fifth Edition (1993).
Piccioli et al, 1994 "Robust road sign detection and recognition from image sequences".
Pratt, "Digital Image Processing, Passage—ED.3", John Wiley & Sons, US, Jan. 1, 2001, pp. 657-659, XP002529771.
R.H. Tribe et al., Collision Avoidance, Lucas International Symposium, Paris, France (1989).
R.H. Tribe et al., Collision Warning, Autotech '93, Seminar 9, NEC Birmingham, UK (Nov. 1993).
R.H. Tribe, Collision Avoidance, Advances, Issue No. 4, May 1990.
R.H. Tribe, Intelligent Autonomous Systems for Cars, Advanced Robotics and Intelligent Machines, Peter Peregrinus (Nov. 1994).
Raglan Tribe Video—1994 ; 1994; Raglan Tribe; "Robot Car Raglan Tribe" http://www.youtube.com/watch?v=AILZhcnpXYI.
Reexamination Control No. 90/007,519, dated Jun. 9, 2005, Reexamination of U.S. Patent No. 6,222,447, issued to Schofield et al.
Reexamination Control No. 90/007,520, dated Jun. 9, 2005, Reexamination of U.S. Patent No. 5,949,331, issued to Schofield et al.
Reexamination Control No. 90/011,477, dated Mar. 14, 2011, Reexamination of U.S. Patent No. 5,949,331, issued to Schofield et al.
Reexamination Control No. 90/011,478, dated Mar. 28, 2011, Reexamination of U.S. Patent No. 6,222,447, issued to Schofield et al.
Ritter 1995; Oct. 1995; Ritter et al.;"Traffic sign recognition using colour information".
Roberts, J.M., "Attentive Visual Tracking and Trajectory Estimation for Dynamic Scene Segmentation," Dec. 1994, University of Southampton, PhD submission.
Sahli et al., "A Kalman Filter-Based Update Scheme for Road Following," IAPR Workshop on Machine Vision Applications, pp. 5-9, Nov. 12-14, 1996.
Schwarzinger 1992; Jul. 1, 1992; Schwarzinger et al.; "Vision-based car-following: detection, tracking, and identification".
Shirai, 1985, "Future Generation Computer Systems".
Siegle, G. "Autonomous Driving on a Road Network," Proceedings of the Intelligent Vehicles '92 Symposium Detroit, Michigan, ISBN 0-7803-0747-X; Jun. 29-Jul. 1, 1992.
Smith et al.; "Optical sensors for automotive applications" May 11, 1992.
Smith et al.; "Vision sensing for intelligent vehicle and highway systems" Oct. 5, 1994.
Stengel, et al., 1989, "Intelligent Guidance for Headway and Lane Control".
Sukthankar 1992; Oct. 1992; Sukthankar; "RACCOON: A Real-time Autonomous Car Chaser Operating Optimally at Night".
Taktak 1994; Nov. 16, 1995; Taktak et al.; "Vehicle detection at night using image processing and pattern recognition".
Technical Report AIP-77 Department of Psychology, Carnegie Mellon University; Mar. 13, 1990; Pomerleau; "Alvinn: An Autonomous Land Vehicle in a Neural Network".
Thomanek et al.; "Multiple object recognition and scene interpretation for autonomous road vehicle guidance" Oct. 1994.
Thorpe, at al, Vision and Navigation for the Carnegie-Mellon Navlab, IEEE Paper 1988.
Tokimaru et al., "CMOS Rear-View TV System with CCD Camera", National Technical Report vol. 34, No. 3, pp. 329-336, Jun. 1988 (Japan).
Toyota Motor Corporation, "Present and future of safety technology development at Toyota." 2004.
Tsugawa et al., "An automobile with artificial intelligence," in Proc. Sixth IJCAI, 1979.
Turk et al., "VITS—A Vision System for Autonomous Land Vehicle Navigation," IEEE, 1988.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Van Leeuwen et al., "Requirements for Motion Estimation in Image Sequences for Traffic Applications", IEEE, 2000, pp. 354-359, XP002529773.
Vellacott, Oliver, "CMOS in Camera," IEE Review, pp. 111-114 (May 1994).
Vlacic et al., (Eds), "Intelligent Vehicle Tecnologies, Theory and Applications", Society of Automotive Engineers Inc., edited by SAE International, 2001.
Vosselman 1995; 1995; Vosselman et al.; "Road tracking by profile matching and Kalman filtering".
Wang et al., CMOS Video Cameras, article, 1991, 4 pages, University of Edinburgh, UK.
Yeh et al., 1994, "Image-Based Dynamic Measurement for Vehicle Steering Control".
Yu et al.; "Vehicles Recognition by Video Camera" 1995.
Yu, X., Road tracking, lane segmentation and obstacle recognition by mathematical morphology, Intelligent Vehicles '92 Symposium, Proceedings of the, p. 166-172.
Zheng et al., "An Adaptive System for Traffic Sign Recognition," IEEE Proceedings of the Intelligent Vehicles '94 Symposium, pp. 165-170 (Oct. 1994).
"Head-Up Display (HUD) Systems" iCar Advantage, vol. VI, No. 6 (NB pp. 6-15 not relevant), Nov. 12, 1993, pp. 1-5.
3D Reconstruction from Tangent-of-Sight Measurements of a Moving Object Seen from a Moving Camera, Segal, D. and Shashua, A., European Conference on Computer Vision (ECCV), Jun. 2000, Dublin, Ireland, pp. 220-234.
3M, "Automotive Rear View Mirror Button Repair System", Jun. 1996.
A Computer Vision System on a Chip: a case study from the automotive domain, Stein et al., IEEE Computer Society Conference on Computer Vision and Pattern Recognition, 2005.
A Geometric Invariant for Visual Recognition and 3D Reconstruction from Two Perspective/Orthographic Views, Shashua, A., Proceedings of the IEEE 2nd Qualitative Vision Workshop, Jun. 1993, New York, NY, pp. 107-117.
A Parallel Decomposition Solver for SVM: Distributed Dual Ascend using Fenchel Duality, Hazan, T., Man, A. and Shashua, A., Conf. on Computer Vision and Pattern Recognition (CVPR), Jun. 2008, Anchorage, Alaska.
A robust method for computing vehicle ego-motion, Stein et al., Proceedings of the IEEE Intelligent Vehicles Symposium, 2000.
A Unifying Approach to Hard and Probabilistic Clustering, Zass, R. and Shashua, A., International Conference on Computer Vision (ICCV), Beijing, China, Oct. 2005.
Accurate Internal Camera Calibration using Rotation, with Analysis of Sources of Error, G.P. Stein, Fifth International Conference on Computer Vision, 1995.
Affine 3-D Reconstruction from Two Projective Images of Independently Translating Planes, Wolf, L. and Shashua, A., International Conference on Computer Vision (ICCV), Jul. 2001, Vancouver, Canada, pp. 238-244.
Algebraic Functions for Recognition, Shashua, A., IEEE Transactions on Pattern Analysis and Machine Intelligence (PAMI) vol. 17(8), 1995 pp. 779-789.

(56) References Cited

OTHER PUBLICATIONS

Ambiguity from Reconstruction From Images of Six Points, Maybank, S. and Shashua, A., International Conference on Computer Vision (ICCV), Jan. 1998, Bombay India, pp. 703-708.
Ashly Steven, "Smart Cars and Automated Highways", 1998.
Aufrere, R., et al. "A model-driven approach for real-time road recognition" Machine Vision and Applications 13, 2001 pp. 95-107.
Batavia, et al., "Overtaking vehicle detection using implicit optical flow", 1997.
Behringer, "Road recognition from multifocal vision", 1994, pp. 302-307.
Bensrhair, A., et al. "A cooperative approach to vision-based vehicle detection" Intelligent Transportation Systems, 1999. Proc., 10/5-08-1999, pp. 207-212.
Bertozzi, et al., "GOLD: a parallel real-time stereo vision system for generic obstacle and lane detection", 1998.
Bertozzi, M., et al, "Obstacle and lane detection on ARGO" IEEE Transactions on Image Processing, 7(1):62-81, Jan. 1998, pp. 62-81.
Bertozzi, M., et al. "Performance analysis of a low-cost solution to vision-based obstacle detection" Intelligent Transportation Systems, 1999. Proc., Oct. 5-8, 1999, pp. 350-355.
Bertozzi, M., et al."Vision-based intelligent vehicles: State of the art and perspectives" Robotics and Autonomous Systems, 32, 2000 pp. 1-16.
Broggi, "Vision-based Road Detection in Automotive Systems: A real-time expectation-driven approach", 1995.
Broggi, A., et al. "ARGO and the MilleMiglia in Automatico Tour" IEEE Intelligent Systems, Jan.-Feb. 1999 pp. 55-64.
Broggi, et al., "Architectural Issues on Vision-based automatic vehicle guidance: The experience of the ARGO Project", 2000.
Bucher, et al., "Image processing and behavior planning for intelligent vehicles", 2003.
Burkard Wordenweber, "Driver assistance through lighting", 2001.
C. Sawyer; "Collision Avoidance", Jan. 1993.
Cardiles, N. "Implementation de la commande d'un vehicule electrique autonome grace a un capteur de distance et d'angle base sur une camera lineaire" IUP de Mathematiques Appliquees et Industrielles, May 8, 1998.
Challenges and solutions for Bundling Multiple DAS Applications on a Single Hardware Platform for V.I.S.I. O.N, 2011.
Coifman, et al., A real-time computer vision system for vehicle tracking and traffic surveillance, 1998.
Convergent Message-Passing Algorithms for reference over General Graphs with Convex Free Energies, Hazen, T. and Shashua, A., Conf. on Uncertainty in AI (UAI), Helsinki, Jul. 2008.
Crossland, "Beyond Enforcement: In-Car Video Keeps Officers on the Streets", 1998.
Curry et al., "The Lancashire telemedicine ambulance" Dec. 1, 1998.
De la Escalera et al., "Traffic sign recognition and analysis for intelligent vehicles", 2003.
Dingus, T., et al. "TRA VTEK Evaluation Task C3—Camera Car Study" Final Report/ Sep. 1992 to May 1994. Jun. 1995.
Direct estimation o. f motion and extended scene structure from a moving stereo rig, Stein et al., IEEE Computer Society Conference on Computer Vision and Pattern Recognition, 1998.
Direct Estimation of Motion and Extended Scene Structure from a Moving Stereo Rig, Stein, G. and Shashua, A., IEEE Conference on Computer Vision and Pattern Recognition (CVPR), Jun. 1998, pp. 211-218.
Direct Methods for Estimation of Structure and Motion from three views, Stein et al., A.I. Memo No. 1594, Nov. 1998.
Doubly Stochastic Normalization for Spectral Clustering, Zass, R. and Shashua, A., Advances in Neural Information Processing Systems (NIPS), Vancouver, Canada, Dec. 2008.
Dr. Manzoor Arain, et al., "Application of Neural Networks for Traffic Scenario Identification", Sep. 1990.
Draves, "A Video Graphics Controller for Reconfigurabie Automotive Displays", Feb. 24, 1997.
Duality of multi-point and multi-frame geometry: Fundamental shape matrices and tensors, Weinshall, D. and Werman, M. and Shashua, A., European Conference on Computer Vision (ECCV), Apr. 1996, Cambridge United Kingdom, pp. 217-227.
Dubrovin, A., J. Leleve et al., "Application ofreal-time lighting simulation for intelligent front-lighting studies", 2000 pp. 333-343.
Durant, "SMS-7 Automotive Rear View Monitoring System (#056439)", May 12, 1995.
Dynamic Pn to Pn Alionmen, Shashua, A., In Handbook of Computational Geometry for Pattern Recognition, Computer Vision. Neuro computing and Robotics. Eduardo Bayro-Corrochano (eds.), Springer-Verlag, 2004.
E. A Dickmanns, "Vehicles Capable of Dynamic Vision", Aug. 23, 1997.
E. Young, et al. "Improved Obstacle Detection by Sensor Fusion" IEE Colloquium on "Prometheus and DRIVE", Oct. 15, 1992.
Easton, K. "A view to avoiding a kill", 1991.
Edwin Carledge, "Jaguar gives cat more lives", Oct. 10, 1991.
Elimination: An Approach to the Study of3D-from-2D, Werman, M. and Shashua, A., International Conference on Computer Vision (ICCV), Jun. 1995, Boston, MA, pp. 473-479.
Ernst, S., et al. "Camera calibration for lane and obstacle detection" Intelligent Transportation Systems, 1999. Proc., Oct. 5-8, 1999 pp. 356-361.
Fancher, P., et al. "Intelligent Cruise Control Field Operational Test (Final Report)" Final Report, vol. I: Technical Report, May 1998.
Fancher, P., et al. "Fostering Development, Evaluation, and Deployment of Forward Crash Avoidance Systems (FOCAS)" Annual Research Repol 1 DOT HS 808 43 7, May 1995.
Feature Selection for Unsupervised and Supervised Inference: the Emergence of Sparsity in a Weight-based Approach, Wolf, L. and Shashua, A., Journal of Machine Learning Research (JMLR), 6(11):1885-1887, 2005, pp. 1885-1887.
Ferryman, et al., "Visual Surveillance for Moving Vehicles", 2000.
Forward collision warning with a single camera, Dagan et al., IEEE Intelligent Vehicles Symposium, 2004.
Franke U., et al, "Real-Time Vision for Intelligent Vehicles" IEEE Instrumentation & Measurement Magazine., Jun. 2001, pp. 22-27.
Freescale Semiconductor MC68331 User's Manual, 1996.
French, R., et al. "A comparison of IVHS progress in the United States, Europe, and Japan", Dec. 31, 1993.
Gat, et al., "Aftermarket SAE World Congress & Exhibition", Jan. 1, 2005.
Gavrila, et al., "Real-time object detection for "smart" vehicles", 1999.
Geary, J. "Passive Optical Lane Position Monitor" Idea Project Final Report Contract ITS-24, Jan. 15, 1996.
Gehrig, "Design, simulation, and implementation of a vision-based vehicle-following system", 2000.
Gehrig, S.; "Design, simulation, and implementation of a vision-based vehicle-following system" Doctoral Dissertation., Jul. 31, 2000.
Geometric and photometric constraints: motion and structure from three views, Stein, Doctoral Dissertation, 1998.
Goldbeck, J., et al. "Lane detection and tracking by video sensors" Intelligent Transportation Systems, 1999. Proc., Oct. 5-8, 1999.
Grouping Contours by Iterated Pairing Network, Shashua, A. and Ullman, S., In Lippmann, R.P., Moody, J.E. and Touretzky, D.S. (eds.) Advances in Neural Information Processing Systems 3, (Proc, OfNIPS'90), Morgan Kaufmann Publishers, CA, 1991, pp. 335-341.
Batavia, H., Driver-Adaptive Lane Departure Warning Systems, The Robotics Institute Carnegie Mellon University Pittsburgh, Pennsylvania, 15213, Sep. 20, 1999.
Herbert, et al., "3-D Vision Techniques for Autonomous Vehicles", 1988.
Hillebrand, M., et al, "E-ligh speed camera system using a CMOS image sensor" IEEE Intelligent Vehicles Symposium., Oct. 3-5, 1999, pp. 656-661.
Homography Tensors: On Algebraic Entities That Represent Three Views of Static or Moving Planar Points, Shashua, A. and Wolf, L., European Conference on Computer Vision (ECCV), Jun. 2000, Dublin, Ireland, pp. 163-177.
Howard, K. "Out of the Dark Ages", Oct. 30, 1991.
Hu, et al., "Action-based Road Horizontal Shape Recognition", May 1990.

(56) References Cited

OTHER PUBLICATIONS

Huertgen et al., "Vehicle Environment Sensing by Video Sensors", Mar. 1, 1999.
Huertgen, B., et al. "Vehicle Environment Sensing by Video Sensors" No. 1999-01-0932. SAE Technical Paper, 1999.
Hutber, D., et al, "Multi-sensor multi-target tracking strategies for events that become invisible" BMVC '95 Proc. of the 6th British conference on Machine vision, V2, 1995, pp. 463-472.
Illumination and View Position in 3D Visual Recognition, Shashua, A., In J.E. Moody, S.J. Hanson and R.P. Lippmann (eds.) Advances in Neural Information Processing Systems, Morgan Kauffman Publishers, CA 1992 (Proc. of NIPS '91), pp. 404-411.
Image-Based View Synthesis by Combining Trilinear Tensors and Learning Techniques, Avidan, S., Evgeniou, T., Shashua, A. and Poggio, T., ACM Conference on Virtual Reality and Systems (VRST), Sep. 1997, pp. 140-145.
Internal Camera Calibration using Rotation and Geometric Shapes, Stein; G,P., Masters Thesis, M.I.T. (Feb. 1993).
Ishida, S., Tanaka; J., Kondo, S., and Shingyoji, M., "Development of a Driver Assistance System", 2002.
Ishikawa et al., "Visual Navigation of an Autonomous Vehicle Using White Line Recognition", Sep. 1988.
Itoh, M., et al. "Towards intelligent navigator that can provide timely advice on safe and efficient driving" Intelligent Transportation Systems, 1999. Proc., Oct. 5-8, 1999, pp. 981-986.
J. Griffiths, "Futuristic cars streets ahead of dozing drivers" Sep. 29, 1991.
Jaguar Press Releases Autumn 1991 "Jaguar Displays $21^{st}$ Century Car Technologies".
Johnson, "Georgia State Patrol's In-Car Video System", 1992.
Join Tensors: on 3D-to-3D Alignment of Dynamic Sets, Wolf, L., Shashua, A. and Wexler, Y., International Conference on Pattern Recognition (ICPR), Sep. 2000, Barcelona, Spain, pp. 99-102.
Kakinami et al., "Autonomous Vehicle Control System Using an Image Processing Sensor", Feb. 1, 1995.
Kernel Feature Selection with Side Data using a Spectral Approach, Shashua, A. and Wolf, L., Proc. of the European Conference on Computer Vision (ECCV), May 2004, Prague, Czech Republic.
Kernel Principal Angles for Classification Machines with Applications to Image Sequence Interpretation, Wolf, L. and Shashua., A., IEEE Conference on Computer Vision and Pattern Recognition (CVPR), Jun. 2003, Madison.
King, "Taxi tests a hidden, miniature camera", Jul. 1, 1997.
Klassen et al., "Sensor Development for Agricultural Vehicle Guidance", Sep. 1, 1993.
Kowalick, T. "Proactive use of highway recorded data via an event data recorder (EDR) to achieve nationwide seat belt usage in the 90th percentile by 2002" "Seat belt event data recorder (SB-EDR)" Transportation Recording: 2000 and Beyond., May 3-5, 1999, pp. 173-198, 369.
Lasky, et al., "Automated Highway Systems (AHS) Classification by Vehicle and Infrastructure", 1994.
Latent Model Clustering and Applications to Visual Recognition, Polak, S. and Shashua, A., International Conference on Computer Vision (ICCV), Rio, Brazil, Oct. 2007.
Learning over Sets using Kernel Principal Angles, Wolf, L. and Shashua, A., Journal of Machine Learning Research, 2003, pp. 913-931.
LeBlanc, et al., "CAPC: A Road-Departure Prevention System", 1996, pp. 61-71.
Leen et al., "Digital networks in the automotive vehicle", Dec. 1999.
Lens Distortion Calibration Using Point Correspondences, Gideon P. Stein, A.I. Memo No. 1595, M.I.T. Artificial Intelligence Laboratory, Nov. 1996.
Levin, "Video Gear in Police Cruisers Gets Mixed Reviews Critics Say It Violates Privacy Rights and inhibits Officers From Doing Theft Jobs Well", Mar. 17, 1997.
Linear Image Coding for Repression and Classification using the Tensor-rank Principle, Shashua, A. and Levin, A., IEEE Conference on Computer Vision and Pattern Recognition (CCPR), Dec. 2001, Hawaii, pp. 42-49.
Liu Xianghong, "Development of a vision-based object detection and recognition system for intelligent vehicle", 2000.
Lowenau, J.P., Bernasch, J. H., Rieker, H. G., Venhovens, P. T., Huber, J.P., Huhn, W., & Reich, F. M., "Adaptive light control a new light concept controlled by vehicle dynamics and navigation.", 1999.
Lucas Press Releases Autumn 1991 "Autocruise Concept Automatic Distance Keeping".
Luebbers et al., "Video-image-based neural network guidance system with adaptive view-angles for autonomous vehicles", Aug. 1, 1991.
M. P Yazigi, Technology "Promethean Plans for Next Generation of Cars", Sep. 13, 1992.
Mackey, J., et al. "Digital Eye-Witness Systems" Transportation Recording: 2000 and Beyond, May 3-5, 1999, 271-284.
Manffold Pursuit: A New Approach to Appearance Based Recognition, Shashua, A., Levin, A. and Avidan, S., International Conference on Pattern Recognition (ICPR), Aug. 2002, Quebec, Canada.
Mararit Betke et al., "Real-time multiple vehicle detection and tracking from a moving vehicle," 2000.
Maurer, et al., "VaMoRs-P: an advanced platform for visual autonomous road vehicle guidance", 1995.
Maurer, M. "Flexible Automatisierung von StraBenfahrzeugen mit Rechnersehen" Universitat der Buneswehr Milnchen Dissertation, Jul. 2000.
Ming-Yang Chem, Ping-Cheng Hou, "The lane recognition and vehicle detection at night for a camera-assisted car on highway", 2003.
Mobileye ACP, http://www.mobileye.com/asp4.html, https://web.archive.orwweb/20030205014306/hnp://www.mobileye.com/as.Q4.html, Feb. 5, 2003.
Mobileye General—https://web.archive.orgiweb/20031225105237/http://mobileye.com/sideMirror.html, Dec. 25, 2003.
Mobileye General—https://web.archive.orwweb/20040202025924/htm://mobileye.com/as p4.shtml, Feb. 2, 2004.
Mobileye N.V. Introduces Eyegtm Vision System-On-A-Chip High Performance, Low Cost Breakthrough for Driver Assistance Systems, Detroit, Michigan, Mar. 8, 2004.
Model-based brightness constraints: on direct estimation of structure and motion; Stein et al., IEEE Transactions on Pattern Analysis and Machine Intelligence, vol. 22, Issue. 9, Sep. 2000.
Molbileye Side Mirror Jan. 4, https://web.archive.orglweb/20030304133406/http://www.mobileye.corn/sideMirror.html, Jan. 4, 2003.
Monitoring Activities from Multiple Video Streams: Establishing a Common Coordinate Frame, Stein, et al., A.I. Memo No. 1655, M.I.T. Artificial Intelligence Laboratory, Apr. 1999.
Mori, et al., "Shadow and Rhythm as Sign patterns of Obstacle Detection" 1993.
Multi-frame Infinitesimal Motion Model for the Reconstruction of (Dynamic) Scenes with Multiple Linearly Moving Objects, Shashua, A. and Levin, A., International Conference on Computer Vision (ICCV), Jul. 2001,, Vancouver, Canada, pp. 592-599.
Multiple View Geometry of Non-planar Algebraic Curves, Kaminski, J.Y. and Fryers, M. and Shashua, A. and Teicher, M., International Conference on Computer Vision (ICCV), Vancouver, Canada, Jul. 2001, pp. 181-186.
Multiple-view Geometry and Photometry, Shashua, A., In Recent Progress in Computer Vision, Springer-Verlag, LNCS series, Invited papers of ACCV'95, Singapore Dec. 1995, 225-240.
Multiple-view geometry of general algebraic curves, Kaminski, J .Y. and Shashua, A., International Journal of Computer Vision (IJCV), 2004.
Multi-way Clustering Using Super-symmetric Non-negative, Tensor Factorization, Shashua, A., Zass. R. and Hazan, T., Proc. of the European Conference on Computer Vision (ECCV), Graz, Austria, May 2006.
Navon, "SoC IP Qualification & Emulation Environment" Dec. 8-9, 2004.

(56) References Cited

OTHER PUBLICATIONS

Nonnegative Sparse PCA, Zass, R. and Shashua, A., Advances in Neural Information Processing Systems (NIPS), Vancouver, Canada, Dec. 2006.
Non-Negative Tensor Factorization with Applications to Statistics and Computer Vision, Shashua, A. and Hazan, T., International Conference on Machine Learning (ICML), Bonn, Germany, Aug. 2005.
Norm-Product Belief Propagation: Primal-Dual Message-Passing for Approximate Inference, Hazen, T. and Shashua, A., IEEE Trans. on Information Theory, 2010 56(12):629 4-6316.
Novel View Synthesis by Cascading Trilinear Tensors, A vidan, S. and Shashua, A., IEEE Transactions on Visualization and Computer Graphics (TVCG), 4(4), 1998.
Novel View Synthesis in Tensor Space, Avidan, S. (S) and Shashua, A., IEEE Conference on Computer Vision and Pattern Recognition (CVPR), Jun. 1997, pp, 1034-1040.
Off-road Path Followng using Region Classification and Geometric Projection Constraints, Alon, Y., Ferencz, A. and Shashua, A., IEEE Conference on Computer Vision and Pattern Recognition (CVPR), Jun. 2006., NY.
Omni-Rig Sensors: What Can be Done With a Non-Rigid Vision Platform?, Shashua, A., Workshop on Applications of Computer Vision (W ACV), pp. 174-179, Princeton, Oct. 1998, pp, 174-179.
Omni-rig: Linear Se(f-recalibration of a Rig with Varying Internal and External Parameters, Zornet, A. and Wolf, L. and Shashua, A., International Conference on Computer Vision (ICCV), Jul. 2001, Vancouver, Canada, pp. 135-141.
On calibration and reconstruction from planar curves, Kaminsky, J.Y. and Shashua, A., European Conference on Computer Vision (ECCV), pp. 256-270, Jun. 2000, Dublin, Ireland, pp. 256-270.
On degeneracy of linear reconstruction from three views: linear line complex and applications, IEEE Transactions on Pattern Analysis and Machine Intelligence, vol. 21, Issue. 3, Mar. 1999.
On Degeneracy of Linear Reconstruction from Three Views: Linear Line Complex and Applications, Stein, G. and Shashua, A., IEEE Transactions on Pattern Analysis and Machine Intelligence (P AMI), vol. 21 (3), 1999, pp. 244-251.
On Geometric and Algebraic Aspects of 3D Affine and Projective Structures from Perspective 2D Views, Shashua, A., In Applications of Invariance in Computer Vision, J. Mundy, A. Zisserman & D. Forsyth (eds.), Springer-Verlag LNCS No. 825, 1994, 127-143.
On Photometric Issues in 3D Visual Recognition from a Single 2D Image, Shashua, A., International Journal of Computer Vision (IJCV), 21(1/2), 1997 pp. 99-122.
On Projection Matrices Pk-I P2, k=3, 6, and their Applications in Computer Vision, Wolf, L. and Shashua, A., International Journal of Computer Vision (IJCV), 48(1), 2002, pp. 53-67.
On the Concept of Relative Affine Structure, Shashua, A. and Navab, N., Zeitschrift fur Photogrammetrie und Fernerkundung, 5/94 Wichmann Verlag, Karlsruhe, Oct. 1994 pp. 181-189.
On the Relationship Between the Support Vector Machine for classification and Sparsified Fisher's Linear Discriminant, A. Shashua, Neural Processing Letters, 1999, 9(2): 129-139.
On the Reprojection of JD and 2D Scenes Without Explicit Model Selection, Shashua, A. and Avidan, S., European Conference on Computer Vision (ECCV), Jun. 2000, Dublin, Ireland, pp. 468-482.
On the Structure and Properties of the Quadrifocal Tensor, Shashua, A. and Wolf, L., European Conference on Computer Vision (ECCV), Jun. 2000, Dublin, Ireland, pp. 354-368.
On the Synthesis of Dynamic Scenes from Reference Views, Wexler, Y. and Shashua, A., IEEE Conference on Computer Vision and Pattern Recognition (CVPR), Jun. 2000, pp. 133-139.
On the Trilinear Tensor of Three Perspective Views and its Underlying Geometry, Werman, M.(C) and Shashua, A., Proceedings of the Europe-China workshop on Geometrical Modelling and Invariants for Computer Vision, Apr. 1995, Xi'an, China, pp. 110-117.
On the Trilinear Tensor of Three Perspective Views and its Underlying Geometry, Shashua, A. and Werman, M., International Conference on Computer Vision (ICCV), Jun. 1995, Boston, MA, pp. 920-925.

Owings, R. "Event Data Recorders" Summary of findings by the NHTSA EDR Working Group, Aug. 2001.
Paetzold, F. "Interpretation of visually sensed urban environment for a self-driving car" Ruhr-Universitat Bochum, Dissertation, Sep. 2000.
Parnell, K.; "Reconfigurable Vehicle". No. 2002-01-0144, SAE Technical Paper, 2002. Xilinx WPI 53, Nov. 19, 2001.
Pilkington Press Releases, "Advanced Technology Benefits $21^{st}$ Century Motorist", Autumn 1991.
pLSA for Sparse Arrays With Tsallis Pseudo-Additive, Divergence: Noise Robustness and Algorithm, Hanan, T., Hardoon, R. and Shashua, A., International Conference on Computer Vision (ICCV), Rio, Brazil, Oct. 2007.
Pollard, "Evaluation of the Vehicle Radar Safety Systems' Rashid Radar Safety Brake Collision Warning System", Feb. 29, 1988.
Pomerleau, "Run-Off-Road Collision Avoidance Using Ivhs Countermeasures", 1996.
Pomerleau, D. "Run-off-road collision avoidance using IVHS countermeasures" Task 6 Interim Report, Sep. 10, 1996.
Pomerleau, et al., "Rapidly Adapting Machine Vision for Automated Vehicle Steering", Apr. 30, 1996.
Pomerleau,"Rapidly Adapting Machine Vision for Automated Vehicle Steering", 1996, pp. 19-27.
Principal Component Analysis Over Continuous Subspaces and Intersection of Ha(f-spaces, Levin, A. and Shashua, A., European Conference on Computer Vision (ECCV), May 2002, Copenhagen, Denmark, pp. 133-147.
Probabilistic Graph and Hypergraph Matching, Zass, R. and Shashua, A., Conf. on Computer Vision and Pattern Recognition (CVPR), Jun. 2008, Anchorage, Alaska.
Projective Depth: A Geometric Invariant for 3D Reconstruction From Two Perspective/Orthographic Views and for Visual Recognition, Shashua, A., International Conference on Computer Vision (ICCV), May 1993, Berlin, Germany, pp. 583-590.
Projective Structure from Uncalibrated Images: Structure from Motion and Recognition, Shashua, A., IEEE Transactions on Pattern Analysis and Machine Intelligence (P AMI), (vol. 16(8), 1994 pp. 778-790.
Prometheus Press Releases, "European Car Industry Reveals the Future for $21^{st}$ Century Motorists", Autumn 1991.
Pynn, J., et al. "Automatic identification of cracks in road surfaces" 7th International Conference on Image Processing and its Application, CP465, Jan. 1999, pp. 671-675.
Q-warping: Direct Computation of Quadratic Reference Surfaces, Shashua, A. and Wexler, Y., IEEE Transactions on Pattern Analysis and Machine Intelligence (P AMI), vol. 23(8), 2001, pp. 920-925.
R. Chapuis, F. Marmoiton, R. Aufrere, F. Collange, J-P. Derutin, "Road Detection and Vehicles Tracking by Vision for an On-Board ACC System in the VELAC Vehicle", 2000.
Ramesh et al., "Real-Time Video Surveillance and Monitoring for Automotive Applications", Mar. 6, 2000.
Ran, et al. "Development of Vision-based Vehicle Detection and Recognition System for Intelligent Vehicles", 1999.
Rayner, G., et al. "I-Witness Black Box Recorder" Intelligent Transportation Systems Program, Final Report for ITS-IDEA Project 84, Nov. 2001.
Raytheon Commercial Infrared and ELCAN-Teaxs Optical Technologies, "NightDriver Thermal Imaging Camera and HUD Development Program for Collision Avoidance Applications", 2000.
Redmill, "The OSU Autonomous Vehicle", 1997.
Reichardt, "Continuous behavior control of an autonomous vehicle in a dynamic environment", 1996.
Reichardt, D. "Kontinuierliche Verhaltenssteuerung eines autonomen Fahrzeugs in dynamischer Umgebung" Universitat Kaisserslautern Dissertation, Jan. 1996.
Reisman, et al., "Crowd Detection in Video Sequences IEEE, Intelligent Vehicles Symposium", Jan. 1, 2004.
Relative Affine Structure: Canonical Model for 3D from 2D Geometry and Applications, Shashua, A. and Navab, N., IEEE, Transactions on Pattern Analysis and Machine Intelligence (P AMI) vol. 18(9), 1996 pp. 873-883.

(56) References Cited

OTHER PUBLICATIONS

Relative Affine Structure: Theory and Application for 3D Reconstruction From Perspective Views, Shashua, A. and Navab, N., IEEE Conference on Computer Vision and Pattern Recognition (CVPR), Jun. 1994, Seattle, Washington, pp. 483-489.
Research & Development, "Advanced technologies for collision avoidance", Summer 1992.
Revisiting Single-view Shape Tensors: Theory and Applications, Levin, A. and Shashua, A., European Conference on Computer Vision (ECCV), May 2002, Copenhagen, Denmark, pp. 256-270.
Rhodes, P. "A look into the microchip future", Oct. 15, 1991.
Robotics Institute Carnegie Mellon University, "Run-Off-Road Collision Avoidance Using Ivhs Countermeasures", 1996.
Robotics Institute, "Run-Off-Road Collision Avoidance Using Ivhs Countermeasures" Sep. 10, 1996.
Robust Recovery of Camera Rotation from Three Frames, Rousso, B. and Avidan, S. and Shashua, A. and Peleg, S. IEEE Conference on Computer Vision and Pattern Recognition (CVPR), Jun. 1996, San Francisco, CA, pp. 796-802.
Rowell, J. Martin, "Applying Map Databases to Advanced Navigation and Driver Assistance Systems", 2001.
SAE International, "Development of a Camera-Based Forward Collision Alert System", Apr. 12, 2011.
Sanders, J. "Speed Racers": Study to monitor driver behavior to determine the role of speed in crashes Georgia Research Tech News, Aug. 2002.
Sayer, et at, "The Effect of Lead-Vehicle Size on Driver Following Behavior", 2000.
Seelen, "Image Processing for Driver Assistance", 1998.
Shape Tensors for Efficient and Learnable Indexing, Weinshall, D., and Werman, M. and Shashua, A., Proceedings of the workshop on Scene Representations, Jun. 1995, Cambridge, MA, pp. 58-65.
ShareBoost: Efficient Multiclass Learning with Feature Sharing, Neural Information and Processing Systems (NIPS), Shalev-Schwartz, S., Wexler, Y. and Shashua, A., Dec. 2011.
Shashua, et al., "Pedestrian Detection for Driving Assistance, Systems: Single-Frame Classification and System Level, Performance IEEE Intelligent Vehicles Symposium", Jan. 1, 2004.
Solder, et al., "Visual Detection of Distant Objects", 1993.
Solid or not solid: vision for radar target validation, Stein et al., IEEE Intelligent Vehicles Symposium, 2004.
Sparse Image Coding using a 3D Non-negative Tensor Factorization, Hazan, T.(S), Polak, S. and Shashua, A., International Conference on Computer Vision (ICCV), Beijing, China, Oct. 2005.
Steiner P., et al. "Future applications or microsystem technologies in automotive safety systems" Advanced Microsystems for Automotive Applications '98, 1998, pp. 21-42.
Stereo-assist: Top-down stereo for driver assistance systems, Stein et al., IEEE Intelligent Vehicles Symposium, 2010.
Stereo-Assist: Top-down Stereo for Driver Assistance Systems, Stein, G.P., Gdalyahu, Y. and Shashua, A., Proc. of the IEEE, Intelligent Vehicles Symposium (IV2010), San Diego, CA, Jun. 2010.
Stickford, "Candid cameras come to Park", 1996.
Stiller, et al., "Multisensor obstacle detection and tracking", 2000, pp. 389-396.
Structural Saliency: the Detection of Globally Salient Structures Using a Locally Connected Network, Shashua, A. and Ullman, S., International Conference on Computer Vision (ICCV), Dec. 1988, Tarpon Springs, Florida, pp. 321-327.
Sun, et al,, "A Real-time Precrash Vehicle. Detection System", 2002.
Supt W Eaton, "Video Incident Capture System", Sep. 1991.
T. Jochem, No Hands Across America Official Press Release, http://www.cs.cmu.edu/afs/cs/usr/tjechem/www/nhaa/official press release.html, Jul. 23, 1995.
Tappen, et al., "The seeing passenger car 'VaMoRs-P'", 1994, pp. 1459-1472.
Taxonomy of Large Margin Principle Algorithms for Ordinal Regression Problems, Shashua, A. and Levin, A., Advances in Neural Information Processing Systems (NIPS), Vancouver, Canada, Dec. 2002.
Tensor Embedding of the Fundamental Matrix, Avidan, S.(S) and Shashua, A., Post-ECCV SMILE Workshop, Jun. 1998, Frieburg, Germany. Springer LNCS series, vol. 1506, 1998, pp. 133-148.
Tetsushi, M., et al. "Functions and Devices of Mitsubishi Active Safety ASV" Proceedings of the 1996 IEEE Intelligent Vehicles Symposium, Sep. 19-20, 1996.
The Golem Group I UCLA Autonomous Ground Vehicle in the DARPA Grand Challenge, R. Mason, J. Radford, D. Kumar, R. Waiters, B. Fulkerson, E. Jones, D. Caldwell, J. Meltzer, Y. Alon, A. Shashua, H. Hattori, N. Takeda, E. Frazzoli, and S. Soatto, Journal of Field Robotics 23(8), 2006, pp. 527-553.
The Quadric Reference Sur.face: Theory and Applications, Shashua, A. and Toelg, S., International Journal of Computer Vision (IJCV), 23(2), 1997, pp. 185-198.
The Quadric Reference Surface: Applications in Registering Views of Complex 3D Objects, Shashua, A. and Toelg, S., European Conference on Computer Vision (ECCV), May 1994, Stockholm, Sweden, pp. 407-416.
The Quotient Image: Class Based Recognition and Synthesis Under Varying Illumination Conditions, Riklin Raviv, T. and Shashua, A., IEEE Conference on Computer Vision and Pattern Recognition (CVPR), Jun. 1999, pp. 566-573.
The Quotient Image: Class Based Re-rendering and Recognition With Varying Illuminations, Shashua, A. and Riklin Raviv, T., IEEE Transactions on Pattern Analysis and Machine Intelligence (PAMI), vol. 23(2), 2001, pp. 129-139.
The Rank 4 Constraint in Multiple (_3) View Geometry, Shashua, A. and Avidan, S., European Conference on Computer Vision (ECCV), Apr. 1996, Cambridge, United Kingdom, pp. 196-206.
The Semi-Explicit Shape Model for Multi-object Detection and Classification, Polak, S. and Shashua, A., Proc. of the European Conference on Computer Vision (ECCV), Crete, Greece, Sep. 2010.
Thorpe, et al., "The 1997 Automated Highway Free Agent Demonstration", 1997 pp. 496-501.
Thorpe, Vision and Navigation for the Carnegie-Mellon Navlab, IEEE Transactions on Pattern Analysis and Machine Intelligence, vol. 10, No. 3, May 1998.
Threading Fundamental Matrices, Avidan, S. and Shashua, A., IEEE Transactions on Pattern Analysis and Machine Intelligence (PAMI), vol. 23(1), 2001, pp. 73-77.
Threading Kerne/functions: on Bridging the Gap between Representations and Algorithms, Shashua, A. and Hanan, T., Advances in Neural Information Processing Systems (NIPS), Vancouver, Canada, Dec. 2004.
Time-varying Shape Tensors for Scenes with Multiply Moving Points, Levin, A., Wolf, L. and Shashua, A., IEEE Conference on Computer Vision and Pattern Recognition (CVPR), Dec. 2001, Hawaii., pp. 623-630.
Tracking from multiple view points: Self-calibration of space and time, G.P. Stein, IEEE Computer Society Conference on Computer Vision and Pattern Recognition, Jun. 1999.
Trajectory Triangulation over Conic Sections, Shashua, A., Avidan, S. and Werman, M., International Conference on Computer Vision (ICCV), Greece, 1999, pp. 330-337.
Tralectory Triangulation: 3D Reconstruction of Moving Points from a Monocular Image Sequence, Avidan, S.(S)and Shashua, A., IEEE Transactions on Pattern Analysis and Machine Intelligence (PAMI), vol. 22(4), 2000, pp. 348-357.
Trilinear Tensor: The Fundamental Construct of Multiple-view Geometry and its Applications, Shashua, A., International Workshop on Algebraic Frames for the Perception Action Cycle (AFPAC97), Kiel Germany Sep. 8-9, 1997. Proceedings appeared in Springer-Verlag, LNCS series, 1997, 190-206.
Trilinearity in Visual Recognition by Alignment, Shashua, A., European Conference on Computer Vision (ECCV), May 1994, Stockholm, Sweden, pp. 479-484.
Trivdei, et al., "Distributed Video Networks for Incident Detection and Management", 2000.
Tsutsurni, K., et al. "Vehicle Distance Interval Control Technology" Mitsubishi Electric Advance, vol. 78. Mar. 1997, pp. 10-12.
Two-body Segmentation from Two Perspective Views, Wolf, L. and Shashua, A., IEEE Conference on Computer Vision and Pattern Recognition (CVPR), Dec. 2001, Hawaii, pp. 263-270.

(56) References Cited

OTHER PUBLICATIONS

Ulmer, "Road recognition from multifocal vision", 1994.
Ulmer, B. "VITA II—active collision avoidance in real traffic" Proceedings of the Intelligent Vehicles '94 Symposium, Oct. 24-26, 1994.
Vision-based ACC with a single camera: bounds on range and range rate accuracy, Stein et al., IEEE Intelligent Vehicles Symposium, 2003.
Weisser, H., et al. "Autonomous driving on vehicle test tracks: Overview, implementation and vehicle diagnosis" Intelligent Transportation Systems, 1999. Proc., Oct. 5-8, 1999, pp. 62-67.
Wierwille W., et al. "Research on Vehicle-Based Driver Status/Performance Monitoring, Part I" Final Report, Sep. 1996.
Wright, "Take your hands off that car!" Dec. 18, 1997.
Xu, J., et al. "3 DOF modular eye for smart car" Intelligent Transportation Systems, 1999. Proc., Oct. 5-8, 1999, pp. 501-505.
Yerazunis et al., "An Inexpensive, All Solid-state Video and Data Recorder for Accident Reconstruction", Mar. 1, 1999.
Yee, "Portable Camera Mount" Feb. 1986.
Yerazunis, W.S., et al. "An inexpensive, all solid-state video and data recorder for accident reconstruction" Mitsubishi Technical Report TR-99-29 (Presented at the 1999 SAE International Congress and Exposition, Detroit, Michigan, Mar. 3, 1999.), Apr. 24, 1999.
Yuji, Arai, et al. "Accidents and Near-Misses Analysis by Using Video Drive-Recorders in a Fleet Test", Proceedings of the 17th International Technical Conference on the Enhanced Safety of Vehicles (ESV) Conference, Jun. 4-7, 2001 Amsterdam, The Netherlands, National Highway Traffic Safety Administration, Washington, DC. HS 809 220, Jun. 2001.
Zehang Sun, et al., "On-Road vehicle detection using optical sensors: a review," 2004.
IPR Proceeding No. IPR2014-00251, filed Dec. 16, 2013, re U.S. Patent No. 6,097,023.
IPR Proceeding No. IPR2014-00261, filed Dec. 17, 2013, re U.S. Patent No. 7,339,149.
IPR Proceeding No. IPR2014-00256, filed Dec. 17, 2013, re U.S. Patent No. 7,459,664.
IPR Proceeding No. IPR2014-00260, filed Dec. 17, 2013, re U.S. Patent No. 7,459,664.
IPR Proceeding No. IPR2014-00264, filed Dec. 17, 2013, re U.S. Patent No. 7,459,664.
IPR Proceeding No. IPR2014-00262, filed Dec. 17, 2013, re U.S. Patent No. 7,655,894.
IPR Proceeding No. IPR2014-00258, filed Dec. 17, 2013, re U.S. Patent No. 7,994,462.
IPR Proceeding No. IPR2014-00266, filed Dec. 17, 2013, re U.S. Patent No. 7,994,462.
IPR Proceeding No. IPR2014-00263, filed Dec. 17, 2013, re U.S. Patent No. 8,222,588.
IPR Proceeding No. IPR2014-00265, filed Dec. 17, 2013, re U.S. Patent No. 8,222,588.
IPR Proceeding No. IPR2014-00296, filed Dec. 26, 2013, re U.S. Patent No. 8,325,552.
IPR Proceeding No. IPR2014-00297, filed Dec. 26, 2013, re U.S. Patent No. 8,325,552.
IPR Proceeding No. IPR2014-00298, filed Dec. 26, 2013, re U.S. Patent No. 8,325,552.
Amidi, O., "Integrated Mobile Robot Control", M.S. Thesis, Carnegie Mellon University, May 1990.
Begault, D.R., "Head-Up Auditory Displays for Traffic Collision Avoidance System Advisories: A Preliminary Investigation," Human Factors, 35(4), Dec. 1993, pp. 707-717.
Crisman, J., et al.; Carnegie Mellon University; "Vision and Navigation—The Carnegie Mellon Navlab" edited by Charles E. Thorpe, 1990.
Davis, L. S., Kushner, T. R., Le Moigne, J. J. and Waxman, A. M., "Road Boundary Detection for Autonomous Vehicle Navigation," Optical Engineering, vol. 25, No. 3, Mar. 1986, pp. 409-414.
Dickmanns, E. et al.; "The seeing passenger car 'VaMoRs-P'", Oct. 24, 1994.
"Final Report of the Working Group on Advanced Vehicle Control Systems (AVCS) Mobility 2000," Mar. 1990.
General Motors Autotronic Eye, including public use and sales of vehicles including such systems, and associated advertisements and service manuals., 1953-1988.
Hess, R.A. and Modjtahedzadeh, A., "A Control Theoretic Model of Driver Steering Behavior," IEEE Control Systems Magazine, vol. 10, No. 5, Aug. 1990, pp. 3-8.
Hessburg, T., Peng, H., Masayoshi, T., Zhang, W. B., "An Experimental Study on Lateral Control of a Vehicle," California Partners for Advanced Transit and Highways (PATH), Jan. 1, 1991.
IEEE Paper 1993; Schönfeld et al.; Compact Hardware Realization for Hough Based Extraction of Line Segments in Image Sequences for Vehicle Guidance, 1993.
IEEE Paper 1993; Xie et al., Active and Intelligent Sensing of Road Obstacles: Application to The European Eureka—PROMETHEUS Project, 1993.
IEEE Paper 1994; Rombaut et al.; "Dynamic data temporal multisensory fusion in the Prometheus ProLab2 demonstrator", 1994.
Juberts, M., Murphy, K., Nashman, M., Scheiderman, H., Scott, H., and Szabo, S., "Development and Test Results for a Vision-Based Approach to Avcs." in Proceedings of the 26th International Symposium on Automotive Technology and Automation, Aachen, Germany, Sep. 1993, pp. 1-9.
Kenue, S.K, "Lanelok: Detection of Lane Boundaries and Vehicle Tracking Using Image-Processing Techniques," SPIE Conference on Mobile Robots IV, 1989.
Knipling, R., "IVHS Technologies Applied to Collision Avoidance: Perspectives on Six Target Crash Types and Countermeasures," Technical Paper presented at Safety & Human Factors session of 1993 IVHS America Annual Meeting, Apr. 14-17, 1993, pp. 1-22.
Knipling, R.R., Wierwille, W.W, "Vehicle-Based Drowsy Driver Detection: Current Status and Future Prospects," IVHS America Fourth Annual Meeting, Atlanta, GA, Apr. 17-20, 1994, pp. 1-24.
Litkouhi, B.B., Lee, A.Y. and Craig, D.B., "Estimator and Controller Design for LaneTrak, a Vision-Based Automatic Vehicle Steering System," Proceedings of the 32nd Conference on Decision and Control, San Antonio, Texas, Dec. 1993, pp. 1868-1873.
Lumia, J.; "Mobile system for measuring retroreflectance of traffic signs", Mar. 1, 1991.
Manigel, J. and Leonhard, W., "Computer Control for an Autonomous Road Vehicle by Computer Vision," 1991 International Conference on Industrial Electronics, Control and Instrumentation, vol. 1, Oct. 28-Nov. 1, 1991, pp. 19-24.
Manigel, J. and Leonhard, W., "Vehicle Control by Computer Vision," IEEE Transactions on Industrial Electronics, vol. 39, No. 3, Jun. 1992, pp. 181-188.
Mironer, M., Hendricks, D., "Examination of Single Vehicle Roadway Departure Crashes and Potential IVHS Countermeasures," U.S. Department of Transportation, Aug. 1994.
Najm, W.; "Comparison of alternative crash-avoidance sensor technologies", Jan. 6, 1995.
Nashman, M., and Schneiderman, H., "Real-time Visual Processing for Autonomous Driving," in Proceedings of the IEEE Intelligent Vehicles, vol. 93, Jun. 1993, pp. 14-16.
Peng, H., "Vehicle Lateral Control for Highway Automation," Ph.D. Thesis—University of California Berkeley, 1992.
Peng, H., Zhang, W. B., Arai, A., Lin, Y., Hessburg, T., Devlin, P., Masayoshi, T., Shladover, S., "Experimental Automatic Lateral Control System for an Automobile," California Partners for Advanced Transit and Highways (PATH), Jan. 1, 1992.
Schneiderman, H. and Nashman, M., "Visual Processing for Autonomous Driving," IEEE Workshop on Applications of Computer Vision, Palm Springs, CA., Nov. 30-Dec. 2, 1992.
Schumann, J., Godthelp, J. and Hoekstra, W.H., "An Exploratory Simulator Study on the Use of Active Control Devices in Car Driving," No. IZF-1992-B-2. Institute for Perception RVO-TNO Soesterberg (Netherlands), May 1992.
Shimizu, S. et al.; "A moving image processing system for personal vehicle system", Nov. 9, 1992.

(56) References Cited

OTHER PUBLICATIONS

Schladover, S.E., "Highway Electrification and Automation," California Partners for Advanced Transit and Highways (PATH), Jan. 1, 1992.

Shladover, S.E., "Research and Development Needs for Advanced Vehicle Control Systems," Micro, IEEE, vol. 13, No. 1, Feb. 1993, pp. 11-19.

Shladover, S.E., Desoer, C.A., Hendrick, J.K., Tomizuka, M., Walrand, J., Zhang, W., McMahon, D.H., Peng, H., Sheikholeslam, S., McKeown, N., "Automatic Vehicle Control Developments in the PATH Program," IEEE Transaction on Vehicular Technology, vol. 40, No. 1, Feb. 1991, pp. 114-130.

Tsugawa, S. et al.; "Vision-based vehicles in japan; machine vision systems and driving control systems", Aug. 1994.

Twilight Sentinel headlamp control, including public use and sales of vehicles including such systems, and associated advertisements and service manuals., 1960-1998.

Wallace, R., Matsuzaki, K., Goto, Y., Crisman, J., Webb, J., Kanade, T., "Progress in Robot Road-Following," Proceedings of the 1986 IEEE International Conference on Robotics and Automation, vol. 3, 1986, pp. 1615-1621.

Wiles, C.; "Science: Next, the cars that can see in the dark Charles Wiles on a battlefield camera that works with a pilot's aid to help reduce road accidents", Oct. 20, 1993.

Broggi, Alberto, Robust Real-time Lane and Road Detection in Critical Shadow Conditions, International Symposium on Computer Vision, IEEE, 1995, pp. 353-358, 1995.

Charkari et al., "A New Approach for Real Time Moving Vehicle Detection", IEEE Paper, RSJ Conference on Intelligent Robots and Systems, Yokohama, Japan, Jul. 26-30, 1993, pp. 273-278.

Chien, et al., "Efficient Moving Object Segmentation Algorithm Using Background Registration Technique", IEEE Transactions on Circuits and Systems for Video Technology, vol. 12, No. 7, Jul. 2002, pp. 577-586.

De la Escalera et al., "Neural Traffic Sign Recognition for Autonomous Vehicles", IEEE, 1994, pp. 841-846.

Dickmanns, "Vehicles Capable of Dynamic Vision", Aug. 23, 1997.

Haritaoglu, et al., "W4: Real-Time Surveillance of People and Their Activities", IEEE Transactions Pattern Analysis and Machine Intelligence, vol. 22, No. 8, Aug. 2000, pp. 809-830.

Hsieh, et al. "A Shadow Elimination Method for Vehicle Analysis", Proceeding of the 17$^{th}$ IEEE International Conference on Pattern Recognition, vol. 4, 2004.

Kehtarnavaz et al., "Traffic Sign Recognition in Noisy Outdoor Scenes", 1995, pp. 460-465.

Lisowski et al., "Specification of a small electric vehicle: modular and distributed approach," IEEE 1997, pp. 919-924.

McTamaney, Louis S., "Mobile Robots Real-Time Intelligent Control", IEEE Paper, Winter 1987, pp. 55-68.

Mikic, et al., "Moving Shadow and Object Detection in Traffic Scenes", Proceeding of IEEE International Conference on Pattern Recognition, vol. 1, 2000.

Nadimi, Sohail et al., "Physical Models for Moving Shadow and Object Detection in Video", IEEE Transactions on Pattern Analysis and Machine Intelligence, vol. 26, No. 7, Aug. 2004, pp. 1079-1087.

Piccioli et al., "Robust Road Sign Detection and Recognition from Image Sequences", 1994.

Prati, et al., "Detecting Moving Shadows: Algorithms and Evaluation", IEEE Transactions on Pattern Analysis and Machine Intelligence, vol. 25, No. 7, Jul. 1, 2003, pp. 918-923.

Regensburger, Uwe et al., "Visual Recognition of Obstacles on Roads", Intelligent Robots and Systems, Elsevier, Neubiberg, Germany, 1994, pp. 1-14.

Salvador, et al., "Cast Shadow Segmentation Using Invariant Color Features", Computer Vision and Image Understanding, vol. 95, 2004, pp. 238-259.

Siala, et al., "Moving Shadow Detection With Support Vector Domain Description in the Color Ratios Space", Proceeding of IEEE International Conference on Pattern Recognition. vol. 4, 2004.

Stein et al., "A robust method for computing vehicle ego-motion", Proceedings of the IEEE Intelligent Vehicles Symposium, 2000.

Stengel, et al., "Intelligent Guidance for Headway and Lane Control", Department of Mechanical and Aerospace Engineering, Presented at the 1989 American Control Conference, Pittsburgh, PA, Jun. 1989, pp. 1059-1064.

Thongkamwitoon, T., et al., "An Adaptive Real-time Background Subtraction and Moving Shadows Detection", Proceeding of IEEE International Conference on Multimedia and Expo, vol. 2, 2004, pp. 1459-1462.

Thorpe, et al., "Toward Autonomous Driving: the CMU Navlab. I. Perception," IEEE Paper, Aug. 1991, pp. 32-42.

Toth, et al., "Detection of Moving Shadows Using Mean Shift Clustering and a Significance Test", Proceeding of 17$^{th}$ IEEE International Conference on Pattern Recognition, vol. 4, 2004.

Tzomakas and von Seelen, "Vehicle Detection in Traffic Scenes Using Shadows", Internal Report 98-06, Institut Für Neuroinformatik Bochum, Aug. 1998, pp. 1-8.

Wang, et al., "A Probabilistic Method for Foreground and Shadow Segmentation", Proceeding of IEEE International Conference on Image Processing, vol. 3, Pattern Recognition, 2005, pp. 1937-1946.

Xu, et al., "Cast Shadow Detection in Video Segmentation", Pattern Recognition Letters, vol. 26, 2005, pp. 94-99.

Yoneyama, et al., "Moving Cast Shadow Elimination for Robust Vehicle Extraction Based on 2D Joint Vehicle/Shadow Models", Proceeding of IEEE International Conference on Advanced Video and Signal Based Surveillance, 2003.

Yoneyama, et al., "Robust Vehicle and Traffic Information Extraction for Highway Surveillance", EURASIP Journal on Applied Signal Processing, Hindawai Publishing Corporation, 2005, pp. 2305-2321.

Young et al., "Cantata: Visual Programming Environment for the Khoros System", ACM SIGGRAPH Computer Graphics-Special focus: modular visualization environments (MVEs), vol. 29, Issue 2, Mar. 16, 1995, pp. 1-4.

SAE Paper No. 750364 to Nolan, published Feb. 1, 1975.
SAE Paper No. 890282 to Corsi, published Feb. 1, 1989.
SAE Paper No. 890283 to Brandt, published Feb. 1, 1989.
SAE Paper No. 860173 to Ortega, published Mar. 1, 1986.
SAE Paper No. 930456 to Gumkowski, published Mar. 1, 1993.
SAE Paper No. 770274 to Smith, published Feb. 1, 1977.
SAE Paper No. 871288 to Otsuka, published Nov. 8, 1987.
SAE Paper No. 890288 to Weihrauch and Goesch, published Feb. 1, 1989.

Brown, A Survey of Image Registration Techniques, vol. 24, ACM Computing Surveys, pp. 325-376, 1992.

Burt et al., A Multiresolution Spline with Application to Image Mosaics, ACM Transactions on Graphics, vol. 2. No. 4, pp. 217-236, Oct. 1983.

Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.

Japanese Article "Television Image Engineering Handbook, The Institute of Television Engineers of Japan", Jan. 17, 1981.

Nathan, Digital Video Data Handling, NASA JPL Tech Report 32-877, Pasadena, CA, Jan. 5, 1966.

Porter et al., "Compositing Digital Images," Computer Graphics (Proc. Siggraph), vol. 18, No. 3, pp. 253-259, Jul. 1984.

Szeliski, Image Mosaicing for Tele-Reality Applications, DEC Cambridge Research Laboratory, CRL 94/2, May 1994.

Wolberg, "A Two-Pass Mesh Warping Implementation of Morphing," Dr. Dobb's Journal, No. 202, Jul. 1993.

Wolberg, Digital Image Warping, IEEE Computer Society Press, 1990.

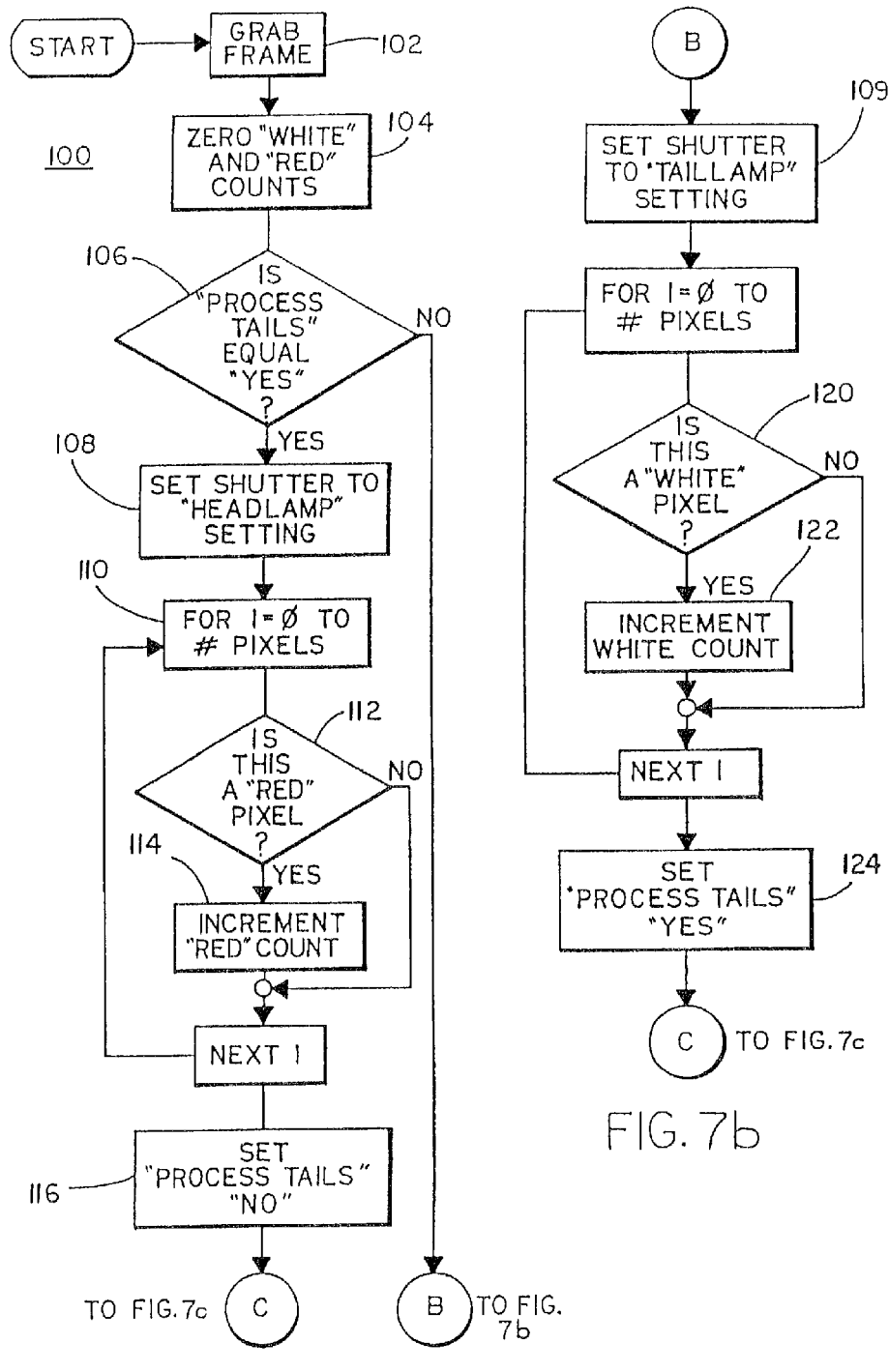

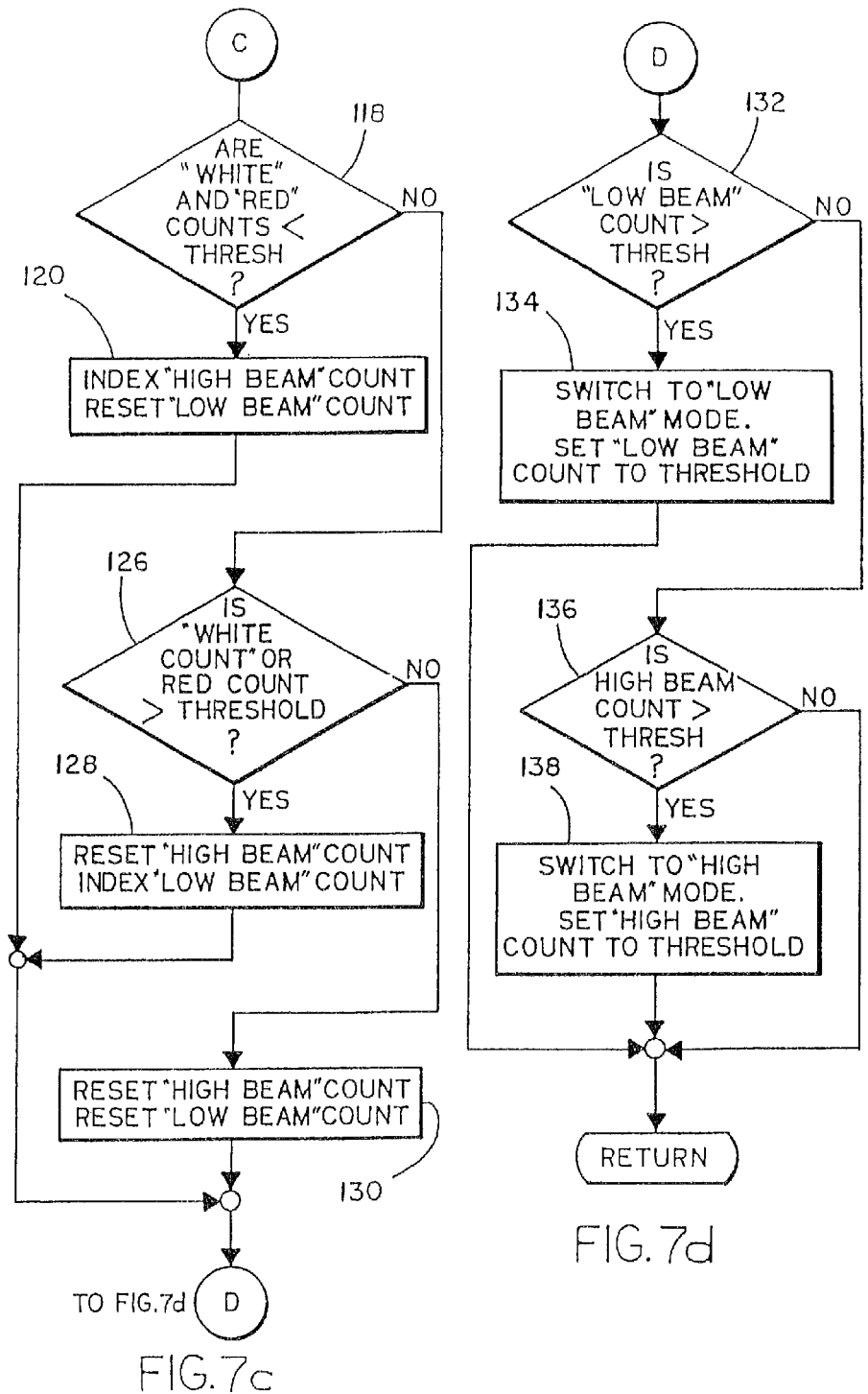

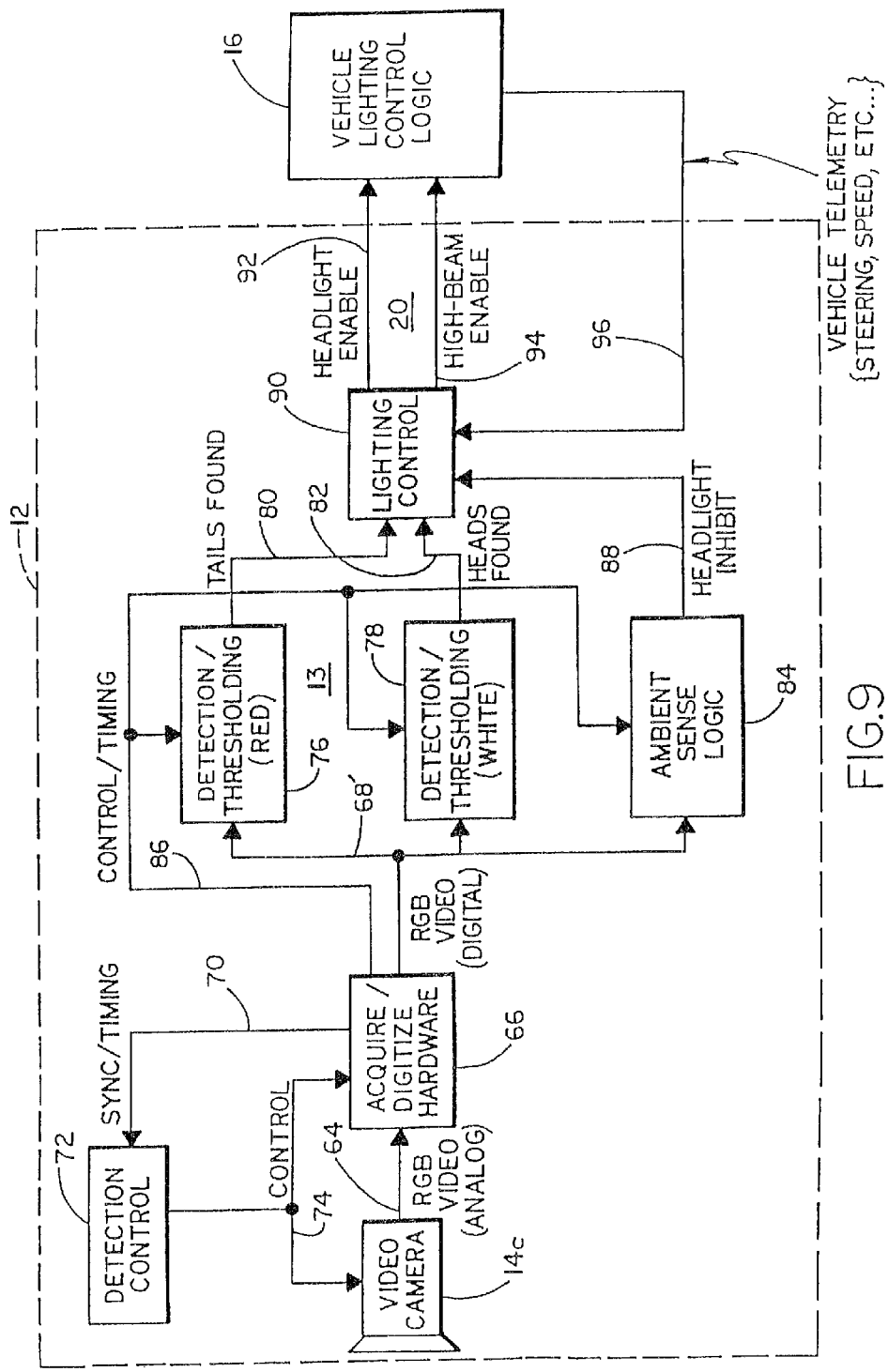

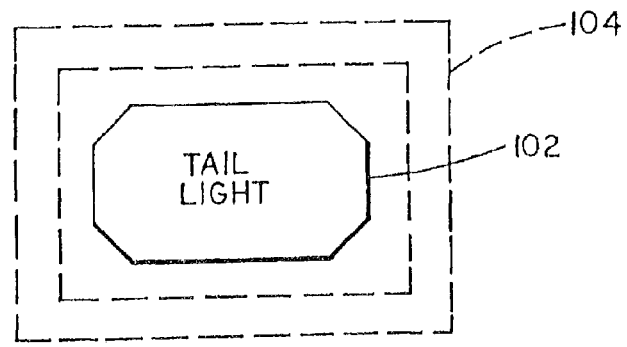
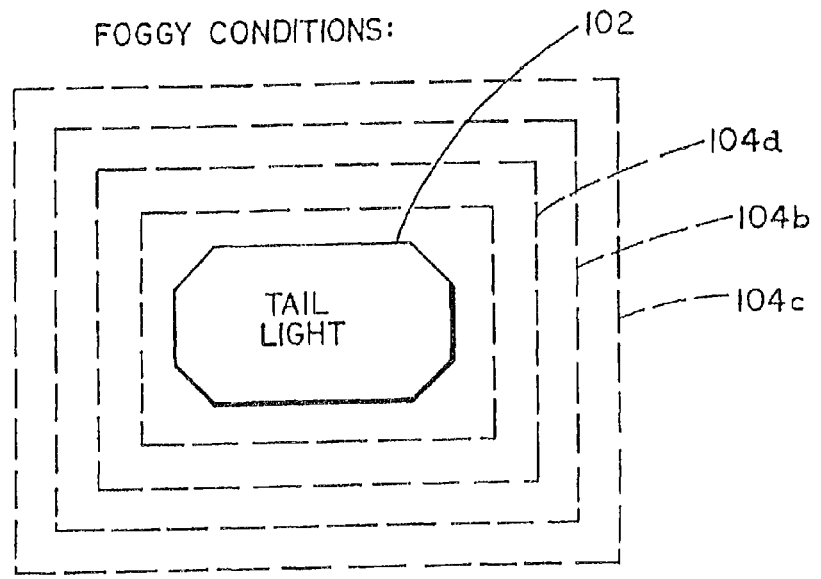

DRIVER ASSISTANCE SYSTEM FOR A VEHICLE

CROSS-REFERENCE TO RELATED APPLICATIONS

This application is a continuation of U.S. patent application Ser. No. 13/936,699, filed Jul. 8, 2013 (Attorney Docket MAG04 P-2133), which is a continuation of U.S. patent application Ser. No. 13/749,839, filed Jan. 25, 2013, now U.S. Pat. No. 8,492,698, which is a continuation of U.S. patent application Ser. No. 13/689,798, filed Nov. 30, 2012, now U.S. Pat. No. 8,481,910, which is a continuation of U.S. patent application Ser. No. 13/550,064, filed Jul. 16, 2012, now U.S. Pat. No. 8,324,552, which is a continuation of U.S. patent application Ser. No. 13/204,106, filed Aug. 5, 2011, now U.S. Pat. No. 8,222,588, which is a continuation of U.S. patent application Ser. No. 12/640,425, filed Dec. 17, 2009, now U.S. Pat. No. 7,994,462, which is a continuation of U.S. patent application Ser. No. 12/273,879, filed Nov. 19, 2008, now U.S. Pat. No. 7,655,894, which is a continuation of U.S. patent application Ser. No. 11/626,535, filed Jan. 24, 2007, now U.S. Pat. No. 7,459,664, which is a continuation of U.S. patent application Ser. No. 11/545,039, filed Oct. 6, 2006, now U.S. Pat. No. 7,402,786, which is a continuation of U.S. patent application Ser. No. 09/441,341, filed Nov. 16, 1999, now U.S. Pat. No. 7,339,149, which is a continuation of U.S. patent application Ser. No. 09/135,565, filed Aug. 17, 1998, now U.S. Pat. No. 6,097,023, which is a continuation of U.S. patent application Ser. No. 08/621,863, filed Mar. 25, 1996, now U.S. Pat. No. 5,796,094.

BACKGROUND OF THE INVENTION

This invention relates generally to vehicle control systems and, in particular, to a system and method for controlling the headlights of the vehicles. The invention is particularly adapted to controlling the vehicle's headlamps in response to sensing the headlights of oncoming vehicles and taillights of leading vehicles.

It has long been a goal to automatically control the state of a vehicle's headlights in order to accomplish automatically that which is manually performed by the driver. In particular, the driver of a vehicle whose headlights are in a high-beam state will dim the headlights upon conscious realization that the headlights are a distraction to the driver of an oncoming vehicle or a leading vehicle. It is desirable to relieve the driver of such duties and thereby allow the driver to concentrate on the driving task at hand. The ideal automatic control would also facilitate the use of high beams in conditions which allow their use, increasing the safety for the controlled vehicle as well as reducing the hazard caused by the occasional failure of the driver to dim the headlights when such headlights are distracting another driver.

Prior attempts at vehicle headlight dimming controls have included a single light sensor which integrates light in the scene forward of the vehicle. When the integrated light exceeds a threshold, the vehicle headlights are dimmed. Such approaches have been ineffective. The headlights of oncoming vehicles are, at least from a distance, point sources of light. In order to detect such light sources in an integrated scene, it is necessary to set a sufficiently low threshold of detection that many non-point-sources at lower intensities are interpreted as headlights or taillights. Such prior art vehicle headlight dimming controls have also been ineffective at reliably detecting the taillights of leading vehicles. The apparent reason is that the characteristics of these two light sources; for example, intensity, are so different that detecting both has been impractical. In order to overcome such deficiencies, additional solutions have been attempted, such as the use of infrared filtering, baffling of the optic sensor, and the like. While such modifications may have improved performance somewhat, the long-felt need for a commercially useful vehicle headlight dimming control has gone unmet.

SUMMARY OF THE INVENTION

The present invention provides a vehicle control which is capable of identifying unique characteristics of light sources based upon a precise evaluation of light source characteristics made in each portion of the scene forward of the vehicle, in the vicinity of each light source, by separating each light source from the remainder of the scene and analyzing that source to determine its characteristics. One characteristic used in identifying a light source is the spectral characteristics of that source which is compared with spectral signatures of known light sources, such as those of headlights and taillights. Another characteristic used in identifying a light source is the spatial layout of the light source. By providing the ability to identify the headlights of oncoming vehicles and the taillights of leading vehicles, the state of the headlights of the controlled vehicle may be adjusted in response to the presence or absence of either of these light sources or the intensity of these light sources.

This is accomplished according to an aspect of the invention by providing an imaging sensor which divides the scene forward of the vehicle into a plurality of spatially separated sensing regions. A control circuit is provided that is responsive to the photosensors in order to determine if individual regions include light levels having a particular intensity. The control circuit thereby identifies particular light sources and provides a control output to the vehicle that is a function of the light source identified. The control output may control the dimmed state of the vehicle's headlamps.

In order to more robustly respond to the different characteristics of headlights and taillights, a different exposure period is provided for the array in order to detect each light source. In particular, the exposure period may be longer for detecting leading taillights and significantly shorter for detecting oncoming headlights.

According to another aspect of the invention, a solid-state light imaging array is provided that is made up of a plurality of sensors arranged in a matrix on at least one semiconductor substrate. The light-imaging array includes at least one spectral separation device, wherein each of the sensors responds to light in a particular spectral region. The control circuit responds to the plurality of sensors in order to determine if spatially adjacent regions of the field of view forward of the vehicle include light of a particular spectral signature above a particular intensity level. In this manner, the control identifies light sources that are either oncoming headlights or leading taillights by identifying such light sources according to their spectral makeup.

According to another aspect of the invention, a solid-state light-imaging array is provided that is made up of a plurality of sensors that divide the scene forward of the vehicle into spatially separated regions, and light sources are identified, at least in part, according to their spatial distribution across the regions. This aspect of the invention is based upon a recognition that headlights of oncoming vehicles and taillights of leading vehicles are of interest to the control, irrespective of separation distance from the controlled vehicle, if the source is on the central axis of travel of the vehicle. Oncoming headlights and leading taillights may also be of interest away from this axis, or off axis, but only if the source has a higher intensity level and is spatially larger. These characteristics of headlights and taillights of interest may be taken into consideration by increasing the resolution of the imaging array along this central axis or by increasing the detection threshold off axis, or both. Such spatial evaluation may be implemented by selecting characteristics of an optical device provided with the imaging sensor, such as providing increased magnification central of the forward scene, or providing a wide horizontal view and narrow vertical view, or the like, or by arrangement of the sensing circuitry, or a combination of these.

The present invention provides a vehicle headlight control which is exceptionally discriminating in identifying oncoming headlights and leading taillights in a commercially viable system which ignores other sources of light including streetlights and reflections of the controlled vehicle's headlights off signs, road markers, and the like. The present invention further provides a sensor having the ability to preselect data from the scene forward of the vehicle in order to reduce the input data set to optimize subsequent data processing. The invention is especially adapted for use with, but not limited to, photoarray imaging sensors, such as CMOS and CCD arrays.

These and other objects, advantages, and features of this invention will become apparent upon review of the following specification in conjunction with the drawings.

BRIEF DESCRIPTION OF THE DRAWINGS

FIGS. 7a-7d are a flowchart of a control program;

FIG. 9 is the same view as FIG. 3 of another alternative embodiment;

FIGS. 12a and 12b are illustrations of use of the invention to detect particular atmospheric conditions.

DESCRIPTION OF THE PREFERRED EMBODIMENT

Figure 1:
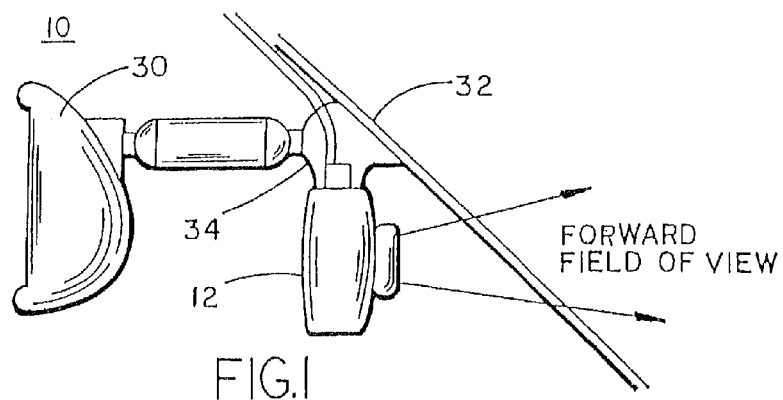
FIG. 1 is a side elevation of a portion of a vehicle embodying the invention.
Figure 2:
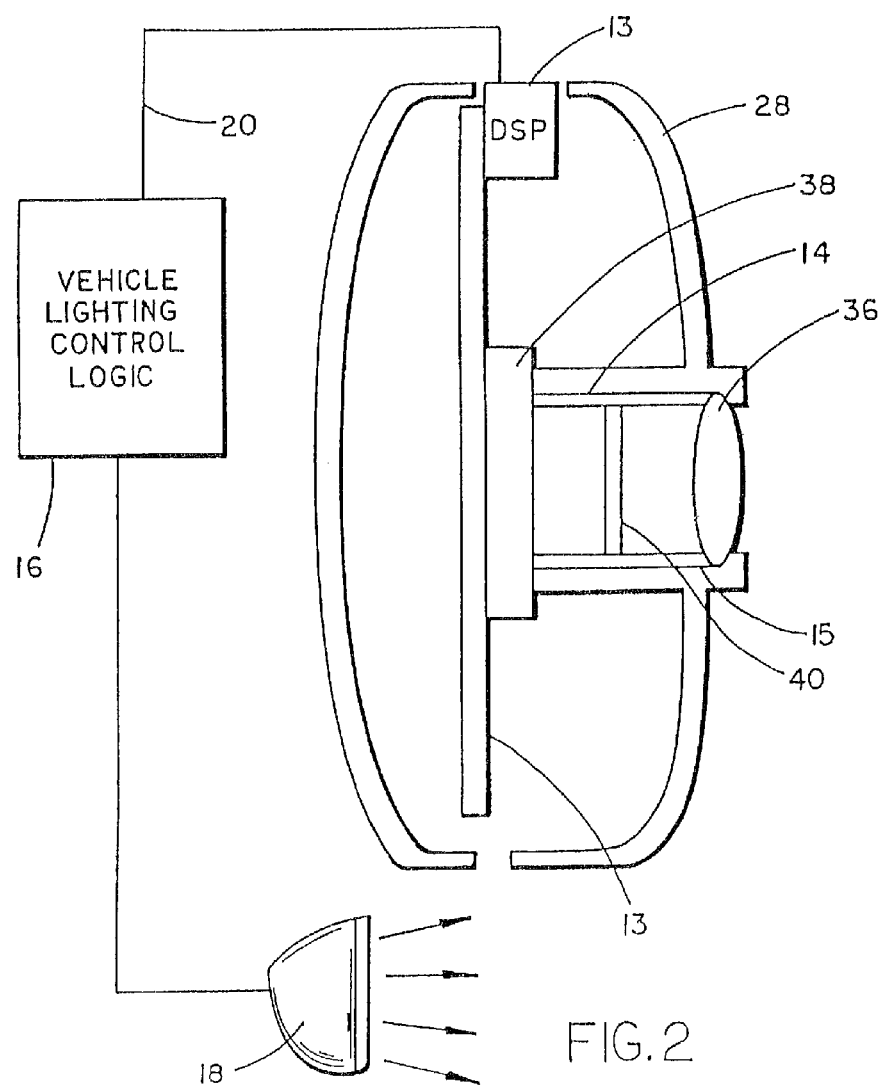
FIG. 2 is a partial side elevation view and block diagram of a vehicle headlight dimming control system according to the invention.

Referring now specifically to the drawings and the illustrative embodiments depicted therein, a vehicle 10 includes a vehicle headlight dimming control 12 made up of an imaging sensor module 14 which senses light from a scene forward of vehicle 10, an imaging control circuit 13 which receives data from sensor 14, and a vehicle lighting control logic module 16 which exchanges data with control circuit 13 and controls headlamps 18 for the purpose of modifying the headlight beam (FIGS. 1 and 2). Such control may be a binary control of the aim of the beam, such as by switching between lamps or lamp filaments, or may be a continuous variation of the aim of a single lamp more or less forward of the vehicle. The control may also control the intensity or pattern of the beam. Additionally, the lights of a vehicle equipped with daytime running lights may be switched between a daytime running light condition and a low-beam condition. Vehicle headlight dimming control 12 can perform a wide range of additional control operations on the vehicle, including turning the headlights ON and OFF, modifying the light intensity of the instrument panel, and providing an input to an electro-optic mirror system.

Figure 10:
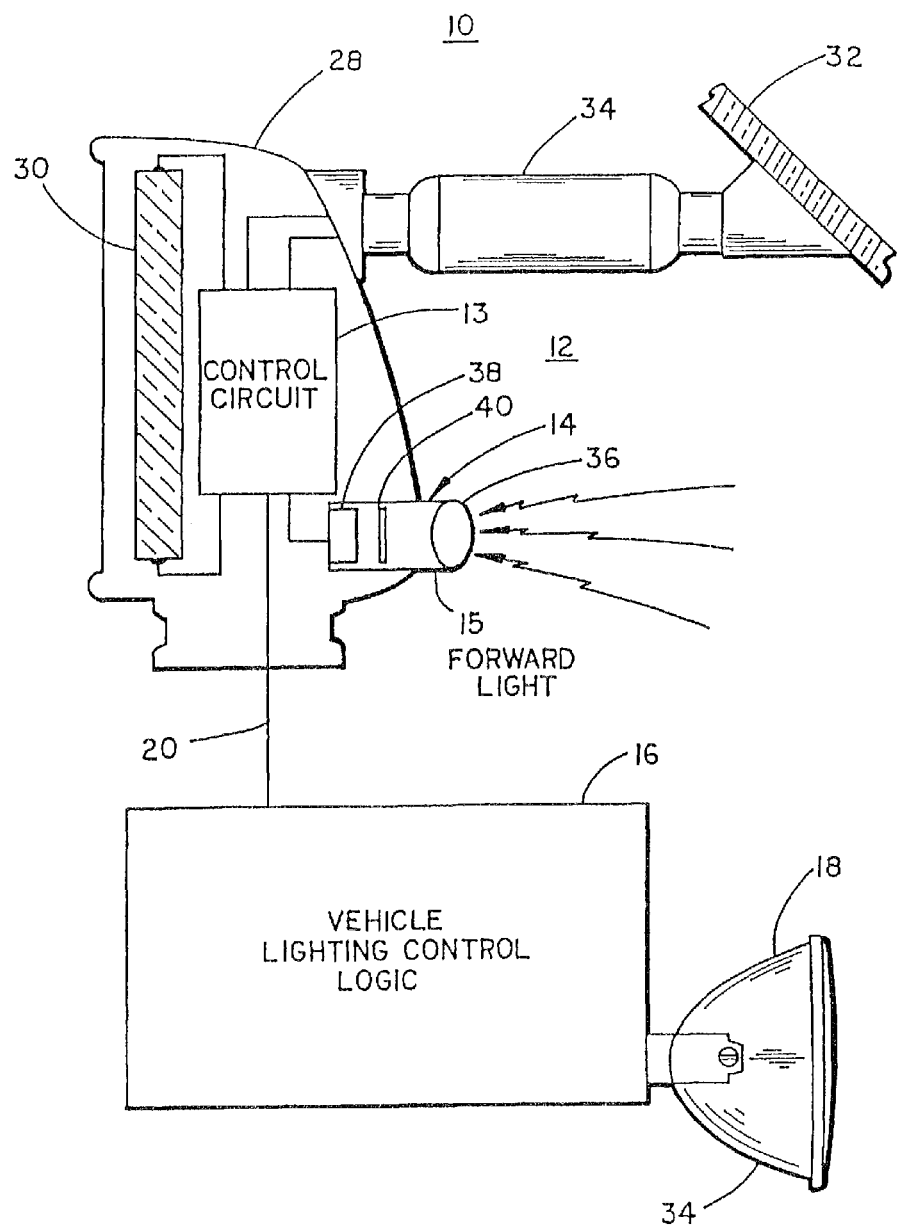
FIG. 10 is the same view as FIG. 2 of an alternative mounting arrangement.

Vehicle lighting control logic module 16 receives an input 20 from imaging control circuit 13. In particular embodiments, such as ones which adjust the state of the headlights between continuously variable states, module 16 may supply data to imaging control circuit 13, such as the speed of the vehicle, which may be combined with the data sensed by imaging sensor 14 in establishing the state of headlights 18. In the illustrated embodiment, imaging sensor module 14 may be fixedly mounted in a housing 28 by a bracket 34 mounted to, or near, the vehicle's windshield 32. Bracket 34 also mounts an interior rearview mirror 30. This is a preferred mounting for imaging sensor module 14 because the location within the interior of the vehicle substantially eliminates environmental dirt and moisture from fouling the light sensor module. Additionally, the position behind windshield 32, which typically is kept relatively clear through the use of washers and wipers and the like, ensures a relatively clear view of the scene forward of vehicle 10. Alternatively, imaging sensor module 14 may be mounted within a housing 29 of interior rearview mirror 30 facing forward with respect to vehicle 10 (FIG. 10). In such embodiment, control circuit 13 may be combined with the circuit which controls the partial reflectance level of mirror 30 if mirror 30 is an electro-optic mirror such as an electrochromic mirror. Other mounting techniques for sensor module 14 will be apparent to the skilled artisan.

Figure 3:
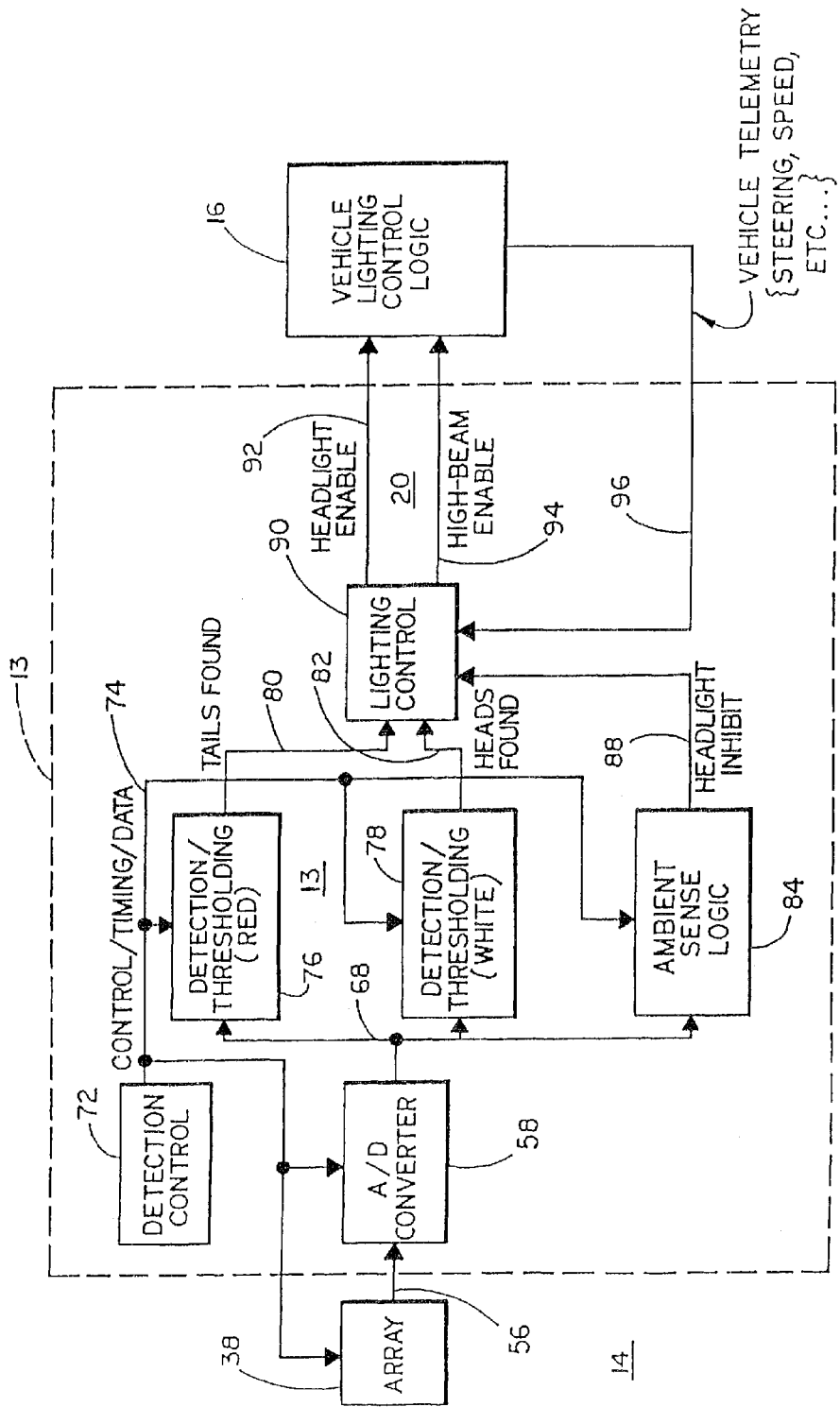
FIG. 3 is a block diagram of the control system in FIG. 2.
Figure 4:
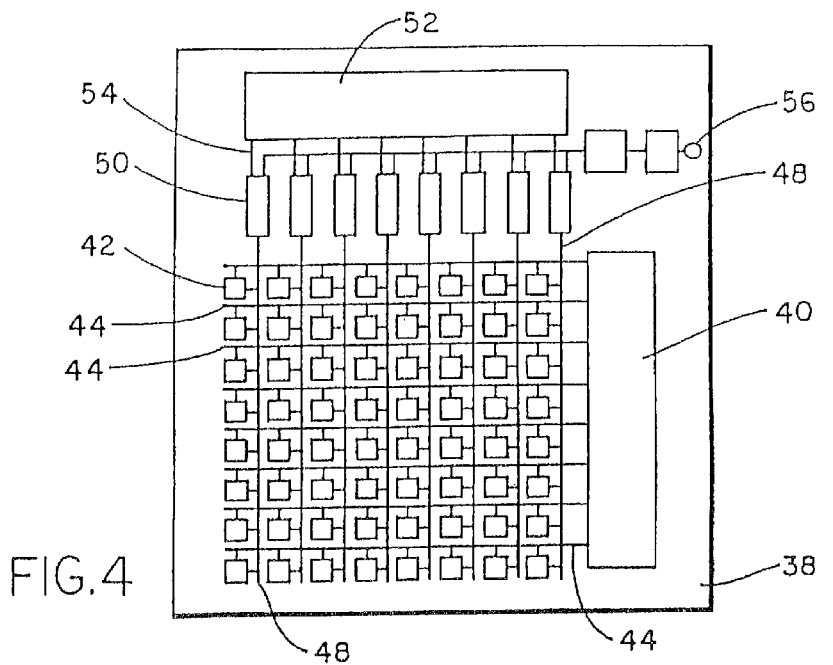
FIG. 4 is a layout of a light-sensing array useful with the invention.
Figure 5:
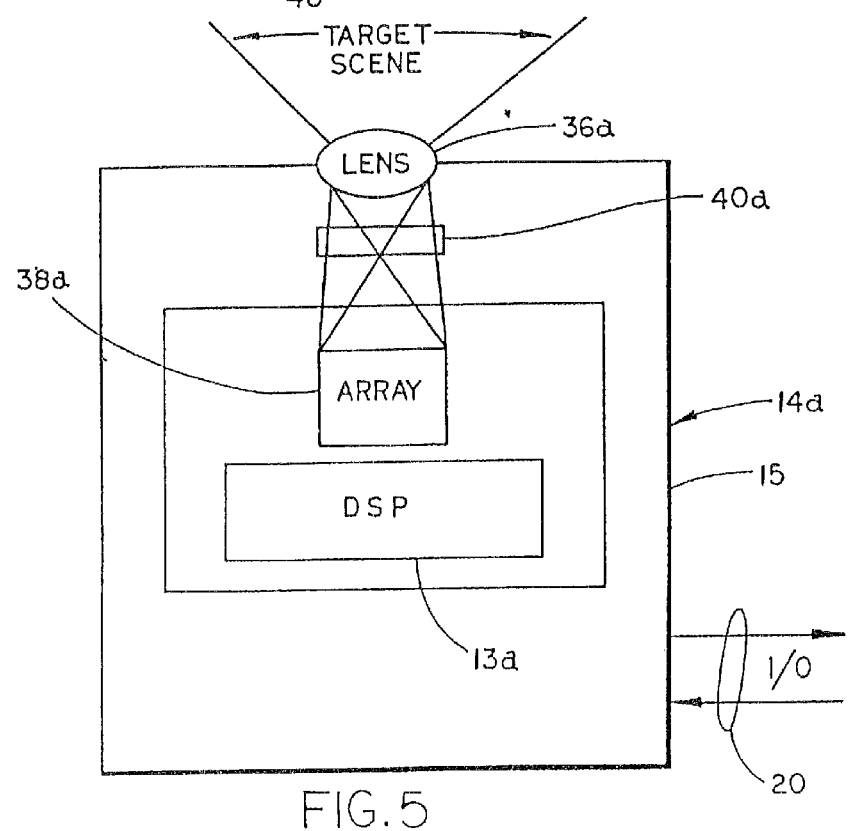
FIG. 5 is a block diagram of an imaging sensor.

Imaging sensor module 14 includes an optical device 36, such as a lens, an array 38 of photon-accumulating light sensors, and a spectral separation device for separating light from the scene forward of vehicle 10 into a plurality of spectral bands, such as a filter array 40 disposed between optical device 36 and light-sensing array 38. Light-sensing array 38 is described in detail in application Ser. No. 08/023,918, filed Feb. 26, 1993, now U.S. Pat. No. 5,550,677, the disclosure of which is hereby incorporated herein by reference. Light-sensing array 36 includes a plurality of photosensor elements 42 arranged in a matrix of columns and rows (FIG. 4). In the illustrated embodiment, an array of 512 rows and 512 columns of light-sensing pixels, each made up of a photosensor element 42 is utilized. However, a greater or lesser number of photosensor elements may be utilized and may be arranged in matrix that is laid out in other than columns and rows. Each photosensor element 42 is connected to a common word-line 44. To access the photosensor array, a vertical shift register 46 generates word-line signals to each word-line 44 to enable each row of photosensor elements 42. Each column of photosensor elements is also connected to a bit-line 48 which is connected to an amplifier 50. As each word-line 44 is accessed, a horizontal shift register 52 uses a line 54 to output the bit-line signals on consecutive bit lines 48 to an output line 56. In this manner, each photosensor element 42 may be individually accessed by appropriate manipulation of shift registers 46 and 52. Output 56 is supplied to a digital signal processor 13 which is supplied on an output 62 as input to control circuit 13 (FIGS. 3-5).

Digital signal processor 13 includes an analog-to-digital converter 58 which receives the output 56 of array 36 and converts the analog pixel values to digital values. A digital output 68 of A/D converter 58 is supplied to a taillight detection circuit 76, a headlight detection circuit 78, and to ambient sense logic circuit 84. A detection control circuit 72 supplies control and timing signals on a line 74 which is supplied to array 38, A/D converter 58 taillight detection circuit 76, headlight detection circuit 78, and ambient sense logic 84. Such signals coordinate the activities of these modules and provide any data, from look-up tables provided in control circuit 72, needed by each circuit to perform its function. For example, control circuit 72 may provide intensity threshold levels to taillight detection circuit 76 and headlight detection circuit 78.

Taillight detection circuit 76 detects a red light source having an intensity above a particular threshold as follows. For each pixel that is "red," a comparison is made with adjacent "green" pixels and "blue" pixels. If the intensity of a red pixel is more than a particular number of times the intensity of the adjacent green pixel and adjacent blue pixel, then it is determined that the light source is red. If the intensity of the "red" light source is greater than a particular threshold, an indication is provided at 80.

Headlight detection circuit 78 detects a white light source having an intensity above a particular threshold as follows. A white light is a combination of red, green, and blue components. If adjacent "red," "green," and "blue" pixels all exceed a particular threshold, a ratio comparison is made of the pixels. If the ratio of the intensity of the adjacent "red," "green," and "blue" pixels is within a particular range, such as 20 percent by way of example, then a white light source is detected.

Vehicle headlight dimming control 12 additionally includes an ambient light-sensing circuit 84 which receives an input from digital output signal 68. Ambient detection circuit 84 samples a subset of photosensor elements and detects light levels sensed by the subset over a long period of time in order to produce significant time filtration. Preferably, the photosensor elements in the sensed subset include sensors that detect portions of the forward-looking scene that are just above the earth's horizon which is more indicative of the ambient light condition. Ambient detection circuit 84 produces an indication 88 of ambient light levels which is supplied as an input to a lighting control module 90. A high ambient light level may be used by a module 90 to inhibit headlight actuation or to switch headlights 18 to a daytime running light mode. Ambient detection circuit 84 can, optionally, perform other functions, such as switching the daytime running lights of the vehicle between daytime and nighttime modes, controlling the intensity of the vehicle's instrument panel and providing an input to an electro-optic rearview mirror system.

Indications 80 and 82 from the light detection units and indication 88 from ambient detection circuit 84 are supplied to a lighting control circuit 90 which produces a first indication 92 that headlights 18 are to be switched on, or switched from a daytime running condition to a night mode, and a high-beam enable indication 94 that the headlights may be switched to a high-beam state. Vehicle lighting control logic module 16 responds to indications 92 and 94 by switching headlights 18 to an appropriate mode. An output 96 from module 16 may be provided to supply lighting control circuit 90 with information with respect to vehicle telemetry, steering, speed, and any other parameter that may be incorporated into the algorithm to determine the state of the headlights of the vehicle. Digital signal processor 13 may be implemented using discrete digital circuit modules or with a suitably programmed micro-processor with input and output buffers.

In one embodiment, an imaging sensor module 14a includes a single photosensor array 38a, one spectral filter array 40a, and one optical device 36a (FIG. 5). In this illustrated embodiment, spectral filter array 40a includes alternating spectrum filter elements for exposing adjacent pixels to different regions of the electromagnetic spectrum in the red band or green band or blue band. This may be accomplished by arranging such filter elements in stripes or by alternating filter spectral regions in a manner known in the art. Digital signal processor 13a captures a frame of data by enabling photosensor array 38a for a particular exposure period during which each photosensor element 42 accumulates photons. In order to detect oncoming headlights, digital signal processor 13a enables photosensor array 38a for a first exposure period. In order to detect leading taillights, digital signal processor 13a enables photosensor array 38a for a second exposure period. Because oncoming headlights have an intensity level that is substantially greater than that of leading taillights, the exposure period of the frame in which leading taillights is detected is at least approximately ten times the length of the exposure period during which oncoming headlights are detected. Most preferably, the exposure period for detecting leading taillights is approximately 40 times the exposure period for detecting oncoming headlights. In the illustrated embodiment, an exposure period of 0.004 seconds is utilized for detecting taillamps and 0.0001 seconds for detecting oncoming headlamps. The exposure period is the time during which each photosensor element 42 integrates photons before being read and reset by digital signal processor 13a. Establishing a different exposure period for detecting headlights verses taillights facilitates the use of existing and anticipated sensor technology by accommodating the dynamic range of such sensor technology. Exposure may also be adaptively established on a priority basis. In one such embodiment, exposure is set to a shorter headlight setting. If headlights are detected, the headlights 18 of vehicle 10 are dimmed and the exposure period is kept short. If no headlights are detected, the next frame is set to a longer exposure period. This has the advantage of shorter system cycle time as well as a reduction in sensitivity to sensor saturation and blooming. In another such embodiment, the exposure period is initially set to a long period. If an oncoming headlight is tentatively detected, the exposure period could then be switched to a short period to confirm the observation.

Vehicle headlight dimming control 12 carries out a control routine 100 (FIGS. 7a-7d). At the beginning of each pass through the routine, which occurs for every frame captured by the imaging sensor, a frame is grabbed at 102 and all of the pixels in the frame are processed as follows. Counters used for detecting white headlight sources and red taillight sources are zeroed at 104. It is then determined at 106 whether the previously processed frame was for detecting headlights or taillights. This is determined by looking at a variable "process.tails" which will be set to "yes" if the previous frame was processed to detect headlights and will be set to "no" if the previous frame was processed to detect taillights. If it is determined at 106 that the variable "process.tails" is set to "yes," the control proceeds to 108 in order to process the next frame to detect taillights. If it is determined at 106 that the variable "process.tails" is set to "no," then control passes to 109 in order to process the next frame as a headlight detecting frame.

The taillight detecting frame process begins at 108 by setting the exposure period for the imaging sensor module to grab the next frame according to a headlamp exposure level. In the illustrated embodiment, the exposure period for detecting headlights is set at 0.0001 seconds. Processing of the taillight frame proceeds at 110 by examining, for each "red" pixel, whether the intensity of light sensed by that pixel is greater than a threshold and whether the intensity of light sensed by that pixel is greater than a selected number of multiples of the intensity of light sensed by an adjacent "blue" pixel and a selected number of multiples of the intensity of light sensed by an adjacent "green" pixel. If so, then a "red" counter is incremented at 114. Preferably, the ratio of red pixel intensity to green or blue pixel intensity is selected as a power of 2 (2, 4, 8, 16 . . . ) in order to ease digital processing. However, other ratios may be used and different ratios can be used between red/green and red/blue pixels. In the illustrated embodiment, a ratio of 4 is selected based upon ratios established from CIE illuminant charts known to skilled artisans. Based upon these charts, a ratio greater than 4 would provide greater discrimination. Such greater discrimination may not be desirable because it could result in failure to identify a leading taillight and, thereby, a failure to dim the headlights of the controlled vehicle. After all pixels have been processed, the parameter "process.tails" is set to "no" at 116 and control proceeds to 118 (FIG. 7c).

In a similar fashion, processing of a headlight frame begins at 110 by setting the exposure period for the imaging sensor module to grab the next frame as a red taillight detecting frame. This is accomplished by setting the exposure period of the imaging sensor module to 0.004 seconds. It is then determined at 120 for each pixel whether an adjacent set of "red," "green," and "blue" pixels each exceeds a particular threshold and whether the pixel intensity levels all fall within a particular range, such as within 20 percent of each other. If all of the red, green, and blue pixels exceed a threshold and pass the ratio test, then it is determined that a white light source is being sensed and a "white" counter is incremented at 122. After all of the pixels in the frame have been processed, the "process.tails" flag is set to a "yes" state at 124. Control then passes to 118.

It is determined at 118 whether both the "white" and the "red" counters are below respective high-beam thresholds. If so, a high-beam frame counter is incremented and a low-beam frame counter is set to zero at 120. If it is determined at 118 that both the "white" and the "red" counters are not less than a threshold, it is then determined at 126 whether either the "red" counter or the "white" counter is greater than a respective low-beam threshold. If so, the high-beam frame counter is set to zero and the low-beam frame counter is incremented at 128. If it is determined at 126 that neither the "red" counter or the "white" counter is greater than the respective low-beam threshold, then both the high-beam frame counters and the low-beam frame counters are set to zero at 130.

Control then passes to 132 where it is determined if the low-beam frame counter is greater than a particular threshold. If so, high-beam enable signal 94 is set to a "low-beam" state at 134. Additionally, the low-beam frame counter is set to the threshold level. If it is determined at 132 that the low-beam frame counter is not greater than its threshold, it is determined at 136 whether the high-beam frame counter is greater than its threshold. If so, high-beam enable signal 94 is set to "high-beam" state at 138 and the high-beam frame counter is reset to its threshold level.

Control routine 100 provides hysteresis by requiring that a headlight spectral signature or a taillight spectral signature be detected for a number of frames prior to switching the headlights to a low-beam state. Likewise, the absence of a detection of an oncoming headlight or a leading taillight must be made for multiple frames in order to switch from a low-beam to a high-beam state. This hysteresis guards against erroneous detection due to noise in a given frame and eliminates headlamp toggling when sources are at the fringe of detection range. In the illustrated embodiment, it is expected that a vehicle headlight control system 12 will respond to a change in the state of light sources in the forward field of view of the vehicle in less than 0.5 seconds. An additional level of hysteresis may be provided by forcing the headlamps to stay in a low-beam state for a given number of seconds after a transition from high beams to low beams. The reverse would not occur; namely, holding a high-beam state for a particular period to avoid annoyance to drivers of oncoming or leading vehicles.

In the illustrated embodiment, red light sources, which have the spectral signature and intensity of taillights, are detected by determining that a "red" pixel, namely a pixel which is exposed to light in the visible red band, is both greater than a given multiple of the "green" and "blue" adjacent pixels, as well as being greater than a threshold and that white light sources, which are the spectral signatures of headlights, are detected by determining that "red," "green," and "blue" pixels are both within a particular intensity range of each other as well as being greater than a threshold. This double-testing helps to reduce false detection of light sources. However, it would be possible to detect red light sources only by looking at the intensity of "red" pixels and to detect white light sources by determining that an adjacent set of "red," "blue," and "green" pixels are all above a particular threshold.

Figure 8C:
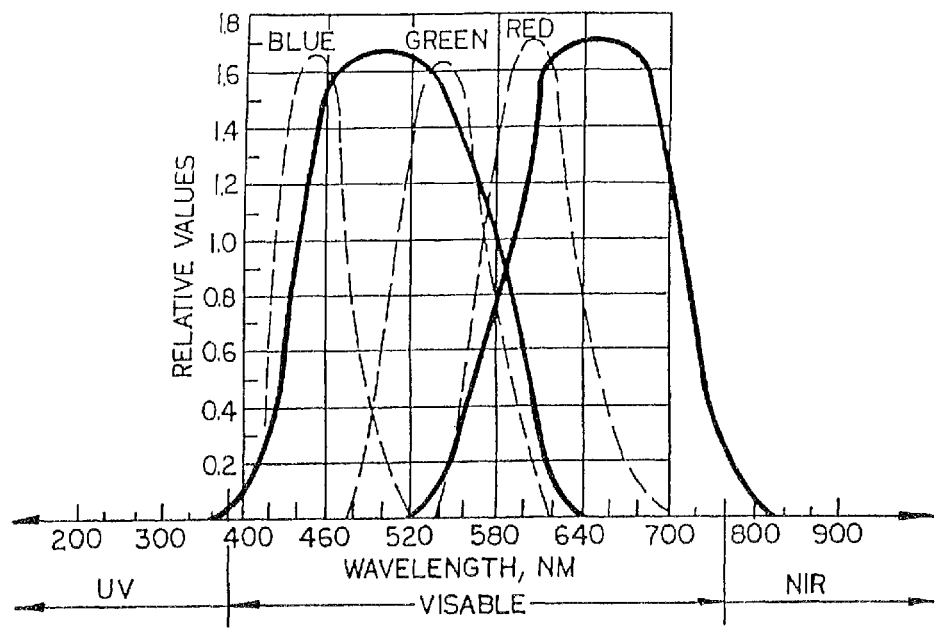
FIGS. 8a-8c are spectral charts illustrating spectra regions useful with the invention.
Figure 8A:
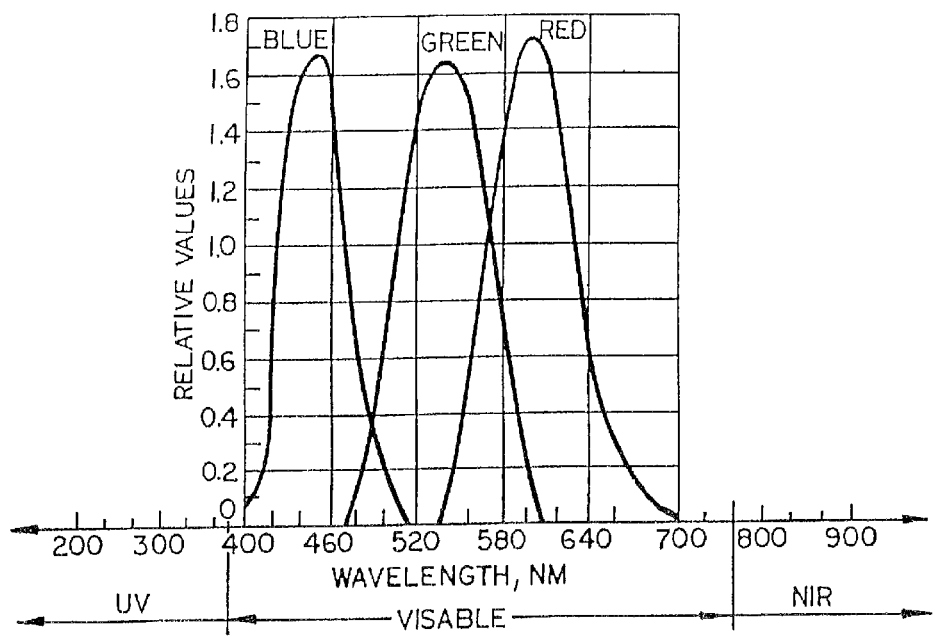
Figure 8B:
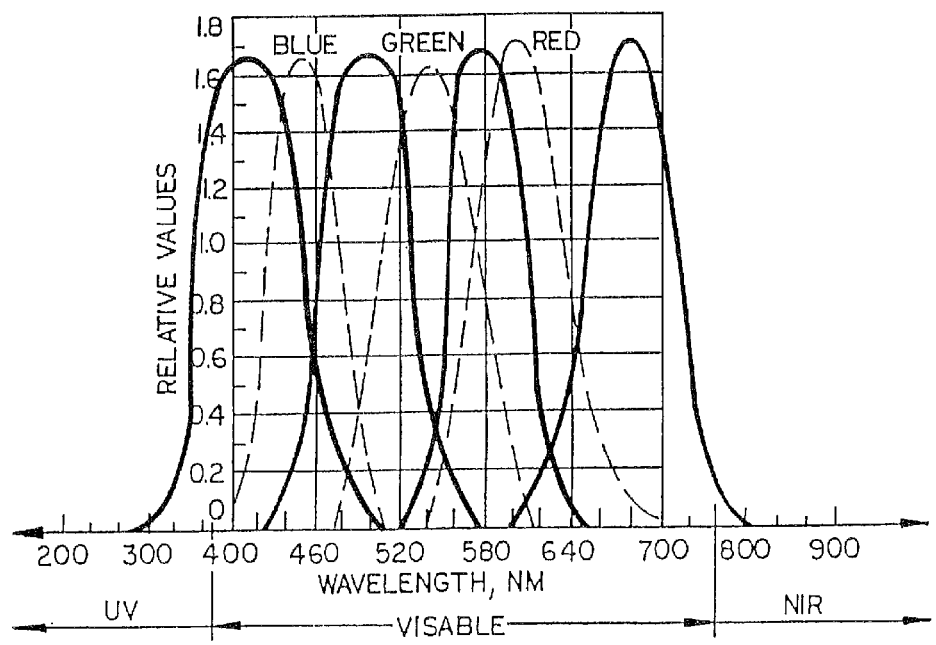

In the illustrated embodiment, spectral filtering is carried out in a manner which exposes each photosensing element in the photosensor array to a band of light falling within one of the primary ranges of the visible spectrum, namely red, green, or blue as illustrated in FIG. 8a. However, different bands in the frequency spectrum may be utilized including not only visible spectrum bands but invisible spectrum bands including infrared and ultraviolet bands as illustrated in FIG. 8b. The band selection could also be chosen from visible spectral regions that do not correspond with the primary spectrums. For example, the spectral filter may be selected in order to detect at the pixel level red light sources and the complement of red light sources as illustrated in FIG. 8c. These binary indications could be utilized to detect red taillights by determining that the "red" pixel is greater than a threshold and greater than a number of multiples of the intensity sensed by the "red complement" pixel adjacent thereto. Likewise, a white light source indicative of oncoming headlights could be detected by determining that both the "red" pixel and the "red complement" pixel adjacent thereto are both above a particular threshold and within a particular intensity range of each other. It may also be desirable to select bands that fall between primary spectrum regions or any other bands that may be desirable for a particular application.

Photosensing array 38 may be a charge couple device (CCD) array of the type commonly utilized in video camcorders and the like. Alternatively, photosensing array 38 could be a CMOS array of the type manufactured by VLSI Vision Ltd. (VVL) in Edinburgh, Scotland. Additionally, a hybrid of the CCD and CMOS technology may be employed. Other potentially useful photosensing technologies include CID, MOS, photo diodes, and the like.

Figure 6:
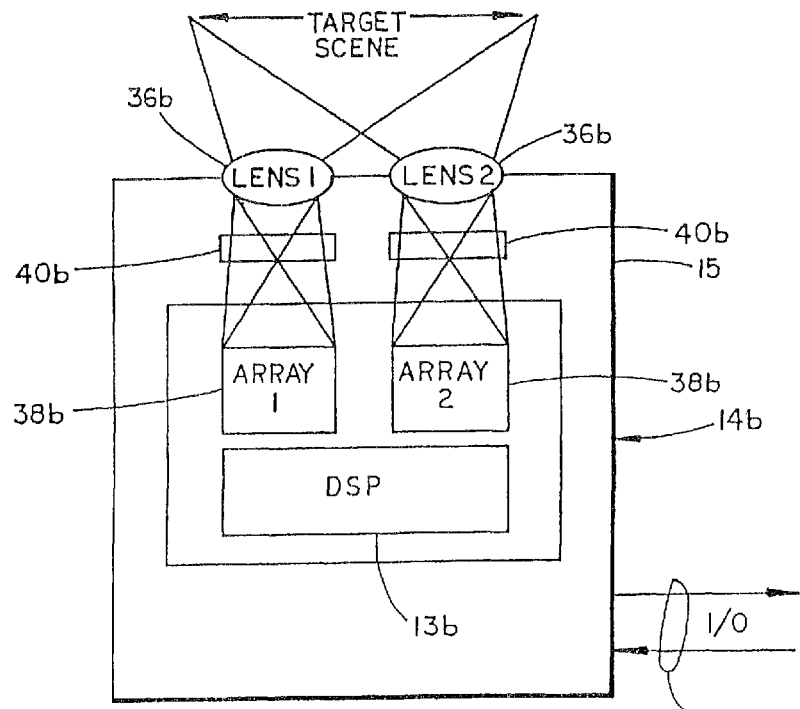
FIG. 6 is an alternative embodiment of an imaging sensor.

In an alternative embodiment, an imaging sensor module 14b includes two or more pairs of photosensor arrays 38b (FIG. 6). Each photosensor array 38b has an associated spectral filter array 40b and optical device 36b. In this embodiment, each array 38b is operated by digital signal processor 58b to have an exposure period that is set for detecting either oncoming headlights or leading taillights. In this manner, each frame of the scene captured by each array is utilized to detect a particular light source. This is in contrast to light-sensing module 14a in FIG. 5 in which each light source is detected in alternating frames. Each spectral filter 40b is identical, whereby each array 38b is capable of detecting light sources having spectrum composition including red, green, and blue regions of the spectrum. However, the spectral filters may be custom configured to the particular application. This may result in a homogeneous composition or a more complex mosaic, especially where light sources are examined in three or more spectral regions.

In yet an additional single lens system embodiment, an imaging sensor module 14c includes three light-sensing arrays (not shown) and a spectral separation device overlying the light-sensing arrays which directs spectral bands to different arrays (FIG. 9). An example of such spectral separation device is a refracting optical splitter, such as dichroic mirrors or prisms. In this manner, each light-sensing array detects light in either the red or green or blue region of the spectrum. As such, imaging sensor module 14c produces three output signals on a line 64, each representing detected light in one of the red or green or blue spectral regions. The output signals on line 64 include frame-timing signals which are decoded by digital acquisition circuits 66 which produces a digital output signal 68' indicative of intensity levels of adjacent red, green, and blue pixels. Digital acquisition circuit 66 additionally produces a timing signal output 70 which is utilized by a detection control circuit 72 in order to supply synchronizing signals, at 74, to imaging sensor module 14c and digital acquisition circuit 66. A control and timing signal 86 is produced by digital acquisition circuit 66 and supplied to detection circuits 76 and 78 and ambient detection circuit 84 in order to enable the circuits to distinguish between subsequent frames captured by the light-sensing modules. As with previously described embodiments, digital output signal 68' is supplied to taillight detection circuit 76, headlight detection circuit 78, and ambient sense logic circuit 84.

Figure 11A:
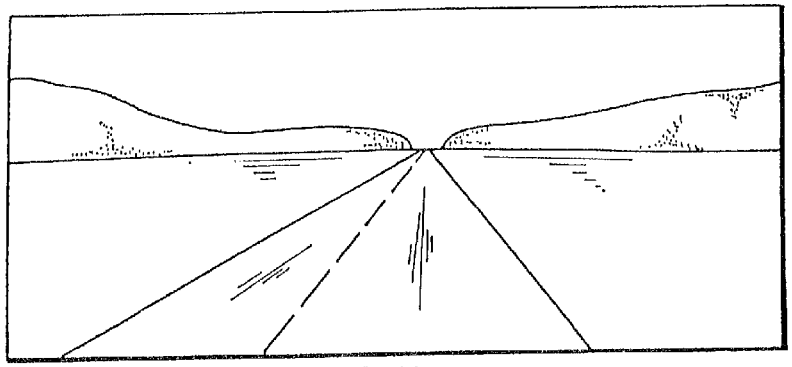
FIGS. 11a-11c are views forward of a vehicle illustrating different forms of spatial filtering.

The present invention is capable of identifying point sources of light in any particular location within the scene viewed forward of the vehicle. Additional discrimination between oncoming headlights and leading taillights may be accomplished by taking into account the relative location of the source of light within the scene. For example, as best seen by reference to FIG. 11a, particular relationships have been discovered to exist between light sources of interest and their spatial location forward of the vehicle. Oncoming headlights and leading taillights of interest can be characterized, at least in part, based upon their displacement from the central axis of the vehicle. On-axis light sources of interest can be at both close and far away separation distances. However, off-axis light sources may only be of interest if at a close separation distance from the vehicle. Assuming for illustration purposes that headlights and taillights are of the same size, headlights and taillights of interest occupy an increasing spatial area as they move off axis. Therefore, the resolution required to detect lights of interest may decrease off axis. Additionally, the fact that close-up off-axis light sources have significant spatial area would allow image-processing techniques to be employed to discriminate between close-up off-axis light sources of interest and distant off-axis light sources, which are not of interest. This may be accomplished through customized optics or other known variations in pixel resolution. Furthermore, headlights and taillights of interest are of greater intensity, because of their closeness, off axis. This allows an increase in intensity detection thresholds off axis without missing detection of such light sources. This increase in detection threshold and reduction in resolution off axis assists in avoiding false detection of light sources not of interest, such as a streetlights, building lights, and the like.

Figure 11B:
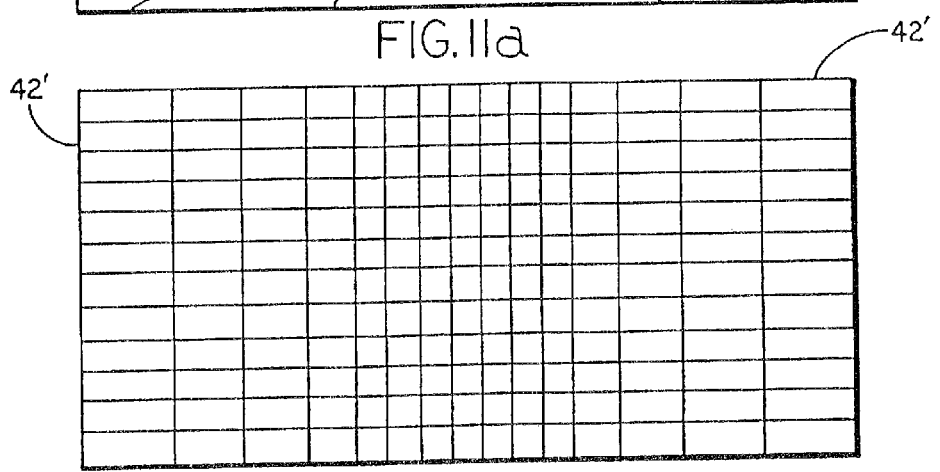
Figure 11C:
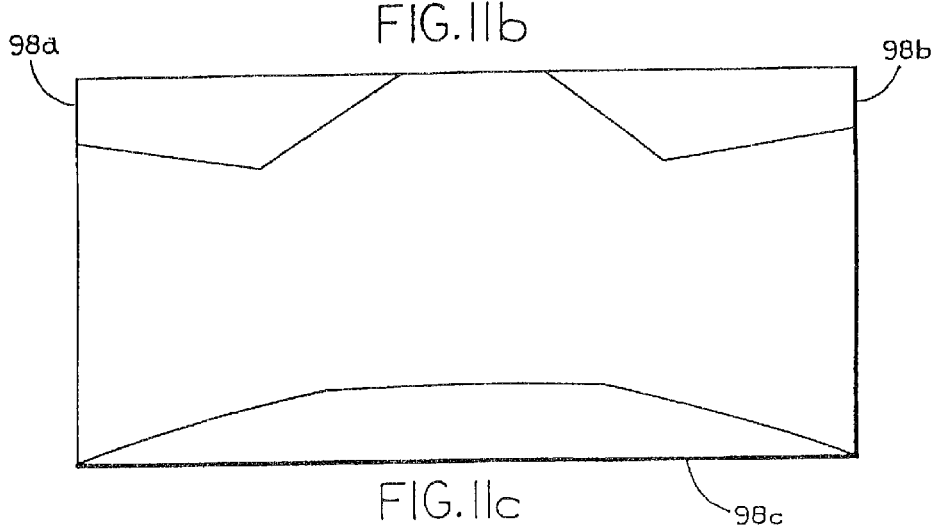

In order to take into account this spatial differentiation, the present invention comprehends detecting light sources at a lower threshold centrally of the scene and at a higher threshold at the periphery of the scene. This may be accomplished either optically, or electronically, or both. Optically, this may be accomplished by providing a non-uniform magnification to optical device 36. For example, an optical device may have optical magnification at a central portion thereof and an optical attenuation at a peripheral region thereof. Additionally, optical device 36 may have a relatively wide horizontal field of view and a relatively narrow vertical field of view. The narrow vertical field of view would tend to reduce the detection of street lights and other overhead light sources. In a preferred embodiment, optical device 36 is a lens that is made from injection-molded plastic. Electronically, such spatial differentiation may be accomplished by establishing a higher threshold level for pixel intensity detection for pixels located at the periphery of the scene than for pixels located centrally of the scene. This would cause centrally positioned light sources to be detected at a lower intensity level than sources detected at the periphery of the scene. Such spatial differentiation could also be accomplished by a non-symmetrical mapping of light to the sensor array, as illustrated in FIG. 11b, or by masking portions 98a, 98b, and 98c, at the periphery of the scene, as illustrated in FIG. 11c, so that these portions are not sensed at all. Spatial differentiation could also be accomplished by providing non-uniform pixel size.

The present invention is exceptionally sensitive to sources of light having spectral signatures of oncoming headlights and leading taillights. By recognizing the spectral signature of the light sources, many non-relevant light sources may be ignored. By examining light sources pixel-by-pixel, relatively small light sources may be detected at great distances in order to dim the headlights well before they become a nuisance to the driver of the vehicle ahead of the control vehicle. This is accomplished, according to a preferred embodiment, by utilizing an imaging sensor made up of an array of photosensing elements in a compact design which responds to light sources in a scene forward of the vehicle. Furthermore, such sensor preferably utilizes digital processing techniques which are well adapted for use with custom digital electronic circuitry, avoiding the expense and speed constraints of general purpose programmable microprocessors.

The present invention takes advantage of the spectral signatures both of light sources which must be detected in a headlight dimming control as well as the spectral signatures of light sources which must be rejected in a headlight dimming control. For example, federal regulations establish specific spectral bands that must be utilized in vehicle taillights; namely red. Furthermore, federal legislation prohibits the use of red light sources in the vicinity of a highway. Lane markers, signs, and other sources of reflected light are all specified in a manner which may be readily identified by spectral signature. Oncoming headlights, according to known technology, have a visible spectral signature which is predominantly white light. As light source technology evolves, the present invention facilitates detection of other spectral signatures of light sources in the future.

The present invention is capable of utilizing spatial filtering to even further enhance the ability to identify light sources. By spatial filtering is meant consideration of not only whether a particular pixel, or pixel group, is detecting a light source having a particular spectral signature, but also what adjacent, or closely related, pixels or pixel groups, are detecting. For example, it can be concluded that very closely adjacent red and white light sources are not of interest as oncoming headlights or taillights. An example where such pattern could be observed is a streetlight observed with a system having imperfect color correction, which can produce a white light surrounded by a red halo. By evaluation of adjacent pixel groups, a closely proximate red light source and white light source can be identified as a streetlight and not either a headlight or a taillight.

Pattern recognition may be used to further assist in the detection of headlights, taillights, and other objects of interest. Pattern recognition identifies objects of interest based upon their shape, reflectivity, luminance, and spectral characteristics. For example, the fact that headlights and taillights usually occur in pairs could be used to assist in qualifying or disqualifying objects as headlights and taillights. By looking for a triad pattern, including the center high-mounted stoplight required on the rear of vehicles, stoplight recognition can be enhanced. Furthermore, object recognition can be enhanced by comparing identified objects over successive frames. This temporal processing can yield information on object motion and can be used to assist in qualifying or disqualifying objects of interest.

Spatial filtering can also be useful in identifying atmospheric conditions by detecting effects on light sources caused by particular types of atmospheric conditions. One such atmospheric condition is fog. A bright light source 102 is surrounded by a transition region 104 between the intensity of the light source and the black background (FIG. 12a). Fog, or fine rain, tends to produce a dispersion effect around light sources which causes a series of transition regions 104a, 104b . . . 104n which extend further from the light source (FIG. 12b). By placing appropriate limits on the size of the transition region, fog or light rain, or a mixture of both, or other related atmospheric conditions, can be detected. In response to such atmospheric conditions, vehicle headlight dimming control 12 may activate fog lights, inhibit switching to high beams, or perform other control functions. Furthermore, fog, or fine rain, can be detected, or confirmed, by analyzing the effects of headlights 18 in the forward scene as reflected off of moisture particles.

Spatial filtering can also be used to detect rain on windshield 32. This may be accomplished by performing statistical analyses between a pixel, or pixel group, and adjacent pixels or pixel groups. A view forward of a vehicle through a dry windshield would be sensed by an imaging sensor module as continuously varying differences between adjacent pixels, or pixel groups, assumed to be under constant illumination from light sources. When, however, a droplet of water or a snowflake is on windshield 32, an effect is created which causes a lack of continuous variation of differences between adjacent pixels, or pixel groups. This has the tendency to reduce the first derivative of the pixel, a condition which can be determined by processing.

Processing can be used to determine the first derivative of an image captured by image-sensing module 14 by determining a measure of the entropy, or disarray, of a pixel, or pixel group, with respect to its neighbors. For example, an approximation of the first derivative for a pixel is:

$$\frac{d(P_i)}{dxy} = \frac{\sqrt{\sum_{j=1}^{n}(Pi-Pj)^2}}{N}$$

where N=8 and where Pi is a given pixel and Pj is one of 8 neighboring pixels.

It should be apparent to those skilled in the art that the invention is capable of performing control functions other than controlling the dimming of the vehicle's headlights. For example, spectral signature identifications may be utilized to detect the state of a traffic light to either warn the driver that a light has changed from green to yellow to red or to automatically decelerate and stop the vehicle. Also, by sensing that the intensity of a leading taillight has abruptly increased, a condition where the leading vehicle is braking may be identified and suitable action taken.

The invention may be utilized to identify particular traffic signs by their spectral signature as well as their geometric organization. For example, red octagons may be identified as stop signs, yellow triangles as caution signs, and the like. These capabilities are a result of the present invention providing a significant reduction in the amount of data to be processed because the image forward of the vehicle is captured in a manner which preselects data. Preselection of data is accomplished by configuring the sensor array, including the optics thereof, to consider the spatial, as well as the spectral, characteristics of light sources.

The present invention may be used to determine the environment in which the vehicle is operated. For example, a high level of "non-qualified" light sources; namely, light sources that are not headlights or taillights, as well as "qualified" light sources can be used to determine a measurement of the activity level around the vehicle; namely, that the vehicle is in an urban environment which may be a useful input for particular control algorithms. This may be accomplished as follows. An activity counter is established which represents a total number of pixels, or pixel groups, whose red, green, or blue components exceed a threshold. The threshold is set to a relatively low value, namely just above the noise floor. This counter, which registers any real detected source, is reset and retabulated every frame, preferably during the exposure period for detecting taillights. If the activity counter exceeds a particular value, then a high activity environment is detected. One use of this information would be to inhibit the control from switching the vehicle's headlights from a low-beam state to a high-beam state unless a low activity condition exists for awhile. The activity counter may be used by the control in combination with a low-beam duration counter which records the number of frames that the system has been in a low-beam state. It is reset upon system power-up and at every transition from the high-to-low beam states. The control may be inhibited from switching the vehicle's headlights to the high-beam state unless either the low-beam duration counter exceeds a value or the activity counter indicates a sustained low activity condition.

The present invention can be used to detect lane markers in order to either assist in steering the vehicle or provide a warning to the driver that a lane change is occurring. The capability of the invention to detect rain on the vehicle's windshield could be used to control the vehicle's wipers both between OFF and ON conditions and to establish a frequency of intermittent operation.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A driver assistance system for a vehicle, said driver assistance system comprising:
   an imager disposed in a housing;
   said imager comprising (i) a CMOS photosensor array of photosensor elements and (ii) a lens;

wherein, with said housing mounted at a windshield in a vehicle equipped with said driver assistance system, said imager views forwardly to the exterior of the equipped vehicle through the windshield of the equipped vehicle at a region of the windshield that is swept by a windshield wiper of the equipped vehicle;

wherein said CMOS photosensor array is operable to capture image data;

a control comprising an image processor;

wherein said image processor is disposed in said housing;

wherein said driver assistance system identifies objects viewed by said imager via processing by said image processor of captured image data; and wherein, at least in part responsive to processing of captured image data by said image processor, streetlights present exterior of the equipped vehicle and viewed by said imager are discriminated from other objects present exterior the equipped vehicle and viewed by said imager.

2. The driver assistance system of claim 1, wherein at least one of (i) streetlights are discriminated from headlights of approaching vehicles and (ii) streetlights are discriminated from taillights of leading vehicles.

3. The driver assistance system of claim 1, wherein discrimination of street lights from other objects present exterior the equipped vehicle and viewed by said imager is based, at least in part, on object motion in the forward field of view of said imager.

4. The driver assistance system of claim 1, wherein discrimination of street lights from other objects present exterior the equipped vehicle and viewed by said imager is based, at least in part, on at least one of (a) spatial location of objects present in the forward field of view of said imager, (b) determination of an activity level external the equipped vehicle and (c) determination of an environment in which the equipped vehicle is being driven.

5. The driver assistance system of claim 1, wherein discrimination of street lights from other objects present exterior the equipped vehicle and viewed by said imager is based, at least in part, on processing of multiple frames of captured image data in order to detect motion relative to the equipped vehicle of streetlights.

6. The driver assistance system of claim 1, wherein said control at least one of (a) controls a headlight of the equipped vehicle at least in part as a function of a speed of the equipped vehicle and in response to processing by said image processor of captured image data, (b) controls a headlight of the equipped vehicle at least in part in response to processing by said image processor of captured image data, (c) controls a speed of the equipped vehicle at least in part in response to processing by said image processor of captured image data, (d) generates an alert to the driver of the equipped vehicle responsive at least in part to processing by said image processor of captured image data, (e) responsive at least in part to processing by said image processor of captured image data, warns the driver of the equipped vehicle, (f) responsive at least in part to processing by said image processor of captured image data, decelerates the equipped vehicle, and (g) responsive at least in part to processing by said image processor of captured image data, stops the equipped vehicle.

7. The driver assistance system of claim 1, wherein said control controls a headlight of the equipped vehicle responsive, at least in part, to identification of at least one of (i) a headlight of an approaching vehicle in the forward field of view of said imager and (ii) a taillight of a leading vehicle in the forward field of view of said imager, and wherein said control is operable to at least one of (a) adjust an aim of the headlight of the equipped vehicle, (b) adjust an intensity of the headlight of the equipped vehicle, (c) adjust a pattern of the headlight of the equipped vehicle, (d) switch between a daytime running light condition and another lighting condition, (e) adjust a beam condition of the headlight of the equipped vehicle and (f) adjust a beam of the headlight of the equipped vehicle.

8. The driver assistance system of claim 1, wherein discrimination of street lights from other objects present exterior the equipped vehicle and viewed by said imager is based, at least in part, on a spectral characteristic of objects present in the forward field of view of said imager.

9. The driver assistance system of claim 1, wherein a spectral filter is disposed between said lens and said CMOS photosensor array of photosensor elements, and wherein light emitted by sources external of the equipped vehicle and/or reflected by objects external of the equipped vehicle passes through, and is filtered by, said spectral filter to be incident on at least some of said photosensor elements of said CMOS photosensor array, and wherein said spectral filter comprises a red filter that passes visible light of wavelength generally in the red portion of the visible spectrum and that substantially attenuates light having wavelengths generally outside the red portion of the visible spectrum, and wherein at least one of (a) non-red filtered others of said photosensor elements are neighbors of said red filtered photosensor elements and (b) non-red filtered others of said photosensor elements are immediately adjacent to said red filtered photosensor elements.

10. The driver assistance system of claim 1, wherein said driver assistance system is operable to identify lane markers on a road being traveled by the equipped vehicle in order to at least one of (a) assist the driver in steering the equipped vehicle and (b) provide a warning to the driver of the equipped vehicle.

11. The driver assistance system of claim 10, wherein at least one of (a) identification of lane markers comprises identification of lane markers by a spectral characteristic and (b) said driver assistance system is operable to determine atmospheric conditions at the equipped vehicle, and wherein, responsive at least in part to determination of atmospheric conditions, said control is operable to at least one of (i) activate a fog light of the equipped vehicle, (ii) adjust a light beam emitted by a headlight of the equipped vehicle and (iii) inhibit operation of a headlight of the equipped vehicle in a high beam state.

12. The driver assistance system of claim 10, wherein said housing mounts via a bracket at the vehicle windshield.

13. A driver assistance system for a vehicle, said driver assistance system comprising:

an imager;

said imager comprising (i) a CMOS photosensor array of photosensor elements and (ii) a lens;

wherein, with said imager disposed in a vehicle equipped with said driver assistance system, said imager views forwardly to the exterior of the equipped vehicle through the windshield of the equipped vehicle at a region of the windshield that is swept by a windshield wiper of the equipped vehicle;

wherein said CMOS photosensor array is operable to capture image data;

a control comprising an image processor;

wherein said driver assistance system identifies objects viewed by said imager via processing by said image processor of captured image data;

wherein, at least in part responsive to processing of captured image data by said image processor, streetlights present exterior of the equipped vehicle and viewed by said imager are discriminated from other objects present exterior the equipped vehicle and viewed by said imager;

wherein said objects comprise at least one of (i) headlights of approaching vehicles and (ii) taillights of leading vehicles;

wherein a spectral filter is disposed between said lens and said CMOS photosensor array of photosensor elements;

wherein light emitted by sources external of the equipped vehicle and/or reflected by objects external of the equipped vehicle passes through, and is filtered by, said spectral filter to be incident on at least some of said photosensor elements of said CMOS photosensor array;

wherein said spectral filter comprises a red filter that passes visible light of wavelength generally in the red portion of the visible spectrum and that substantially attenuates light having wavelengths generally outside the red portion of the visible spectrum; and wherein at least one of (a) non-red filtered others of said photosensor elements are neighbors of said red filtered photosensor elements and (b) non-red filtered others of said photosensor elements are immediately adjacent to said red filtered photosensor elements.

14. The driver assistance system of claim 13, wherein said driver assistance system includes an exposure control which determines an accumulation period of time said CMOS photosensor array senses light when capturing a frame of image data, and wherein said exposure control defines a plurality of accumulation periods, and wherein at least one of (a) said plurality of accumulation periods comprises a first accumulation period for a first frame of captured image data and a second accumulation period for a second frame of captured image data and wherein said first accumulation period is a longer time period than said second accumulation period, (b) said plurality of accumulation periods comprises a first accumulation period for a first frame of captured image data and a second accumulation period for a second frame of captured image data and wherein said first accumulation period is a longer time period than said second accumulation period and wherein said first frame is used when detecting leading vehicle taillights and said second frame is used when detecting approaching vehicle headlights, (c) said exposure control is adaptive and wherein at least one of (i) an accumulation period for a frame of captured image data is set on a priority basis, and (ii) an accumulation period for a frame of captured image data is determined in response to what said driver assistance system is sensing to be present in the forward field of view of said imager, and (d) said exposure control maintains an accumulation period until an object of interest is at least tentatively detected and wherein said exposure control changes to a different accumulation period when an object of interest is at least tentatively detected.

15. The driver assistance system of claim 14, wherein said CMOS photosensor array is operable to capture frames of image data and wherein identification of objects is enhanced by comparing image data of objects over multiple frames of said captured image data and wherein identification of objects is based at least in part on at least one of (i) shape, (ii) luminance, (iii) geometry, (iv) spatial location, (v) motion and (vi) spectral characteristic.

16. The driver assistance system of claim 13, wherein discrimination of street lights from other objects present exterior the equipped vehicle and viewed by said imager is based, at least in part, on object motion in the forward field of view of said imager.

17. A driver assistance system for a vehicle, said driver assistance system comprising:

an imager comprising (i) a CMOS photosensor array of photosensor elements, (ii) a spectral filter and (iii) a lens;

wherein, with said imager disposed at a windshield in a vehicle equipped with said driver assistance system, said imager views forwardly to the exterior of the equipped vehicle through the windshield of the equipped vehicle at a region of the windshield that is swept by a windshield wiper of the equipped vehicle;

wherein said CMOS photosensor array is operable to capture image data;

a control comprising an image processor;

wherein said image processor is disposed in said housing;

wherein said driver assistance system identifies objects viewed by said imager via processing by said image processor of captured image data;

wherein, at least in part responsive to processing of captured image data by said image processor, streetlights present exterior of the equipped vehicle and viewed by said imager are discriminated from other objects present exterior the equipped vehicle and viewed by said imager;

wherein said driver assistance system is operable to identify lane markers on a road being traveled by the equipped vehicle in order to at least one of (a) assist the driver in steering the equipped vehicle and (b) provide a warning to the driver of the equipped vehicle;

wherein said CMOS photosensor array is operable to capture frames of image data and wherein identification of objects is enhanced by comparing image data of objects over multiple frames of said captured image data;

wherein said CMOS photosensor array is arranged in a matrix of columns of photosensor elements and rows of photosensor elements; and wherein at least one of (i) the number of columns exceeds 512, (ii) the number of rows exceeds 512 and (iii) said CMOS photosensor array comprises at least 262,144 photosensor elements.

18. The driver assistance system of claim 17, wherein said spectral filter comprises a red filter that passes visible light of wavelength generally in the red portion of the visible spectrum and that substantially attenuates light having wavelengths generally outside the red portion of the visible spectrum, and wherein at least one of (a) non-red filtered others of said photosensor elements are neighbors of said red filtered photosensor elements and (b) non-red filtered others of said photosensor elements are immediately adjacent to said red filtered photosensor elements.

19. The driver assistance system of claim 18, wherein said imager is disposed in a housing, and wherein said housing mounts via a bracket at the vehicle windshield, and wherein said image processor is disposed in said housing.

20. The driver assistance system of claim 17, wherein discrimination of street lights from other objects present exterior the equipped vehicle and viewed by said imager is based, at least in part, on object motion in the forward field of view of said imager.

* * * * *